US012582254B2

(12) United States Patent
Sundaresan

(10) Patent No.: US 12,582,254 B2
(45) Date of Patent: Mar. 24, 2026

(54) SYSTEMS AND METHODS TO ENABLE SECURE EXCHANGE OF GOODS IN PACKAGE RECEPTACLES, AND REMOTE MONITORING AND CONTROL OF PACKAGE RECEPTACLES AND ITS SURROUNDINGS

(71) Applicant: Kumar Sundaresan, Fremont, CA (US)

(72) Inventor: Kumar Sundaresan, Fremont, CA (US)

(73) Assignee: DOORBOX CORPORATION, Fremont, CA (US)

( * ) Notice: Subject to any disclaimer, the term of this patent is extended or adjusted under 35 U.S.C. 154(b) by 759 days.

(21) Appl. No.: 17/561,998

(22) Filed: Dec. 27, 2021

(65) Prior Publication Data

US 2022/0233010 A1 Jul. 28, 2022

Related U.S. Application Data

(63) Continuation-in-part of application No. 16/140,271, filed on Sep. 24, 2018, now Pat. No. 11,206,939,
(Continued)

(51) Int. Cl.
*A47G 29/20* (2006.01)
*A47G 29/14* (2006.01)
(Continued)

(52) U.S. Cl.
CPC ........... *A47G 29/20* (2013.01); *A47G 29/141* (2013.01); *A47G 29/30* (2013.01);
(Continued)

(58) Field of Classification Search
CPC ...... A47G 29/20; A47G 29/30; A47G 29/141; A47G 2029/144; A47G 2029/147;
(Continued)

(56) References Cited

U.S. PATENT DOCUMENTS 5,774,053 A * 6/1998 Porter .................. A47G 29/141 340/568.1
8,358,199 B2 * 1/2013 Nesling .............. G07C 9/00912 340/568.1

(Continued)

*Primary Examiner* — William L Miller

(57) ABSTRACT

This invention involves a novel method, device, system and apparatus to receive, return or exchange packages and goods securely, and to monitor and control a parcel receptacle remotely. The invention comprises of a DoorBox and a Smart DoorBox and utilizes a parcel receptacle and a host of electronic features and Internet of things (IOT) technologies. The security, apparatus is connectable to any fixture, including to one or more parcel receptacles. The parcel receptacles can be secured via a physical cable and a security apparatus, or secured via connectivity to a wireless network. The parcel receptacles can also be secured via a GPS module, accelerometer and other technological devices inside parcel receptacle. The locking mechanism in the security apparatus and/or on the parcel receptacle can be of technological in nature using the latest advancements in IOT and other wireless technologies, or alternatively, involve simple locking mechanisms. The apparatus allows access to parcels to authenticated users only and involve many safety features including an audible alarm, mobile-app alerts, camera and a host of advanced features. The parcel receptacle can be integrated with smart home systems and can have a host of security features to monitor, alert any intruders.

9 Claims, 72 Drawing Sheets

Related U.S. Application Data which is a continuation-in-part of application No. 15/294,254, filed on Oct. 14, 2016, now Pat. No. 10,083,561, which is a continuation-in-part of application No. PCT/US2015/025194, filed on Apr. 9, 2015.

(60) Provisional application No. 63/215,481, filed on Jun. 27, 2021, provisional application No. 63/157,798, filed on Mar. 7, 2021, provisional application No. 62/631,854, filed on Feb. 18, 2018, provisional application No. 62/588,019, filed on Nov. 17, 2017, provisional application No. 62/569,442, filed on Oct. 6, 2017, provisional application No. 62/568,261, filed on Oct. 4, 2017, provisional application No. 62/342,980, filed on May 29, 2016, provisional application No. 61/980,644, filed on Apr. 17, 2014.

(51) Int. Cl.

| | |
|---|---|
| ***A47G 29/30*** | (2006.01) |
| ***E05B 73/00*** | (2006.01) |
| ***F25D 29/00*** | (2006.01) |
| ***G08B 3/10*** | (2006.01) |
| ***G08B 13/14*** | (2006.01) |

(52) U.S. Cl.

CPC ........ *E05B 73/0005* (2013.01); *F25D 29/006* (2013.01); *G08B 3/10* (2013.01); *G08B 13/1463* (2013.01)

(58) Field of Classification Search

CPC .......... A47G 2029/149; E05B 73/0005; E05B 67/063; E05B 45/005; E05B 39/005; E05B 2047/0067; E05B 2047/0095; F25D 29/006; G08B 3/10; G08B 13/1463; G08B 13/1445

See application file for complete search history.

(56) References Cited

U.S. PATENT DOCUMENTS

| | | | | |
|---|---|---|---|---|
| 9,364,112 | B2 * | 6/2016 | Sundaresan | A47G 29/20 |
| 9,596,952 | B2 * | 3/2017 | Mencel | A47G 29/20 |
| 10,083,561 | B2 * | 9/2018 | Sundaresan | G07C 9/00896 |
| 10,537,197 | B2 * | 1/2020 | Hopp | A47G 29/20 |
| 10,743,694 | B2 * | 8/2020 | Raphael | A47G 29/141 |
| 11,172,776 | B1 * | 11/2021 | Logan | G08B 13/14 |
| 11,206,939 | B2 * | 12/2021 | Sundaresan | A47G 29/1225 |
| 11,812,878 | B1 * | 11/2023 | Nevison | H04L 9/0643 |
| 11,825,972 | B2 * | 11/2023 | Grijalva | A47G 29/141 |
| 12,133,604 | B2 * | 11/2024 | Courtney | A47G 29/141 |
| 12,329,303 | B1 * | 6/2025 | McNaboe | A47G 29/30 |
| 12,469,374 | B1 * | 11/2025 | Naylor | A47G 29/141 |
| 2005/0104730 | A1 * | 5/2005 | Yang | A47G 29/141 340/569 |
| 2012/0269461 | A1 * | 10/2012 | Proctor | G09F 23/00 383/42 |
| 2013/0077896 | A1 * | 3/2013 | Wiley | B65D 33/28 383/86.2 |
| 2015/0305538 | A1 * | 10/2015 | Sundaresan | A47G 29/141 70/64 |
| 2017/0286905 | A1 * | 10/2017 | Richardson | G06Q 10/0836 |
| 2018/0029760 | A1 * | 2/2018 | Maser | B65D 43/16 |
| 2018/0070753 | A1 * | 3/2018 | Eveloff | H04W 4/025 |
| 2018/0202199 | A1 * | 7/2018 | Critz | E05B 73/0005 |
| 2018/0228311 | A1 * | 8/2018 | Bloom | A47G 29/20 |
| 2019/0147559 | A1 * | 5/2019 | Lee | G07C 9/00309 705/332 |
| 2019/0248582 | A1 * | 8/2019 | Nevison | A47G 29/20 |
| 2020/0015617 | A1 * | 1/2020 | Izquierdo Gonzalez | G06Q 10/0832 |
| 2020/0060460 | A1 * | 2/2020 | Farrar | A47G 29/141 |
| 2020/0107663 | A1 * | 4/2020 | Eivaz | A47G 29/141 |
| 2020/0196788 | A1 * | 6/2020 | Juhasz | G08B 13/1481 |
| 2020/0323377 | A1 * | 10/2020 | O'Connor | A47G 29/20 |
| 2021/0127880 | A1 * | 5/2021 | Raphael | A47G 29/141 |
| 2021/0196071 | A1 * | 7/2021 | Gecho | A47G 29/30 |
| 2021/0251409 | A1 * | 8/2021 | Kennett | A47G 29/141 |
| 2021/0321807 | A1 * | 10/2021 | Needler | G07C 9/00912 |
| 2022/0061572 | A1 * | 3/2022 | Snodgrass | G06Q 10/08 |
| 2022/0061573 | A1 * | 3/2022 | Jertberg | A47G 29/20 |
| 2022/0079366 | A1 * | 3/2022 | Cotton-Betteridge | G06Q 10/0832 |
| 2022/0142388 | A1 * | 5/2022 | Foster | A47G 29/141 |
| 2022/0151421 | A1 * | 5/2022 | Sengstaken, Jr. | G06K 7/10009 |
| 2022/0183491 | A1 * | 6/2022 | Cooper | A47G 29/20 |
| 2022/0233010 | A1 * | 7/2022 | Sundaresan | A47G 29/141 |
| 2022/0257041 | A1 * | 8/2022 | Redford | B65D 81/3848 |
| 2022/0338658 | A1 * | 10/2022 | Soderberg | A47G 29/141 |
| 2023/0157472 | A1 * | 5/2023 | Barkman | A47G 29/20 232/1 R |
| 2023/0180956 | A1 * | 6/2023 | Jenkins | A47G 29/20 232/19 |
| 2023/0218100 | A1 * | 7/2023 | Meyrowitz | A47G 29/16 340/569 |
| 2023/0371729 | A1 * | 11/2023 | Williams | G07C 9/00896 |
| 2024/0197097 | A1 * | 6/2024 | Gregory | A47G 29/141 |
| 2025/0331669 | A1 * | 10/2025 | Roane, III | A47G 29/141 |

* cited by examiner

SYSTEMS AND METHODS TO ENABLE SECURE EXCHANGE OF GOODS IN PACKAGE RECEPTACLES, AND REMOTE MONITORING AND CONTROL OF PACKAGE RECEPTACLES AND ITS SURROUNDINGS

CROSS-REFERENCE TO RELATED APPLICATIONS

This application claims priority under 35 USC § 119(e) to the following applications which are incorporated by reference for all purposes: PCT/US15/25194, filed in the USPTO on Apr. 9, 2015, which claims benefit to U.S. Provisional Patent Application Ser. No. 61/980,644, filed in the USPTO on Apr. 17, 2014, and U.S. Continuation-in-part, non-provisional application Ser. No. 15/294,254, filed in the USPTO on Oct. 14, 2016, and U.S. Provisional Patent Application Ser. No. 62/568,261 filed in the USPTO on Oct. 4, 2017, and U.S. Provisional Patent application Ser. No. 62/569,442 filed in the USPTO on Oct. 6, 2017, and U.S. Provisional Patent Application Ser. No. 62/588,019 filed in the USPTO on Nov. 17, 2017, and U.S. Provisional Patent Application Ser. No. 62/631,854 filed in the USPTO on Feb. 18, 2018, and U.S. Non Provisional Patent Application Ser. No. 16/140,271 filed on Sep. 24, 2018, and U.S. Provisional Patent Application Ser. No. 63/157,798 filed on Mar. 7, 2021, and U.S. Provisional Patent Application Ser. No. 63/215,481 filed on Jun. 27, 2021, and this application is also a continuation of invention associated with U.S. Pat. No. 9,364,112 issued on Jun. 14, 2016, U.S. Pat. No. 10,083,561 issued on Sep. 25, 2018 and U.S. Pat. No. 11,206,939 to be issued on Dec. 28, 2021.

BACKGROUND

In the internet age, more and more consumers of the world rely on companies such as Amazon.com in the US, and many other online retailers in other parts of the World to shop, and to receive, return or exchange their parcels when they are away. They also depend on large carriers such as UPS, FedEx, DHL, Ontrac, etc. in the US, and similar popular carriers in other parts of the world. When the value of parcel increases and when the recipient is away, the delivery person often either chooses to leave a note at the front-door asking the recipient to collect the parcel at a later time from a nearby pick-up locations of the carrier, or attempts to re-deliver at a later point. Both these options cause tremendous time delays and inconvenience, and defeat the original objective of shopping online in a very time-efficient manner Past attempts to solve the problem of receiving deliveries while the recipient is away at work or outside their temporary or permanent residences or place of their businesses have been unsatisfactory.

Additionally, many apartment complexes, hotels and other places of stay do not allow their residents to permanently alter or do anything outside their front door to help the resident(s) to securely receive, return or exchange parcels delivered by UPS, FedEx, DHL, onTrac or any other mail carrier. In fact, many apartments, in the hope of offering their elite residents a clutter-free appearance in the hallway and/or exquisite living experience in their property, have very strict rules, and impose many restrictions for living. Residents are not allowed to leave anything outside their front-door for any extended periods of time, and property managers frown upon and even impose fines on residents or occupants who violate any of their strict rules.

Doorbox Trademark

My US trademark application U.S. Serial number 87294209 has been allowed by USPTO for the use of the Trademark DOORBOX on Aug. 29, 2017. So, for the sake of brevity, the use of the word DOORBOX in this application may be referred, and it can mean 1) the invention described herein itself as a complete unit, or 2) the doorknob locking assembly which is connected to a doorknob securely, and/or 3) a parcel receptacle that is connected to the doorknob locking assembly via a secure cable, or 4) a parcel receptacle that is connectable to a fixed object or 5) a wireless, technology-enabled, parcel receptacle system that is tethered to a wired or wireless network of a parcel recipient or 6) or a parcel receptacle with a configured GPS module or an accelerometer type of device that detects tampering or dislocation of parcel receptacle by any unauthorized person. The word Doorbox in this application is intended to mean any or all combinations of one or more of the individual pieces/meanings indicated herein for the sake of brevity, to avoid complicated explanations of my invention every time it is referred in this application.

Essential Features of this Invention

The objective of this invention is to enable secure exchange of goods in package receptacles, and to allow for remote monitoring and control of such package receptacles and its contents inside, and its surroundings. The goal is to offer peace of mind to people, and to reduce their anxiety of losing a package at home or office or wasting time waiting in lines to receive something securely at a pharmacy, or restaurant or any store. This invention is expected to bring enormous peace of mind and happiness to people and offer time-saving alternatives for people. This is accomplished in the following ways:

a. I have invented a unique, foldable, structurally strong, economical Parcel Receptacle with a significant number of features and advantages as outlined in the included Figures. Our design is expected to provide a high ratio of cubic feet of storage volume of package per dollar.
b. I have invented and incorporated important tethering mechanisms thereby the package receptacle itself is secured and cannot be easily stolen.
c. I have invented and incorporated important security features to protect the contents inside the package receptacles, and to enable viewing of them remotely.
d. I have invented and incorporated important security features for monitoring and controlling the package receptacle and its contents, and its surroundings remotely.
e. I have designed and invented our overall solution to provide all the above in the most economical and feature-rich ways. Our invention is also incorporated in a way that when the technology in a particular component is upgraded in the future (i.e. a 30 megapixel camera in the future may cost the same price as a 2 megapixel camera today, and so a design that is conducive of a quick replacement of an electronic part of its enclosure (146) would be an attractive feature for mankind), the pieces inside our parcel receptacle can be easily upgraded just by swapping the necessary components or its enclosures without needing to throw and replace the entire system, thereby offering enormous cost savings, while it promises to maximize utility, and minimize wastage of materials to save the planet earth from environmental pollution. Technology keeps getting upgraded and more features are available for less and less cost as time goes by, and so having a design that offers a quick swap of essential components is a benefit to humans and helps create a green planet.

SUMMARY OF THE INVENTION

This is a continuation of my invention patented in U.S. Pat. No. 9,364,112 issued on Jun. 14, 2016, and U.S. Pat. No. 10,083,561 issued on Sep. 25, 2018, and U.S. Pat. No. 11,206,939 to be issued on Dec. 28, 2021, to address the growing need to securely receive, return or exchange parcels or services in a secure manner None of the existing inventions in my opinion adequately addresses all of the limitations and constraints for practical implementations. In addition, none of them include many of the features of my invention. The various embodiments of the present invention utilize fixed objects such as doorknobs or door handles or door knockers or door or any kind of object that exist near the front door of a residence or business or any place of stay or proximate to the parcel address of a recipient. In apartment complexes, if the property owner prefers, my invention can be connected to a bicycle stand or any other stationary stand or object or rack to which my invention can be securely connected, and every resident can be allowed to put their parcel receptacle, with their apartment numbers or other user-identifiable information, so that the delivery carrier can deliver everyone's parcel to their respective recipient in a secure manner Even in individual houses, this cable assembly can be connected to grills or fixtures of any sort, which are amenable to be circled around with a cable and locked to secure the parcel box. My invention can also be used if a property manager chooses to install a handful of my DOORBOX in a convenient place in their property to facilitate their residents receive their respective parcels safely and securely.

The entire assembly or apparatus, which includes a novel security apparatus and/or a parcel receptacle, can be quickly and easily, attached or detached to fulfill its intended function. A locking mechanism in a parcel receptacle allows the delivery personnel to deliver the package so that only the intended recipient is able to have access to the parcel. In cases where a customer or owner of the system/apparatus described in this invention wants to return parcel, only authorized agent or authorized personnel can access the parcel in the parcel receptacle by utilizing one or more of secure unlocking mechanisms described elsewhere in this invention. An audible alarm with a speaker can be configured to sound to deter any attempted unauthorized tampering of parcel receptacle. The various embodiments use flexible or rigid or semi-rigid parcel receptacle of varying sizes to accommodate receipt of most common sizes of packages to suit typical shopping needs. Additionally, the parcel receptacle may be fixed in size, or may optionally have or employ an extension mechanism wherein the size and volume of the parcel receptacle can be increased or decreased to accommodate various sizes and needs of parcels. Additionally, to enable multiple deliveries or returns of parcels in a given day by multiple delivery personnel or carriers, multiple parcel receptacles, or parcel receptacles with multiple compartments with multiple individual access mechanisms to each compartment, can also be configured to be connected securely so as to fulfill the intended objectives.

Additionally, parcel receptacles can be tethered to an authorized parcel recipient by physical means or by electronic or technological means. The tethering option involving physical means can be comprised of tamper-proof cables, a locking assembly in a number of configurations described elsewhere in this application, or the tethering option can involve electronic and/or technological means such as connectivity to the wired or wireless network of the parcel recipient or by means of configurable GPS module present in the parcel receptacle which can detect dislocation or tampering of parcel receptacle by any unauthorized individuals by sensing one or more of configurable events of tamper detection.

DESCRIPTION OF THE DRAWINGS

FIG. 1A shows an electronic combination lock on the top.

The various embodiments described in this invention, can be installed on any of these doorknobs or door handles or door or any object that exhibits properties and characteristics like these objects so as to be utilized to receive, return or exchange a parcels and services, securely. A guard rail present in some residences near an entrance can be configured to be used as a fixed object to which a locking assembly and/or parcel receptacle can be directly connected securely. A guard rail is one example, although many fixtures which exhibit the features similar to a guard rail can all be securely connected to my locking assembly, and are included for the purposes of this invention since there can be a number of variations with an underlying commonality between them for the purpose of this invention and applications.

In my invention as described and explained in many of the figures to follow, there are many features, and some are essential features, and some are optional features. For example, the locking mechanism of a doorknob locking assembly that can be securely connected to a doorknob may utilize a simple lock and key mechanism (FIG. 2*a*, Part 107), or may involve a more hi-tech feature/solution (FIG. 4*a*) based on Bluetooth, or RFID, or Mobile-phone based application, or NFC-based technology, or a finger-print reader, etc. to authenticate and authorize individuals. However, to avoid complication of explanations resulting from multitude of permutations and combinations, mostly, explanations is only directed toward a physical solution as it is very obvious and common knowledge what the other parts are capable of performing when included. For example, it is common knowledge that a fingerprint reader, when included in an embodiment, can be utilized to read a fingerprint and authenticate an authorized individual. Similarly, several other features of various parts and components, are fairly obvious and common knowledge based on the inclusion of such part or part description, and for the sake of brevity, they are not explained in detail as their use and application are fairly straight forward and common knowledge, and will be easy to understand for anyone familiar with the art.

Figure 2A:
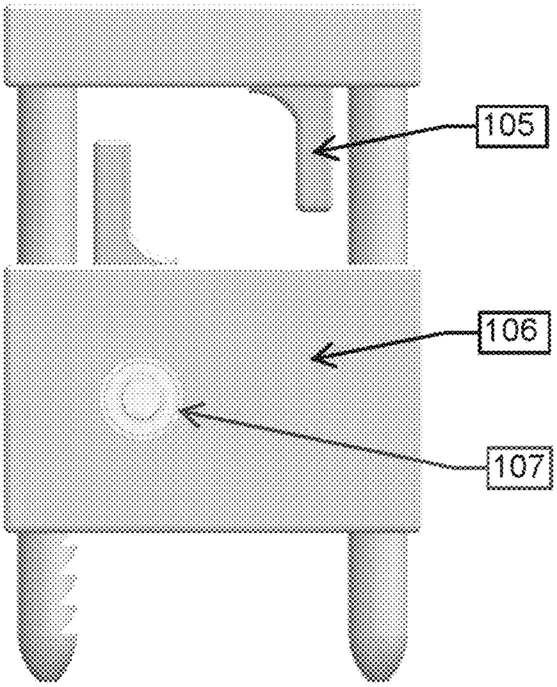
Figure 2B:
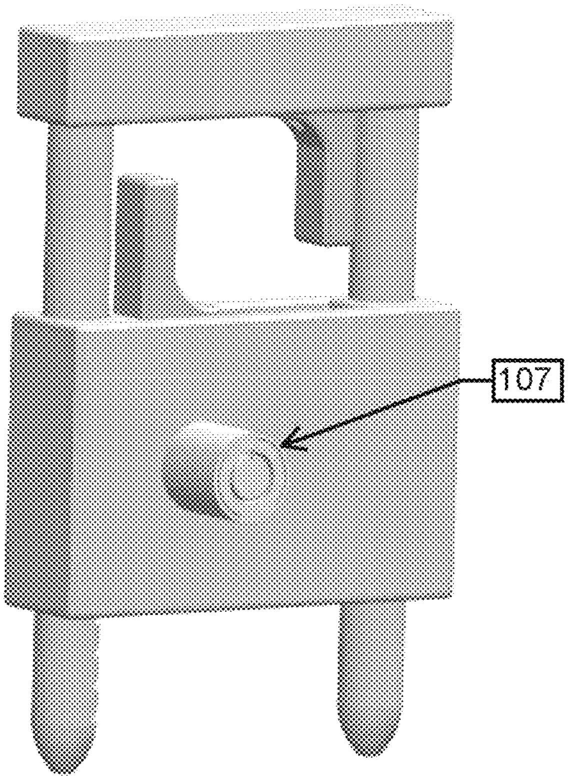
Figure 2C:
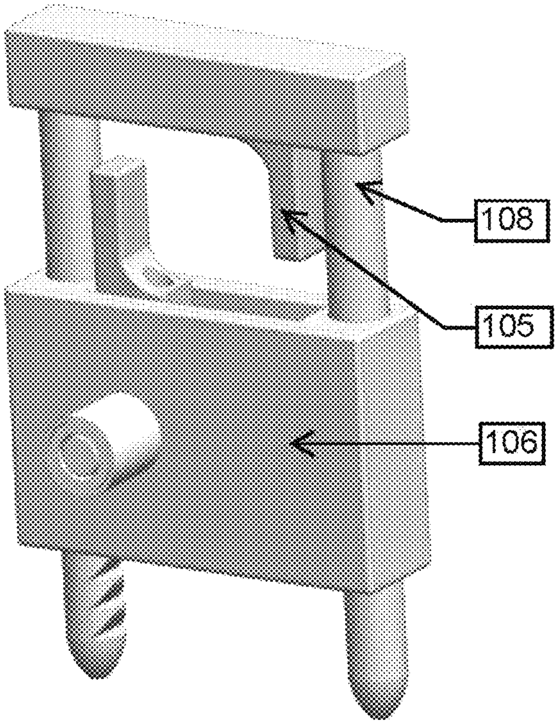

FIG. 2*a* through 2*c* shows the lock assembly (106) for circular doorknob (101). FIG. 2*a* shows the cartridge (105) of the lock assembly. FIG. 2*b* shows a tubular lock (107) on the locking assembly. FIG. 2*c* shows the shackle (108) of the lock assembly.

Figure 3A:
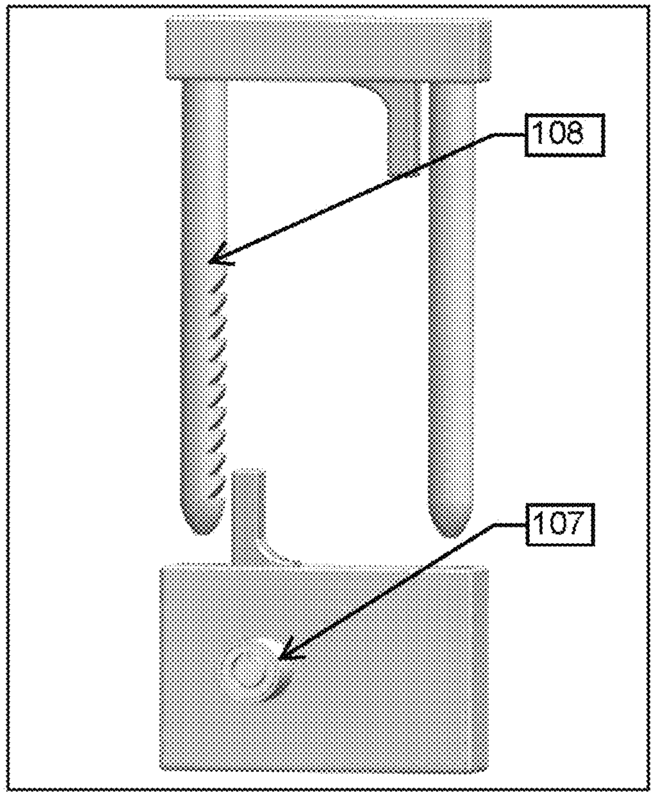
Figure 3B:
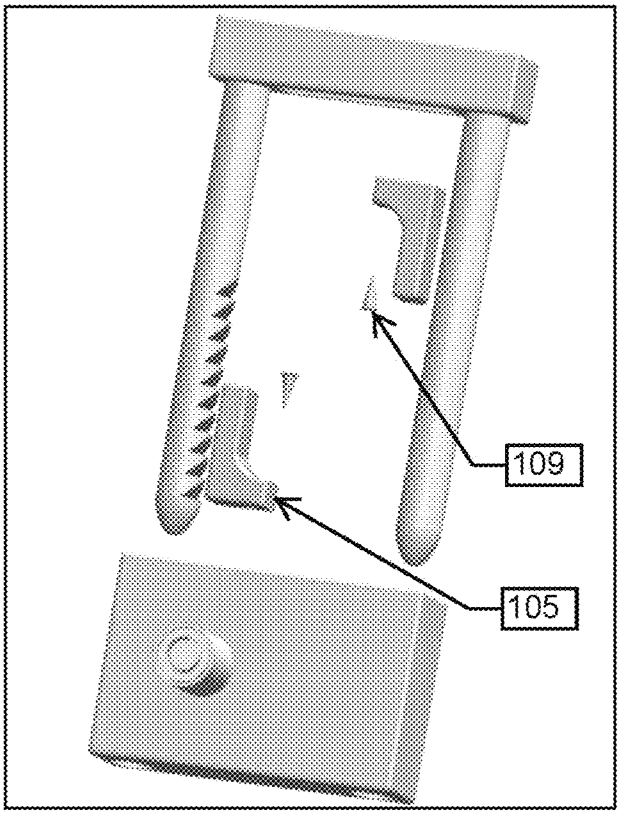
Figure 3C:
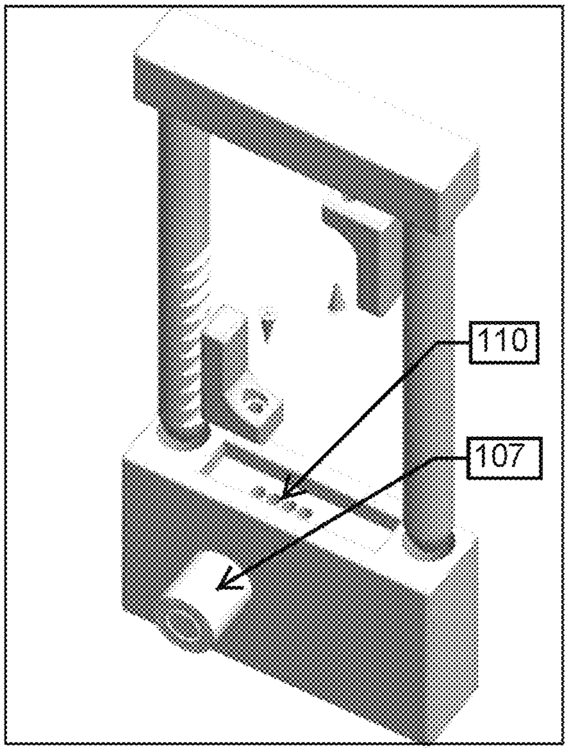
Figure 3D:
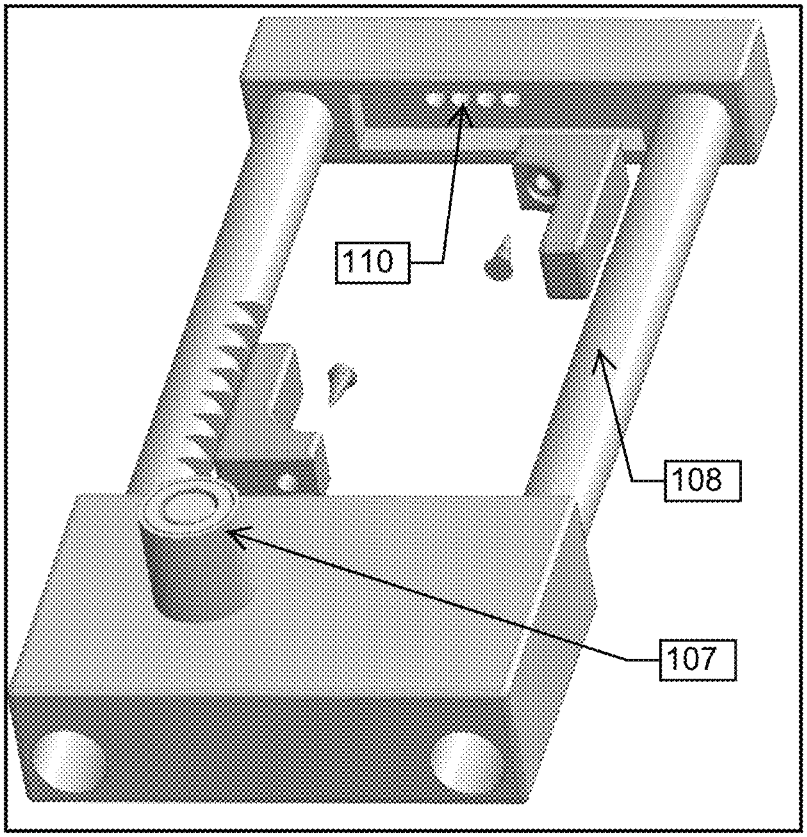
Figure 3E:
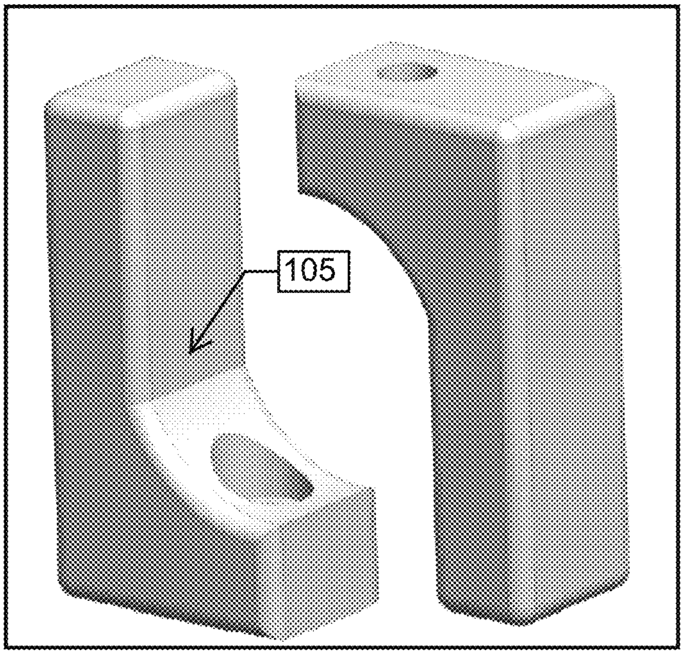

FIGS. 3*a* through 3*e* show various orientations, and exploded views of the locking assembly. FIG. 3*b* show the screws (109) which help to secure the cartridges (105). FIG. 3*c* show the many female threads (110) where the screws (109) are screwed into the top and bottom bases. There are many threads so that distances between cartridges can be adjusted to help securely connect to various dimensions and geometry of doorknobs, fixed objects or fixtures. FIG. 3*e* shows the cartridges (105) in a different view.

Figure 4A:
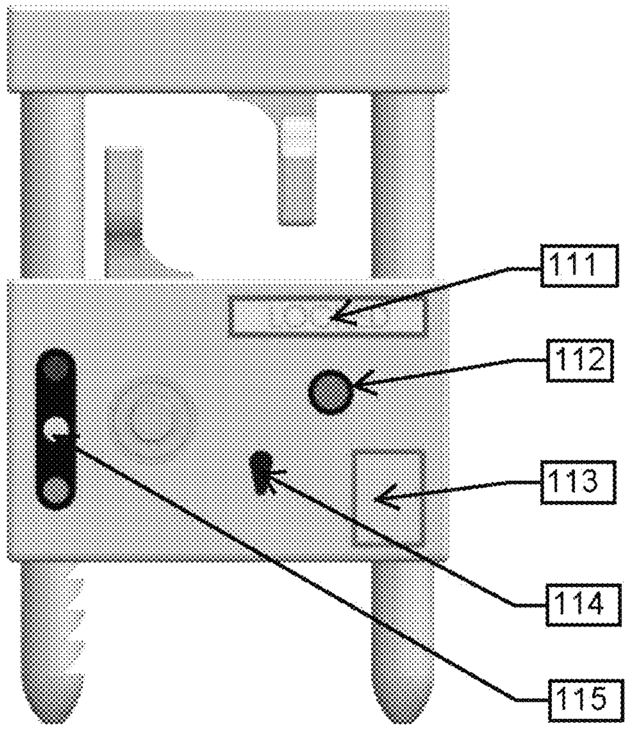
Figure 4B:
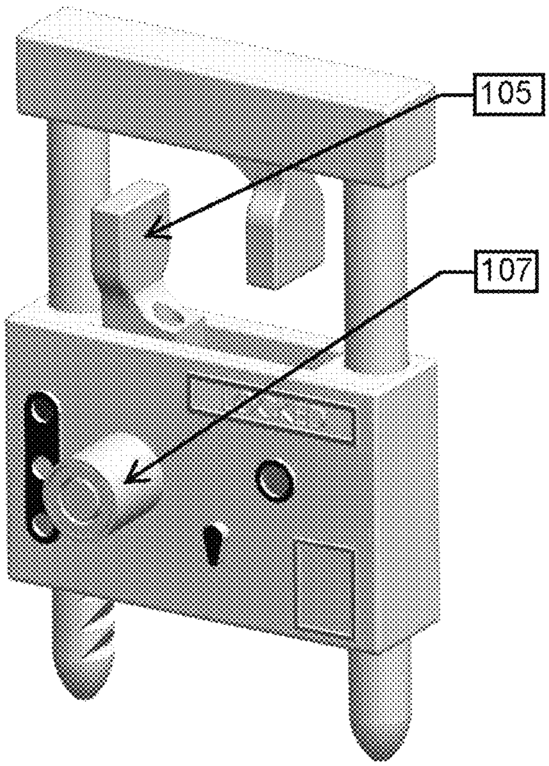
Figure 4C:
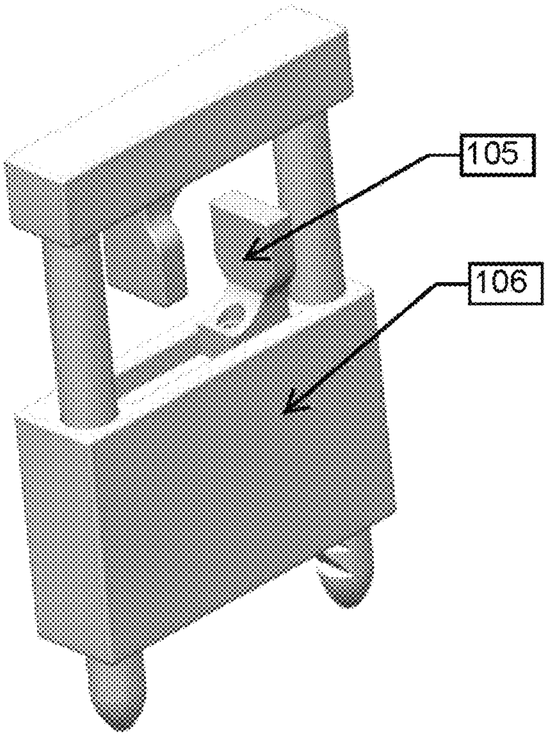

FIG. 4*a* through 4*c* show the locking assembly (106) that can be used for a straight doorknob (102). This is a lock assembly, wherein many advanced additional electronic and technological features can be integrated to the basic locking assembly described in FIGS. 2*a* to 2*c*, and FIGS. 3*a* to 3*e*. It consists of additional features like visual display (115), wireless sensor (114), biometric reader (113), camera (112) and display panel (111) as shown in FIG. 4*a*. FIGS. 4*b* and 4*c* show the cartridge (105) and key barrel (107) of the lock assembly.

Figure 5A:
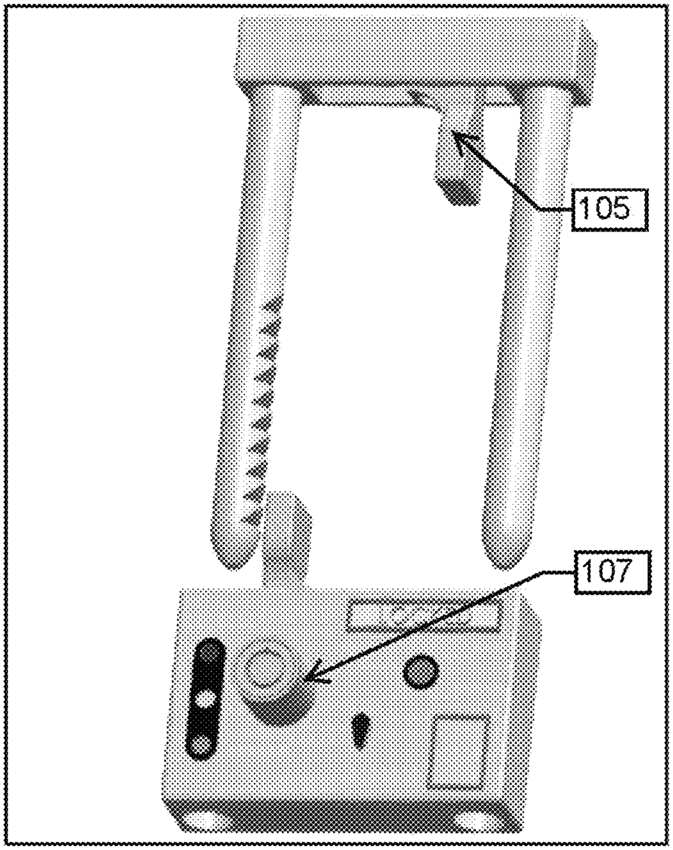
Figure 5B:
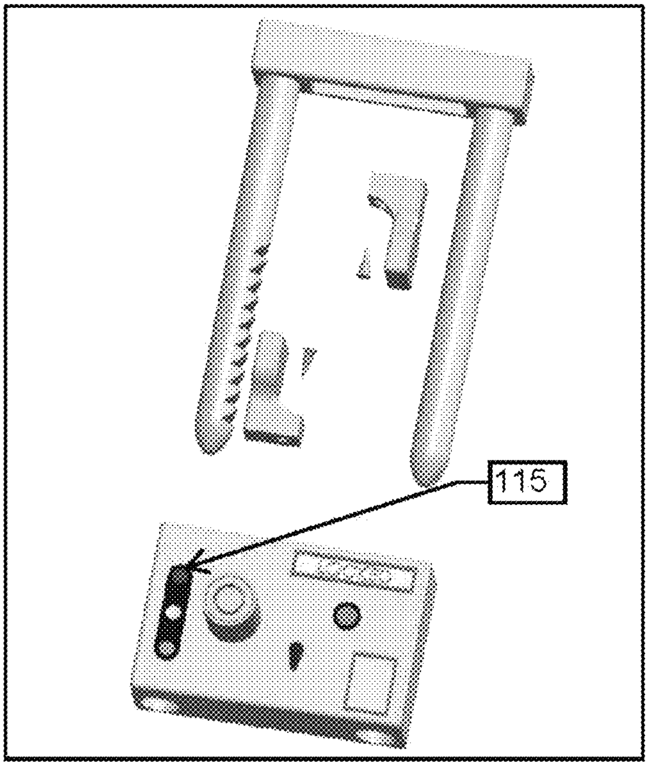
Figure 5C:
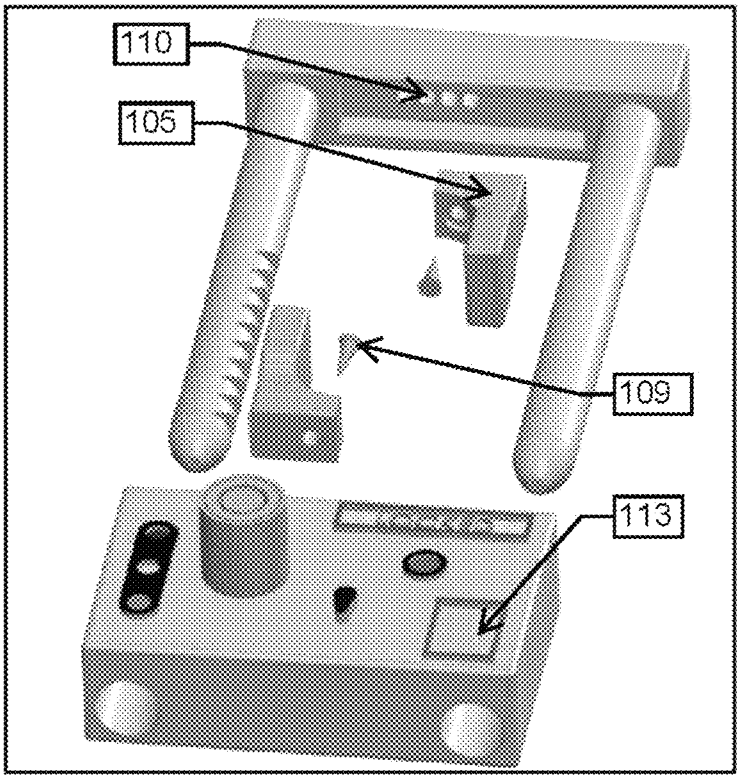
Figure 5D:
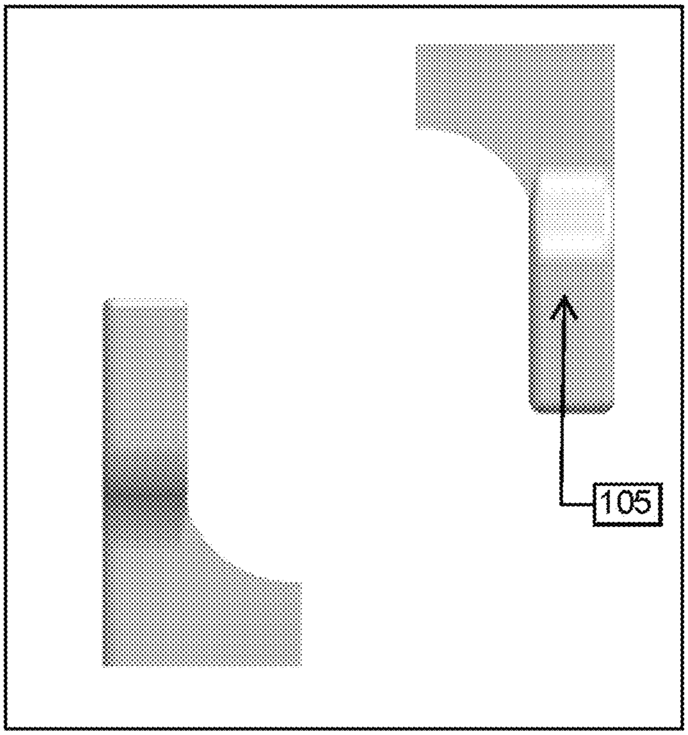
Figure 5E:
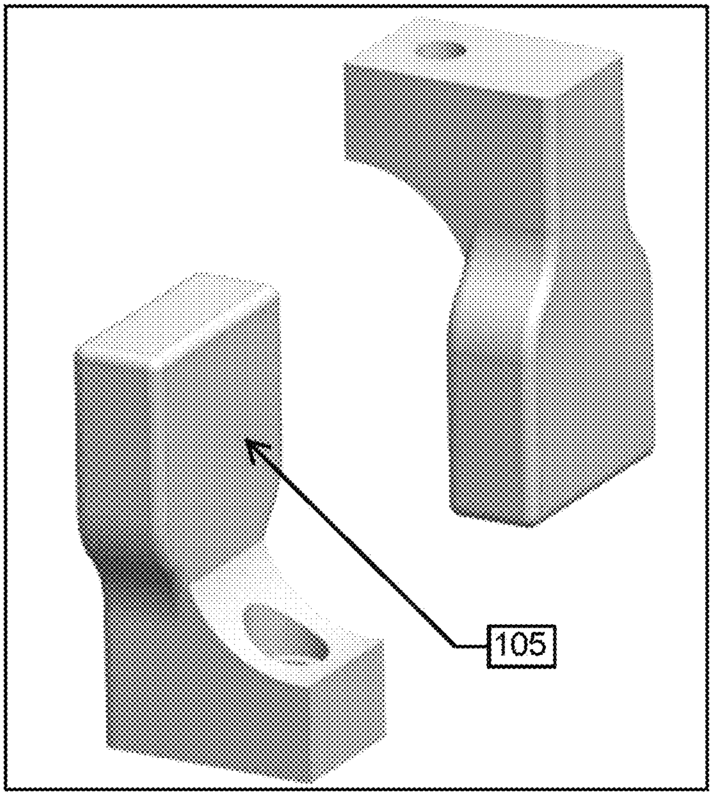
Figure 6A:
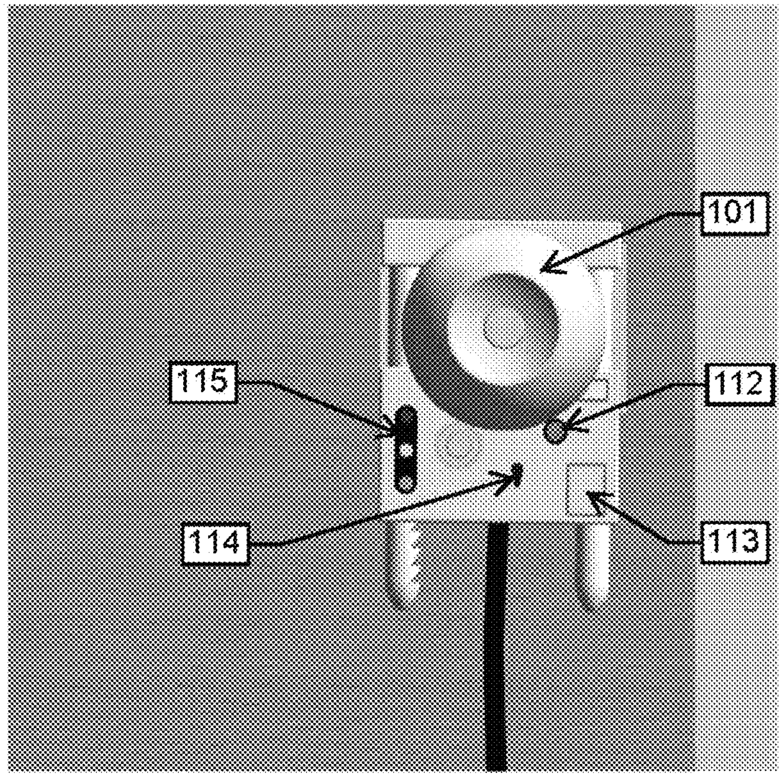
Figure 6B:
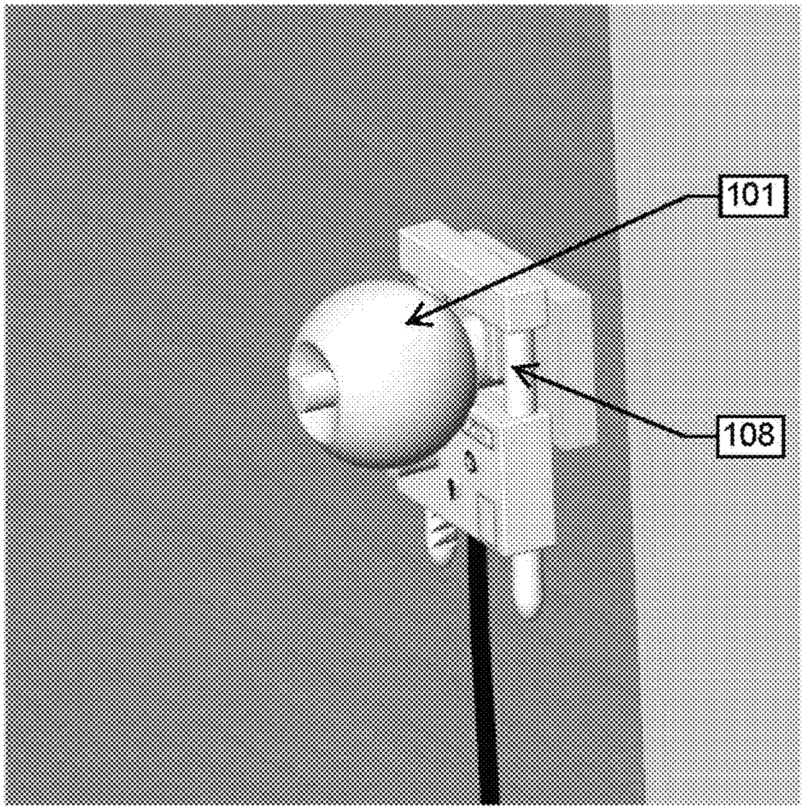
Figure 6C:
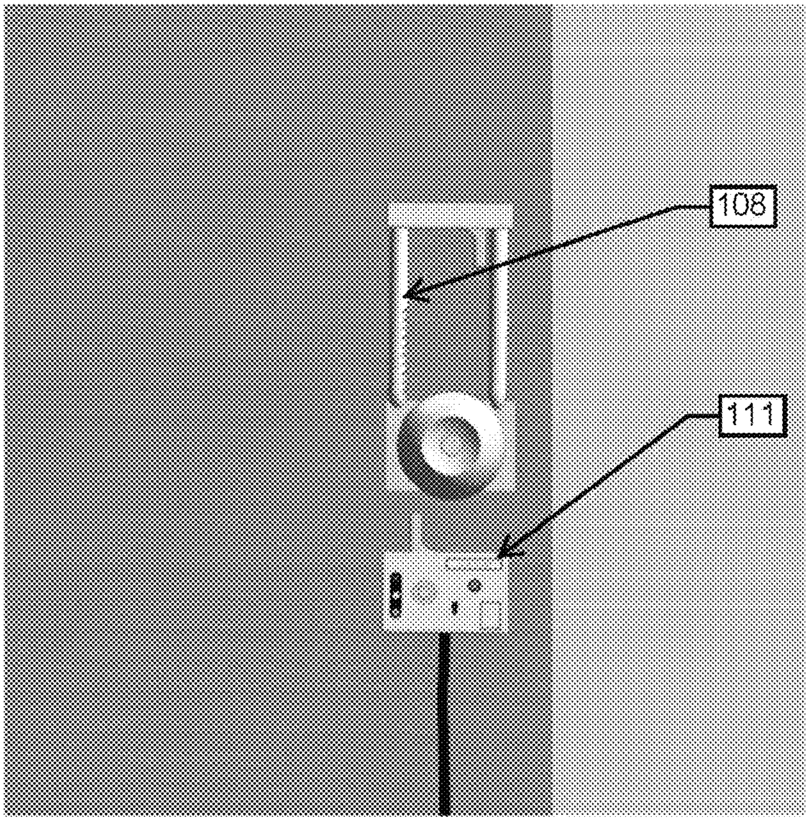
Figure 6D:
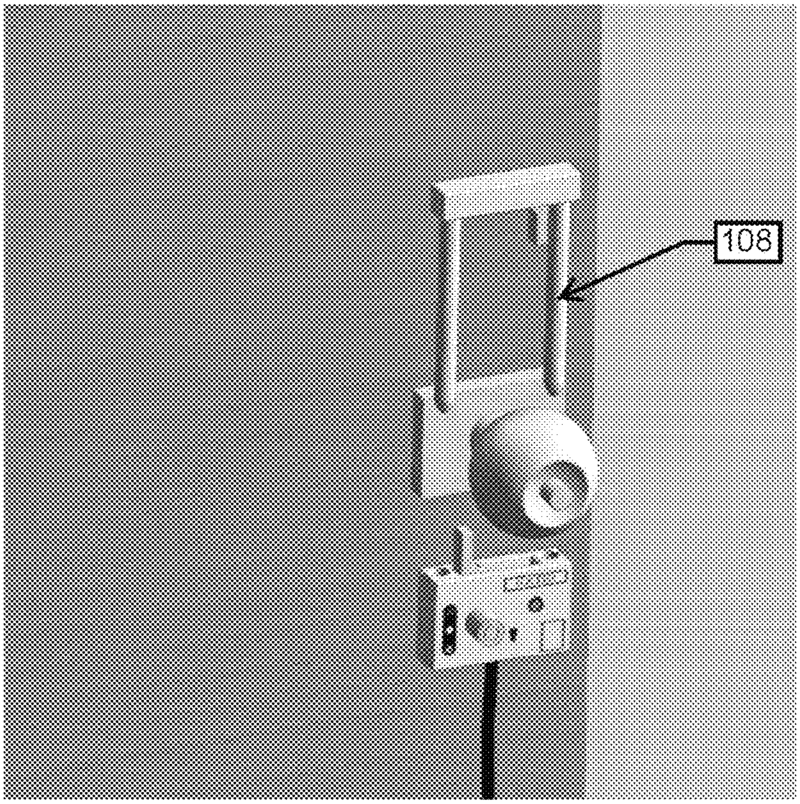
Figure 6E:
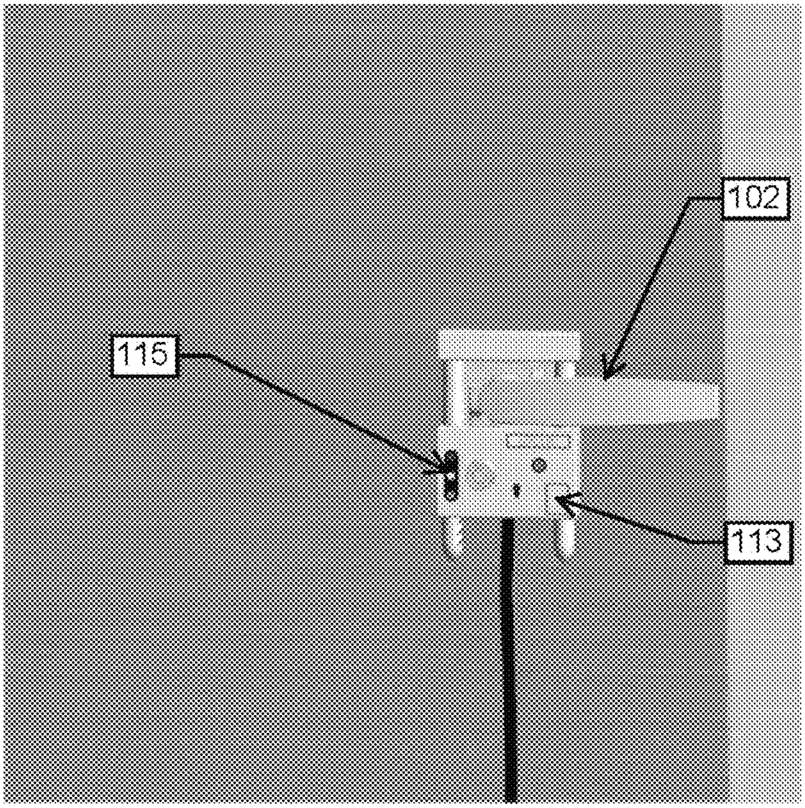
Figure 6F:
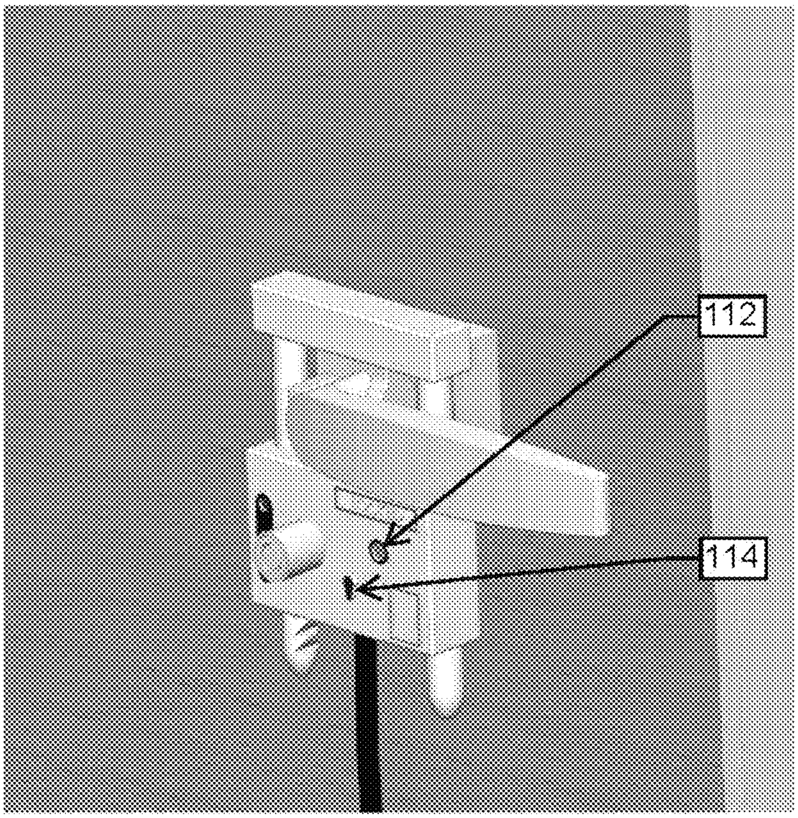
Figure 6G:
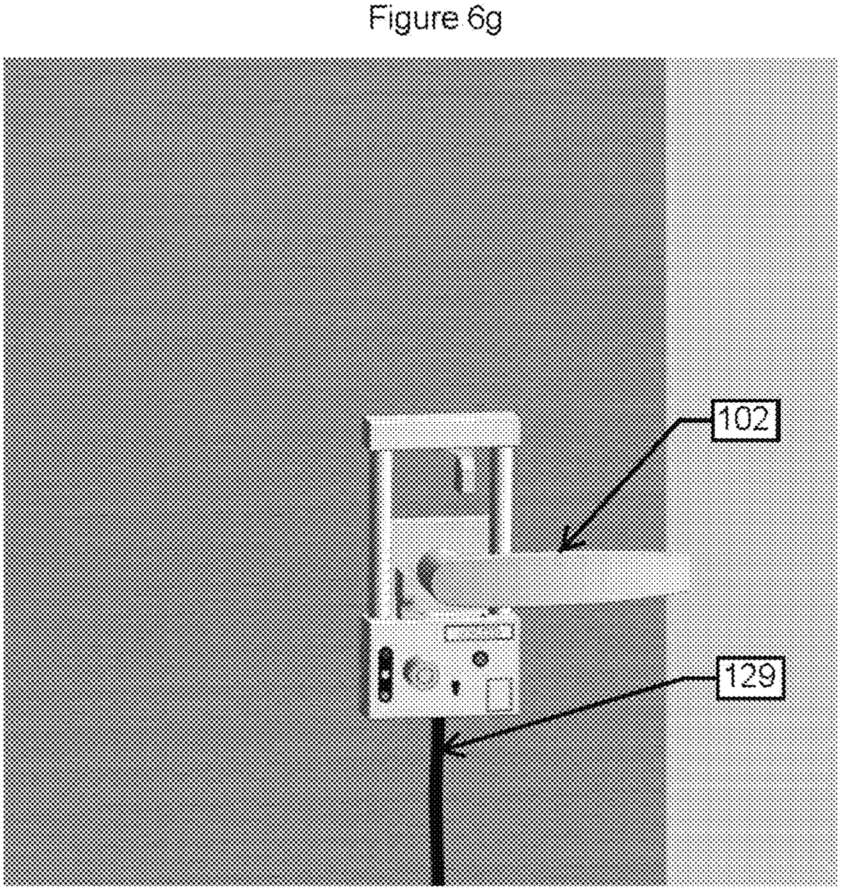
Figure 6H:
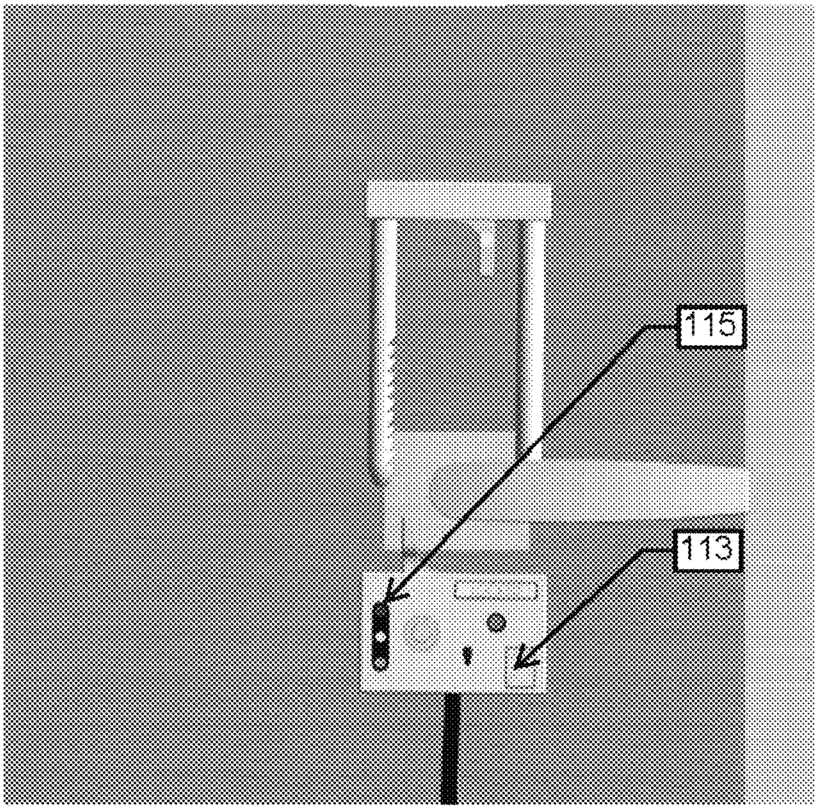
Figure 6I:
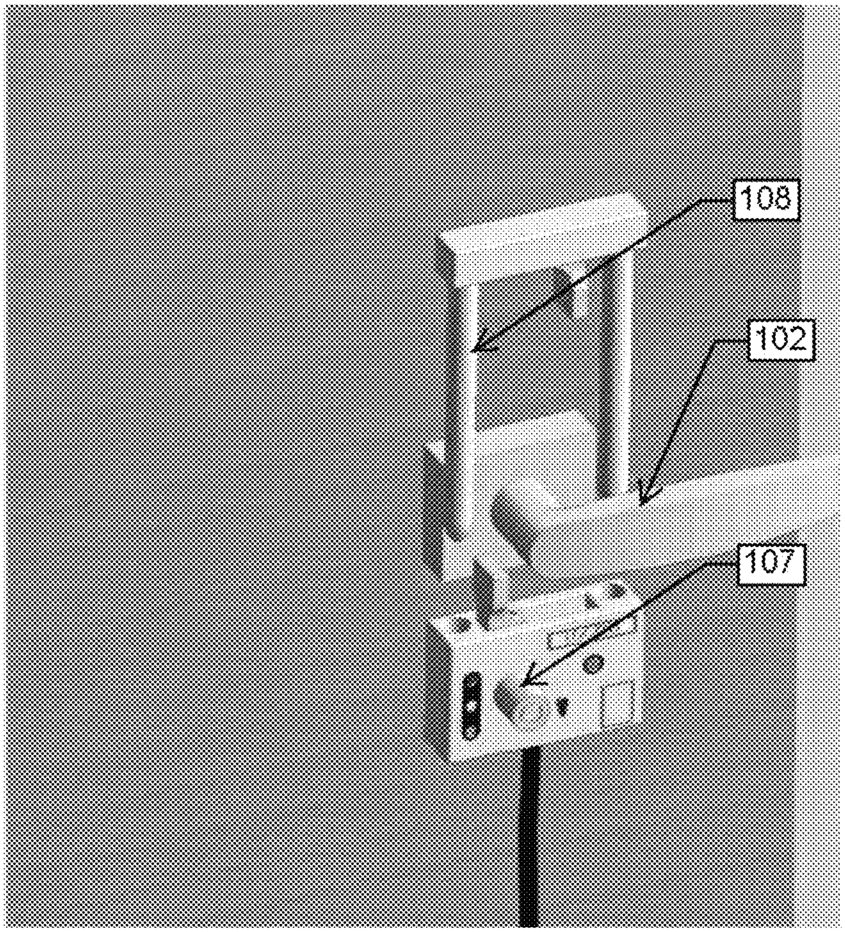

FIGS. 5*a* through 5*e* shows various views of the lock assembly. FIG. 5*c* shows the screws (109) and thread (110) of the lock assembly. FIGS. 6*a* through 6*i* shows examples of how the technology enabled locking assembly can be configured to securely connect to a circular doorknob and a straight doorknob.

Figure 7A:
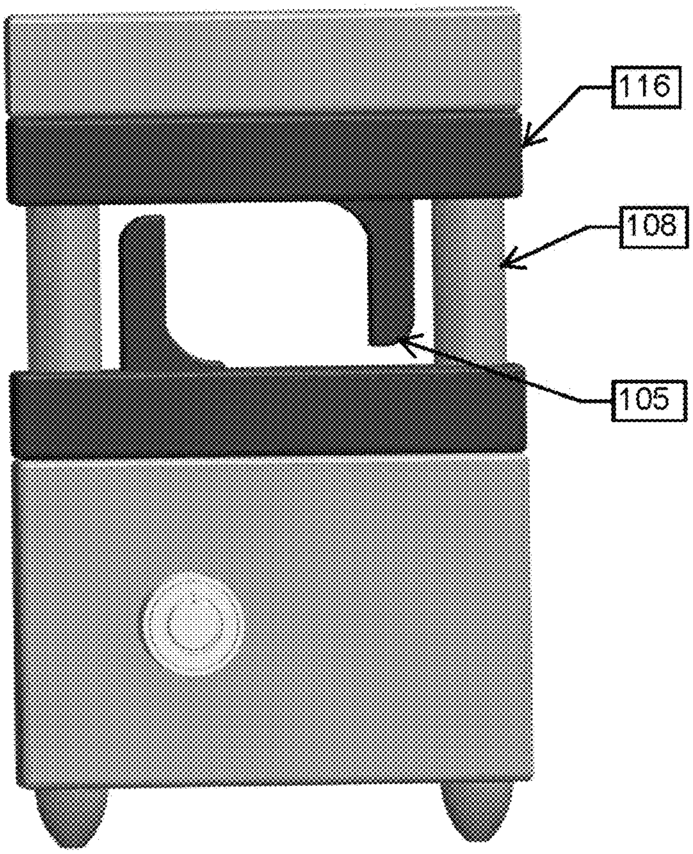
Figure 7B:
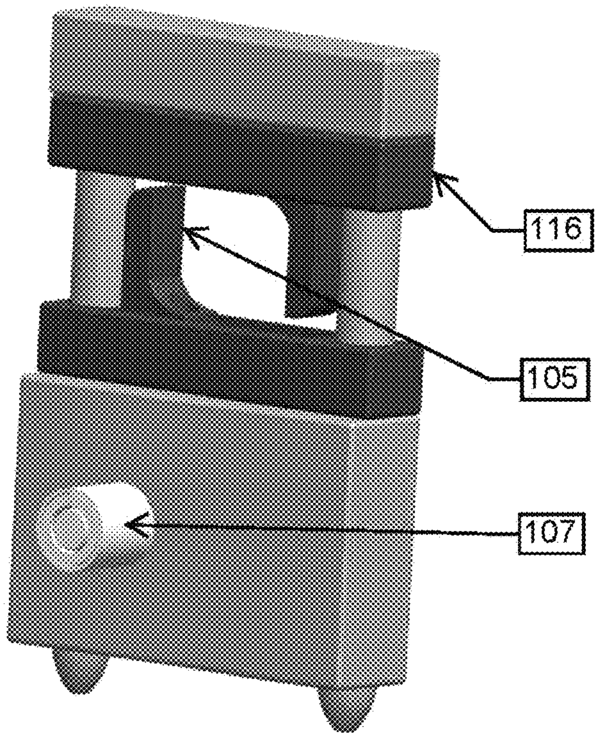
Figure 7C:
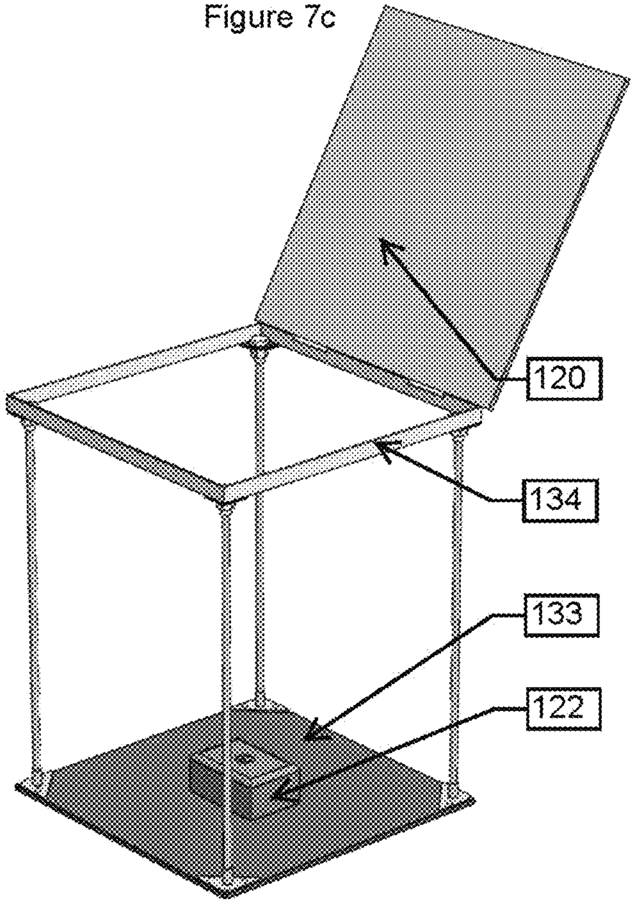
Figure 7D:
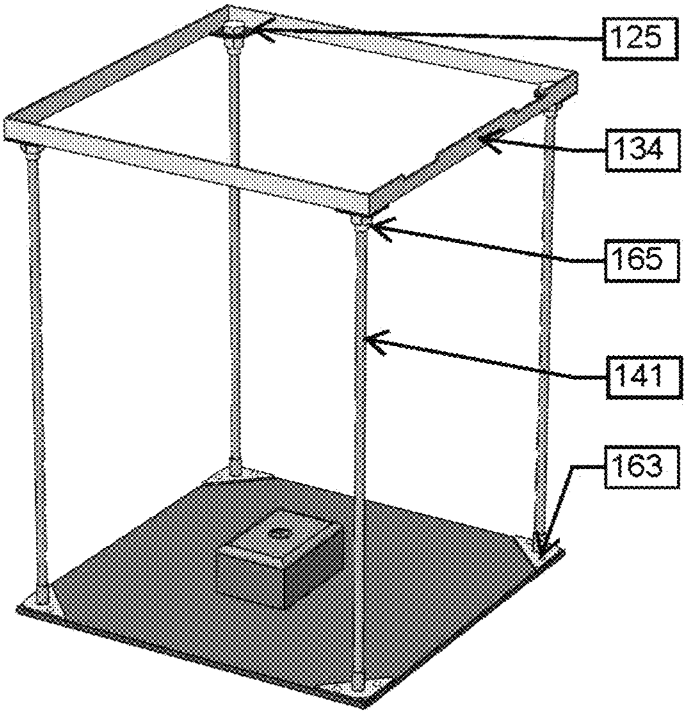
Figure 7E:
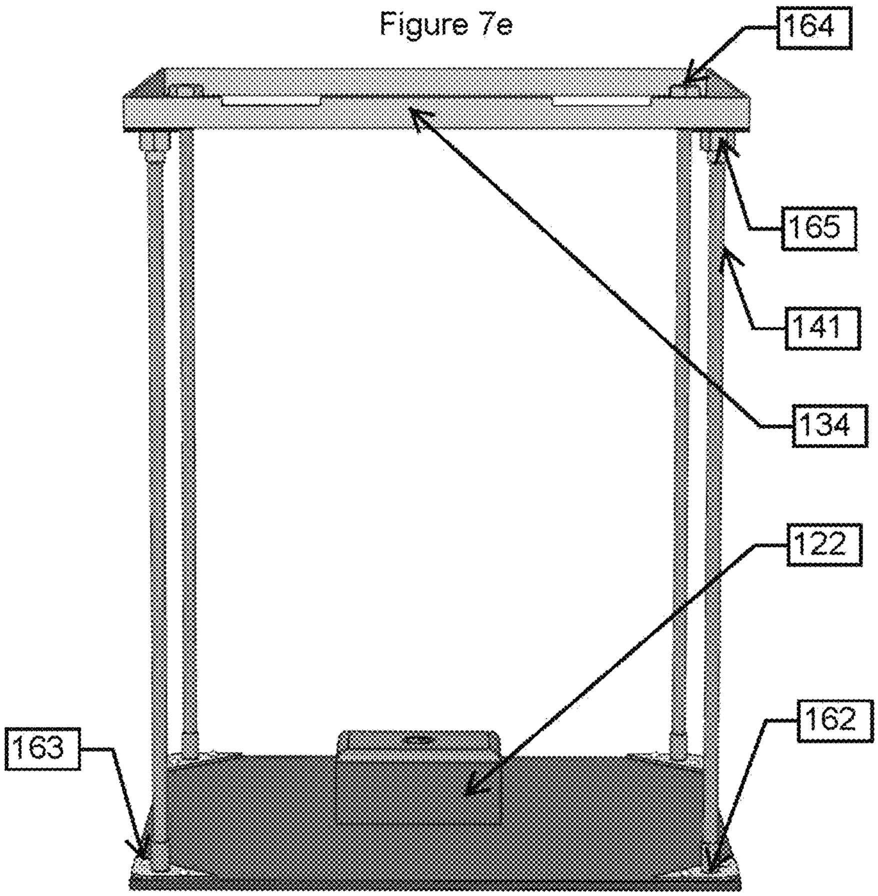
Figure 7F:
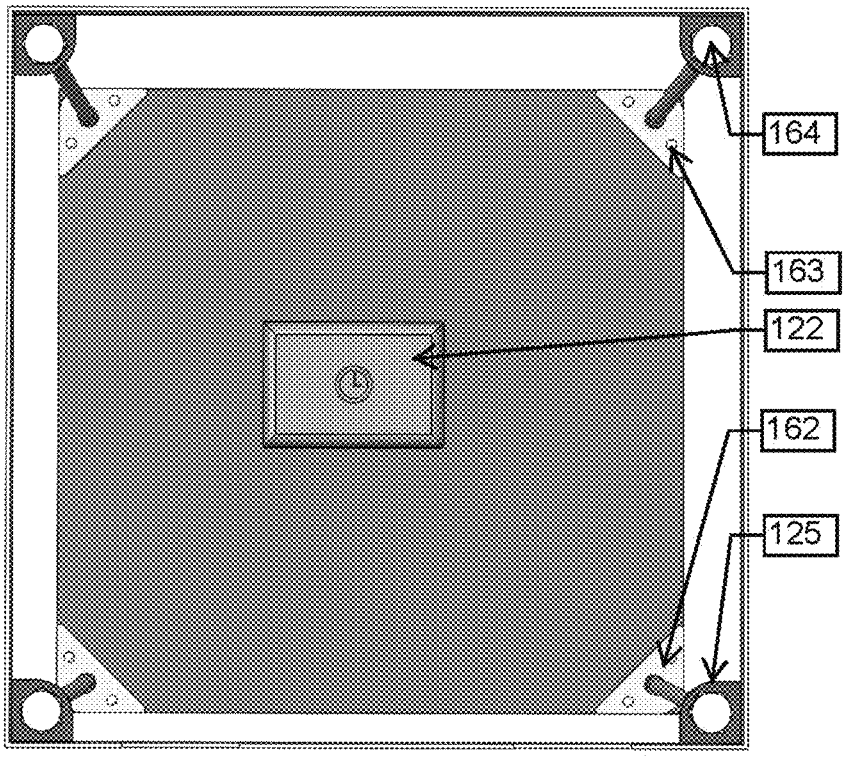
Figure 7G:
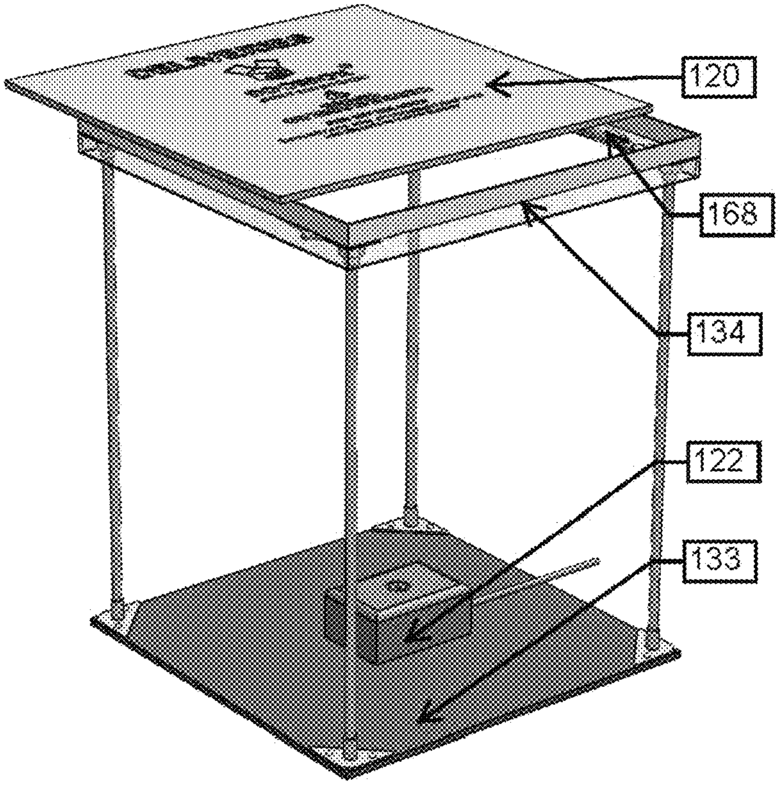
Figure 7H:
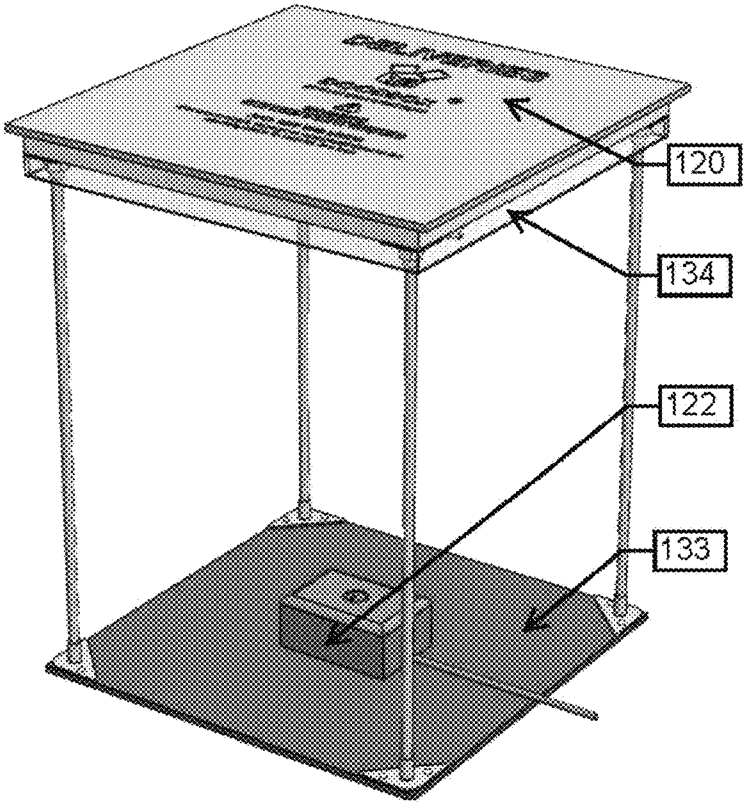
Figure 7I:
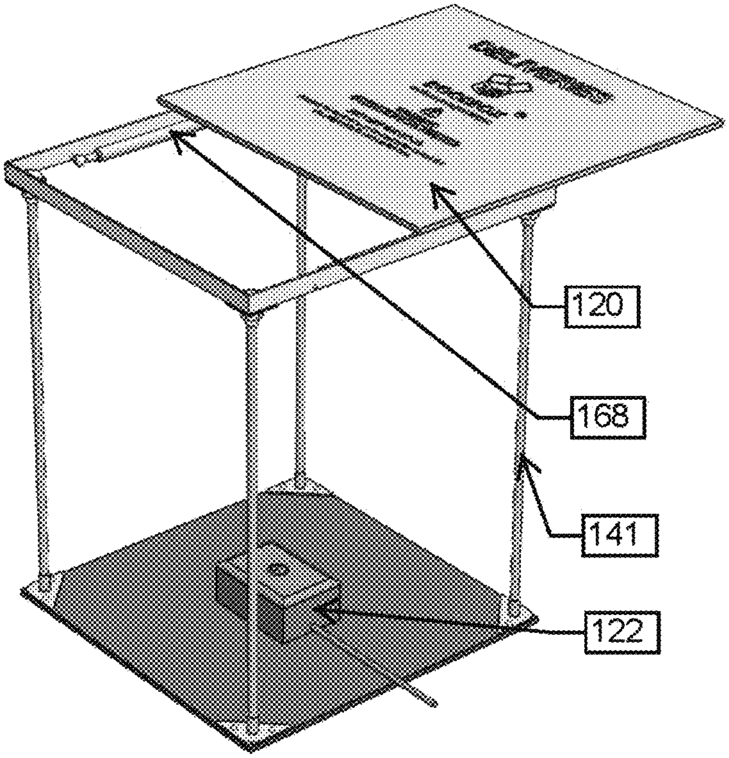
Figure 7J:
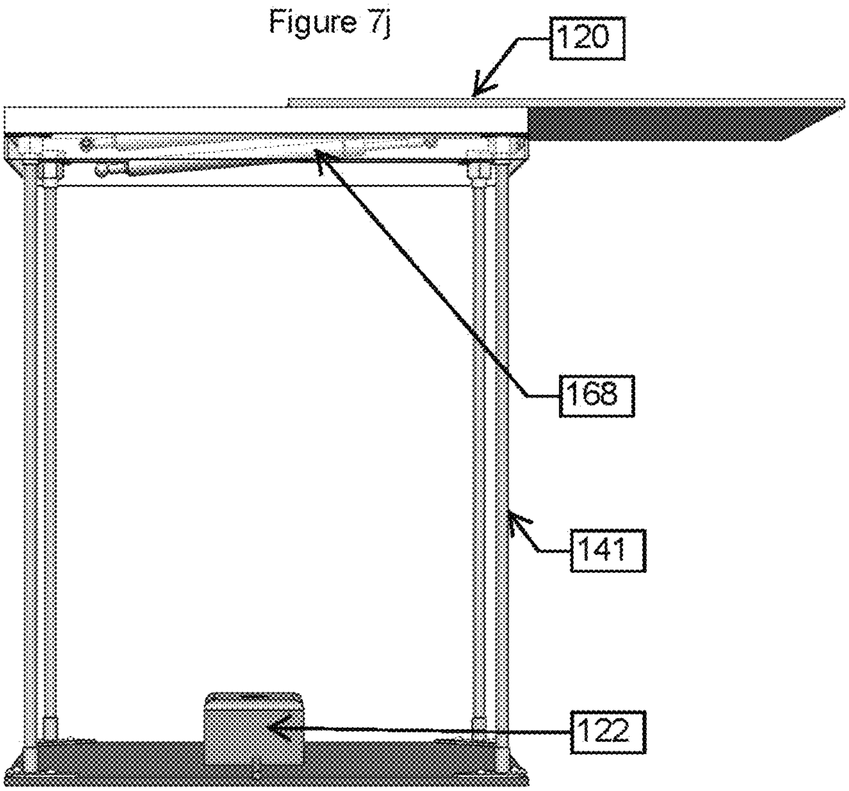

FIGS. 7*a* and 7*b* show some examples of how metal cartridges and screws which could scratch the doorknobs or stationary fixtures can be avoided by replacing them with rubber like material or some strong engineering plastics. This helps to potentially avoid scratching the surface of doorknobs or fixtures.

FIG. 7*c* through 7*f* show one unique design of our parcel receptacle (117). It consists of a lid that has a hinge on the back and that lift upwards, and many parts that are associated with the movement of the lid and parcel receptacle structure itself. This design is unique and offers several benefits. The top frame (134) can have many holes on it at difference places along its length or perimeter, and each hole can be used to mount various other devices or peripherals (e.g., camera, light, etc.) that the customer wants to use in his/her premises and this parcel receptacle design can increase convenience or utility to people.

FIG. 7*g* through 7*j* show another design of our parcel receptacle wherein the lid can move horizontally from front toward back. Please note that this sliding movement of the lid is for illustration purposes only and can be easily configured to move in all directions either horizontally or vertically just by altering the hinges and sliding rack. The lid and the support structure can be configured to slide horizontally left to right or right to left, front to back or back to front, thereby providing access to place and retrieve packages or content into parcel receptacle.

Figure 8A:
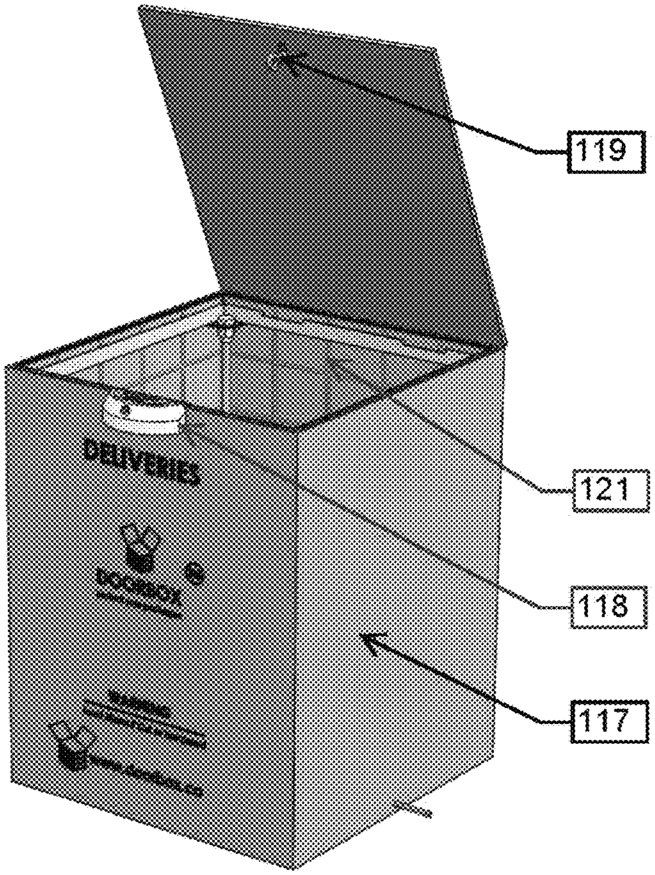
Figure 8B:
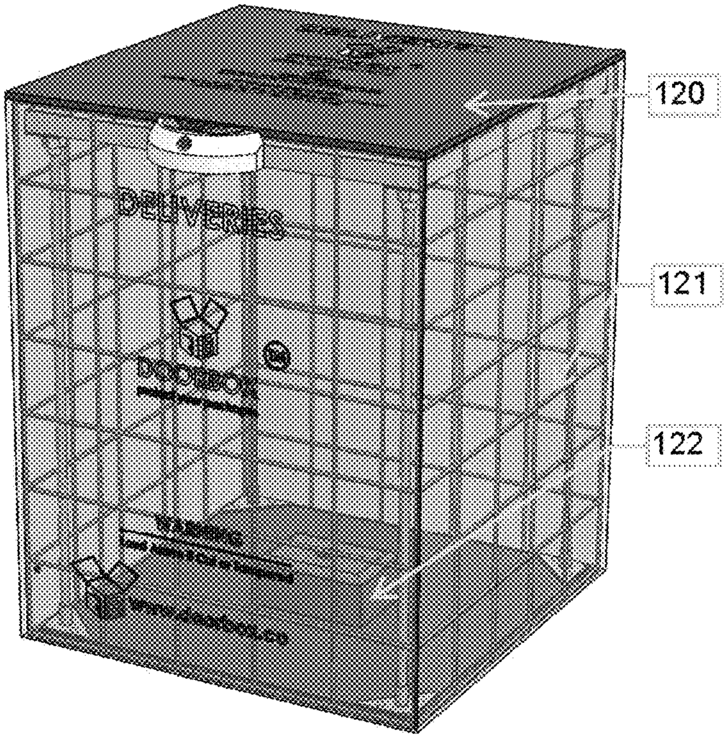
Figure 8C:
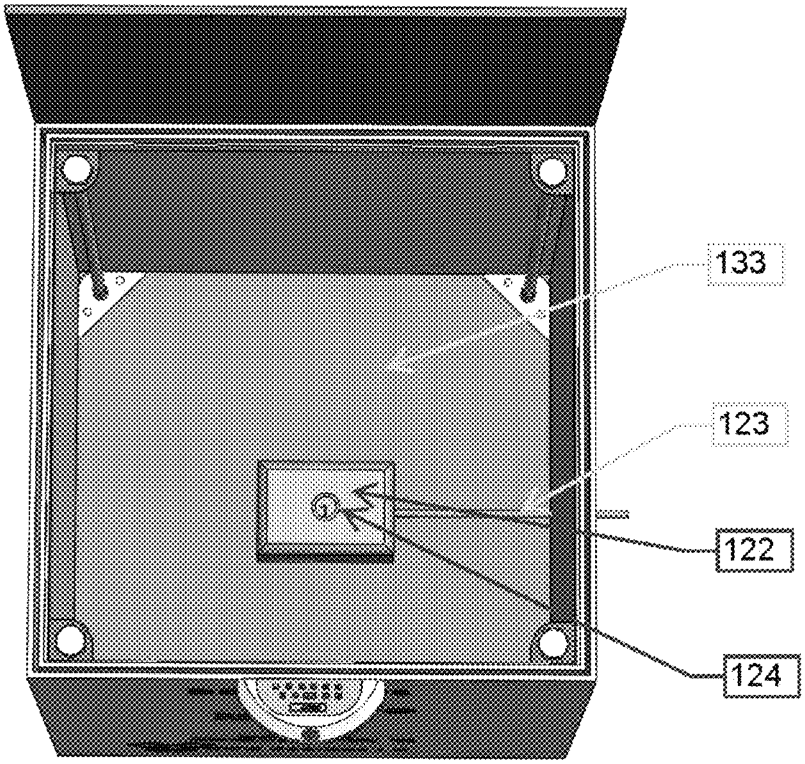
Figure 8D:
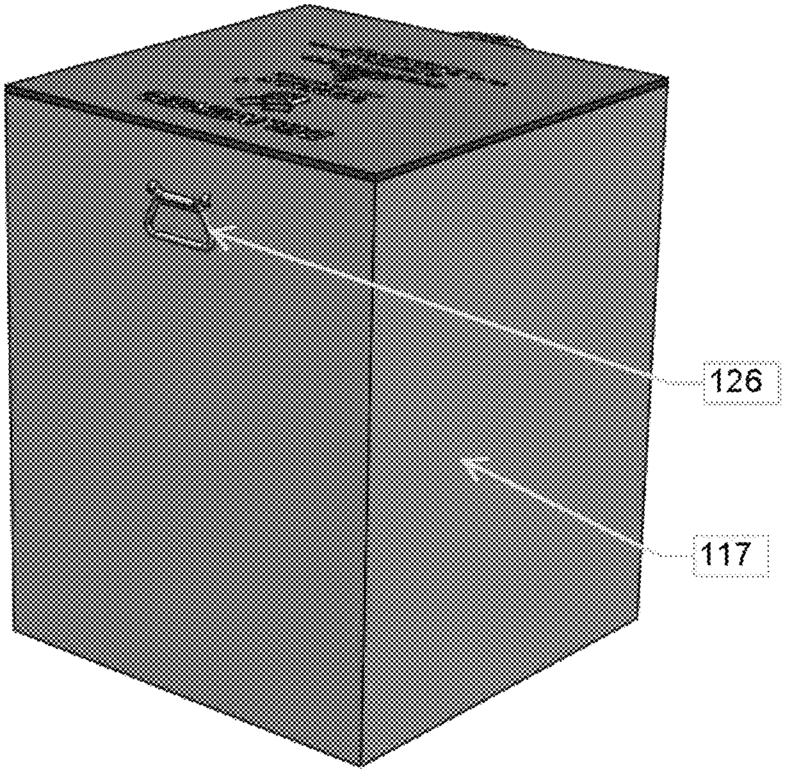
Figure 8E:
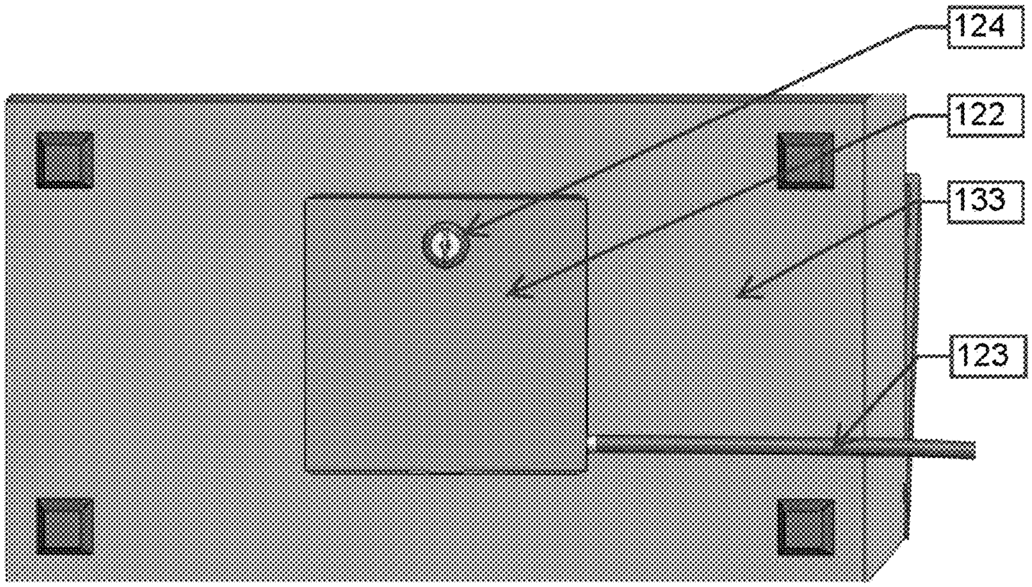

FIGS. 8*a* through 8*h* show the inner and outer layers that can be added to the parcel receptacle design thereby the security of its content inside can be increased. For example, as shown in FIG. 8*a*, the parcel receptacle can have steel mesh (121) like structure that are difficult to cut, yet that provides good flexibility to fold and reduce the shipping cost. Similarly, to enhance security, the parcel receptacle can have conductive wires (123) around them, thereby, if anyone cuts or tampers with it, the discontinuity is created, thereby triggering an audible alarm or an event that can be processed as a safety threat or tampering event to the parcel receptacle.

FIG. 9*a* through 10*b* shows examples of parcel receptacle when it is placed in front of various types of properties. The parcel receptacle in these types of circumstances can be configured to detect and identify various types of images that is exposed to it, and to process those using image recognition software, and identify them as noteworthy events and act accordingly based on the type of event. For example, the images can be classified into various categories such as packages, trucks, cars, dogs, cats, humans, etc., and humans can be further classified into delivery personnel (based on their dress color, pattern, or from their previous authenticated deliveries, etc.), and trucks or cars can be classified into delivery trucks (for example a brown truck with a UPS logo can be used as a form of authentication), etc. and these images can be further processed by one or more software and subsequent actions can be performed.

Figure 11A:
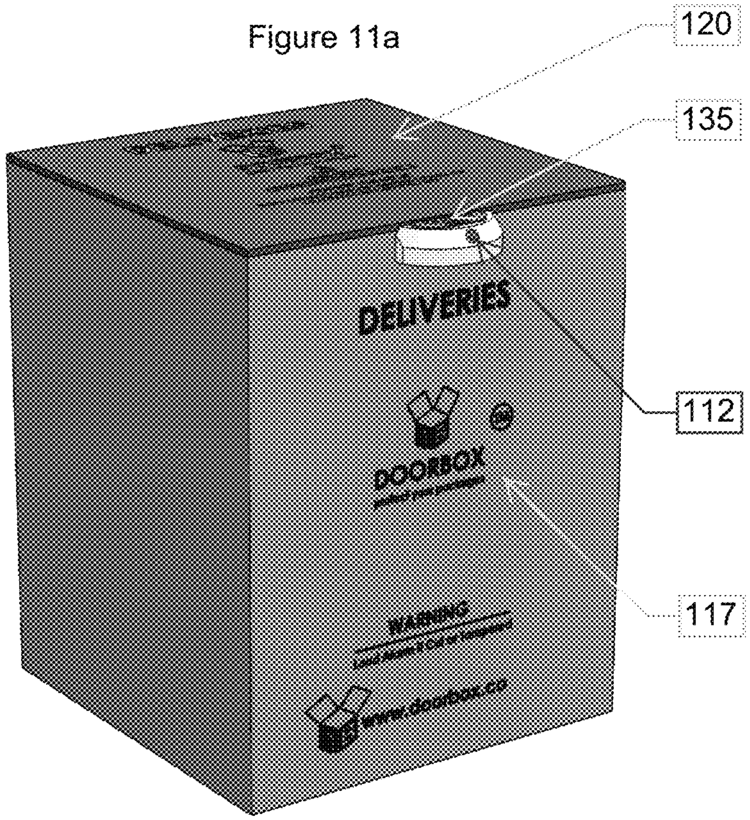
Figure 11B:
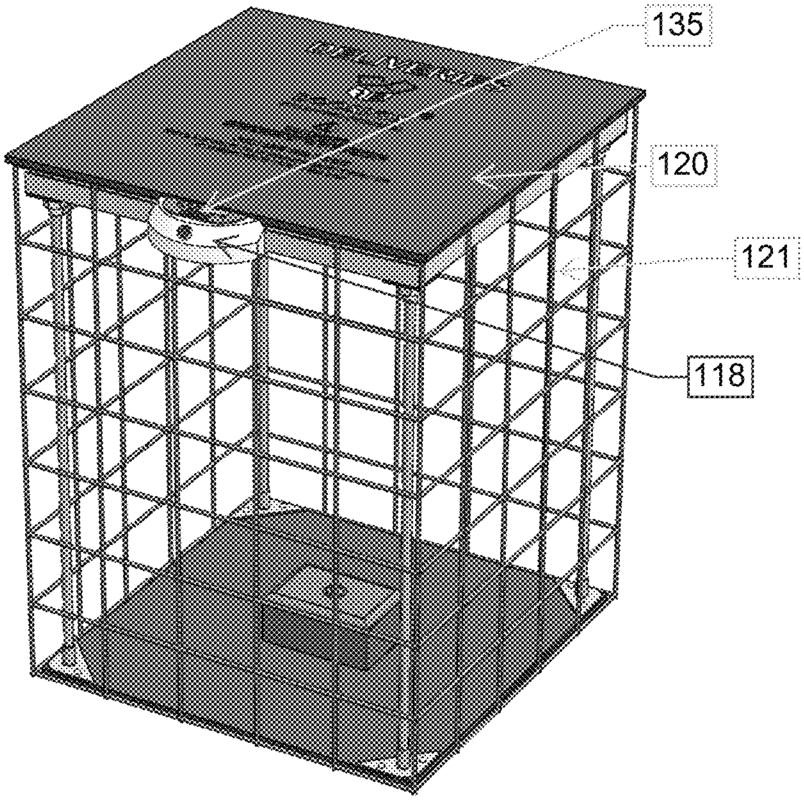
Figure 11C:
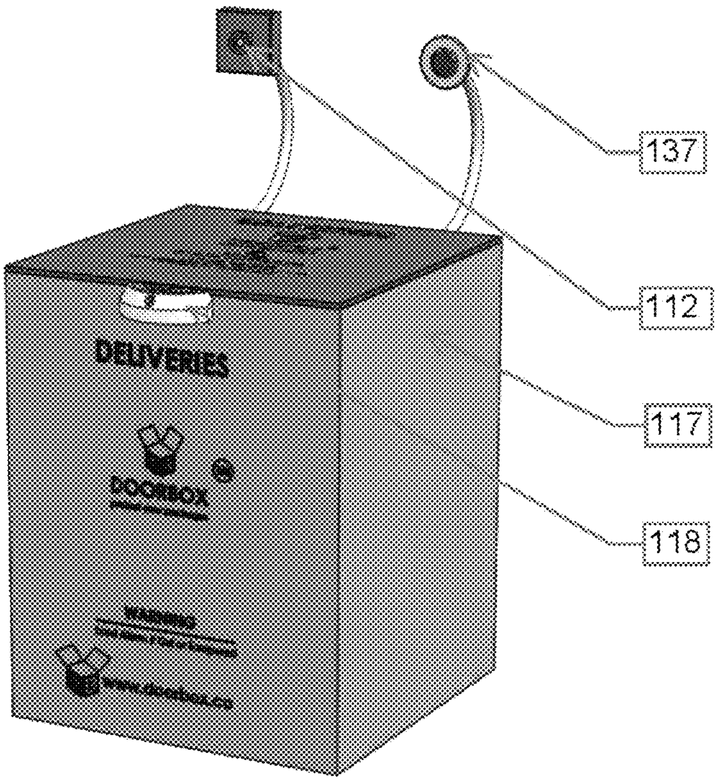
Figure 11D:
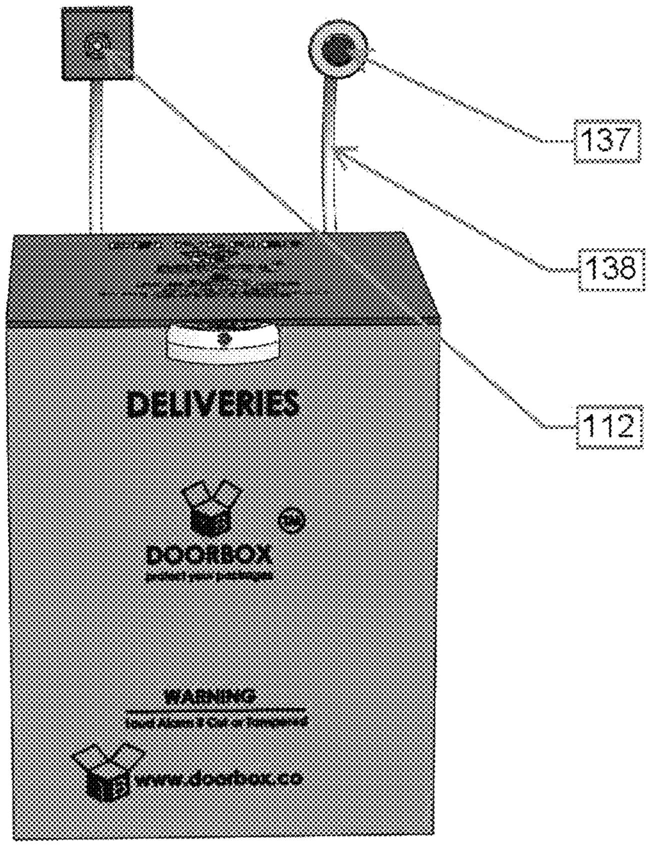
Figure 11E:
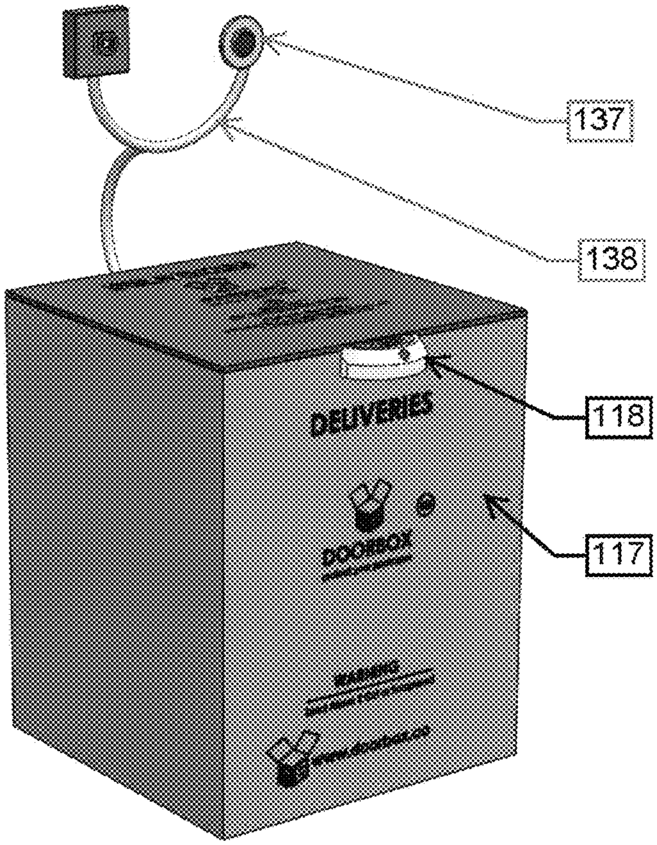
Figure 11F:
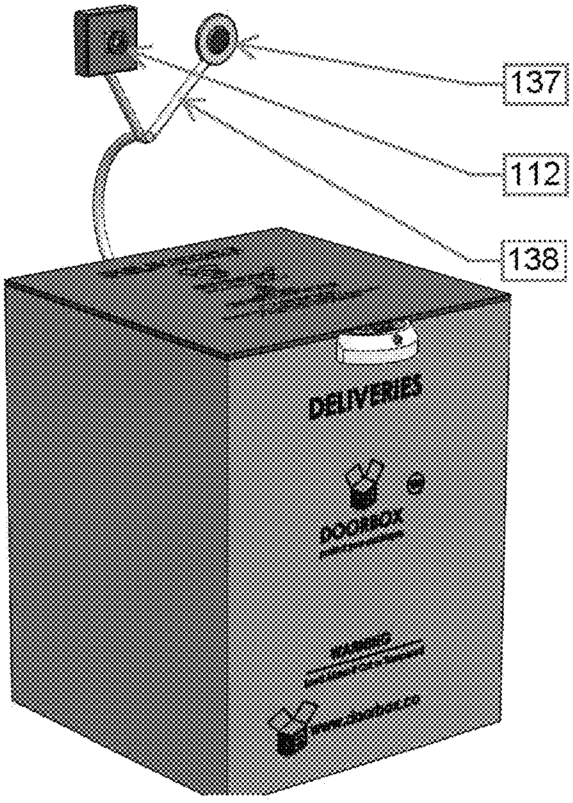
Figure 12A:
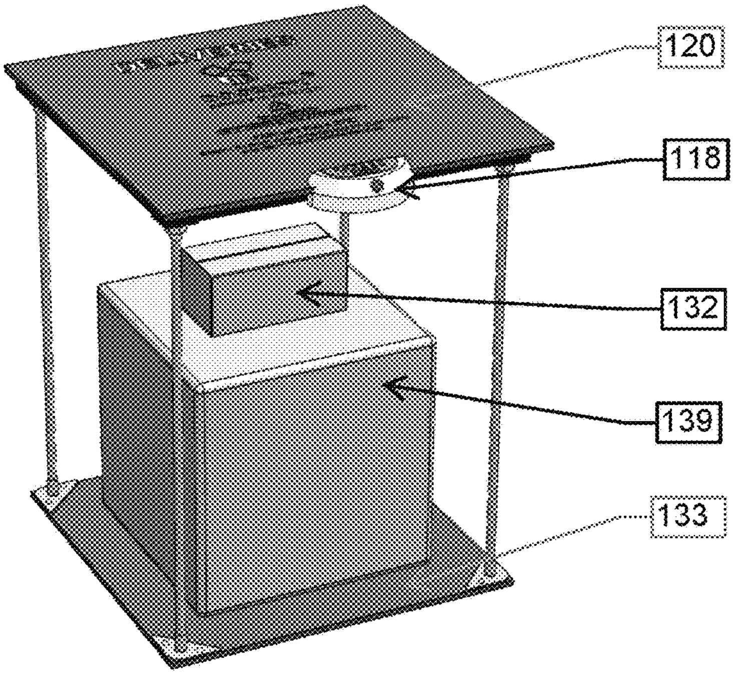
Figure 12B:
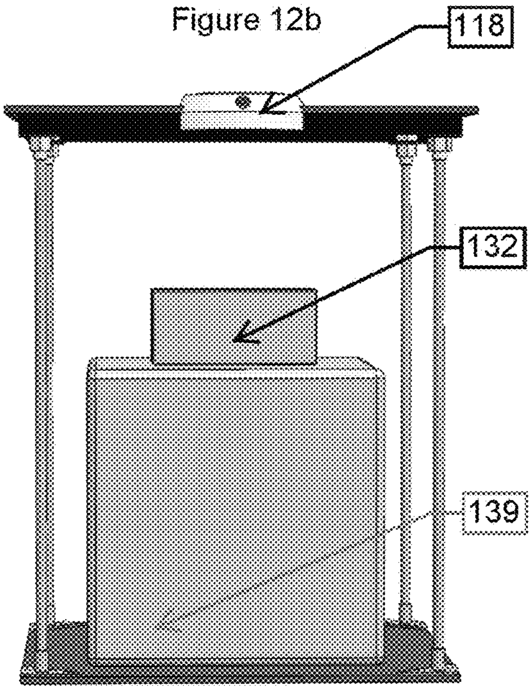
Figure 12C:
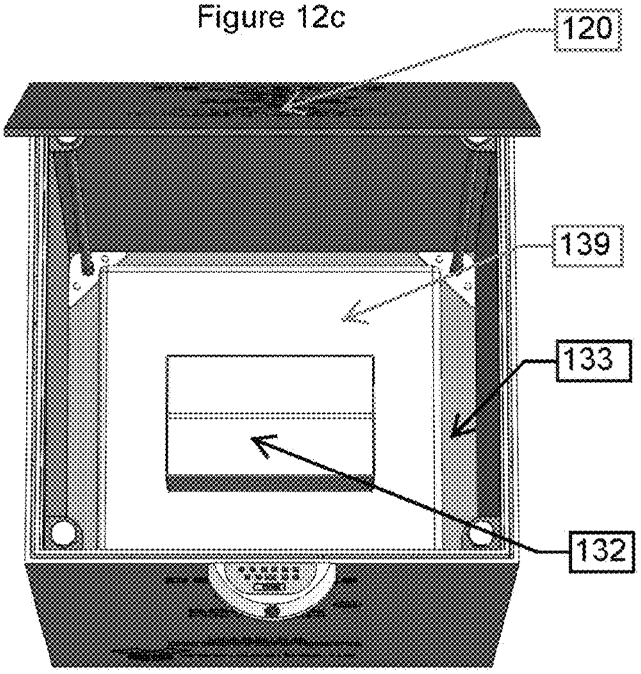
Figure 12D:
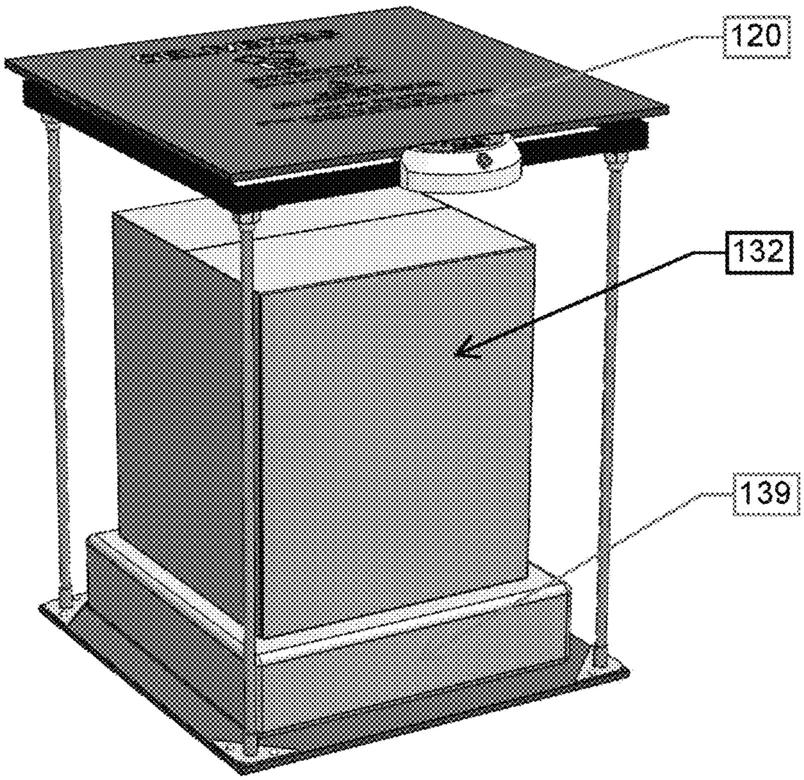
Figure 12E:
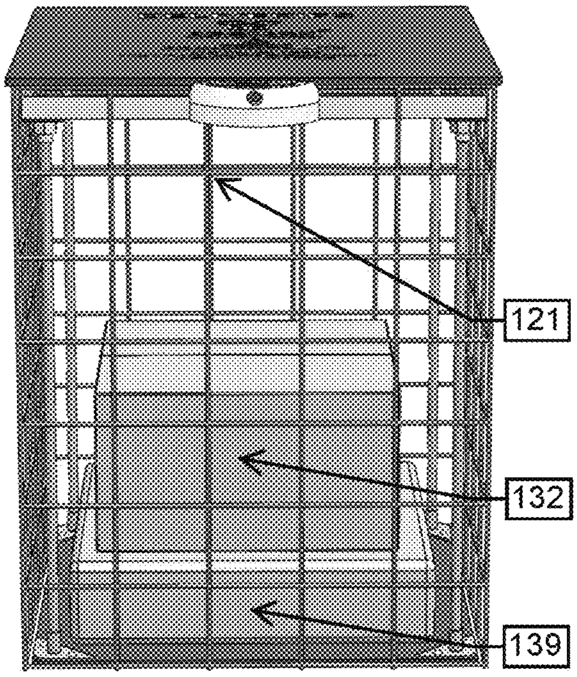
Figure 12F:
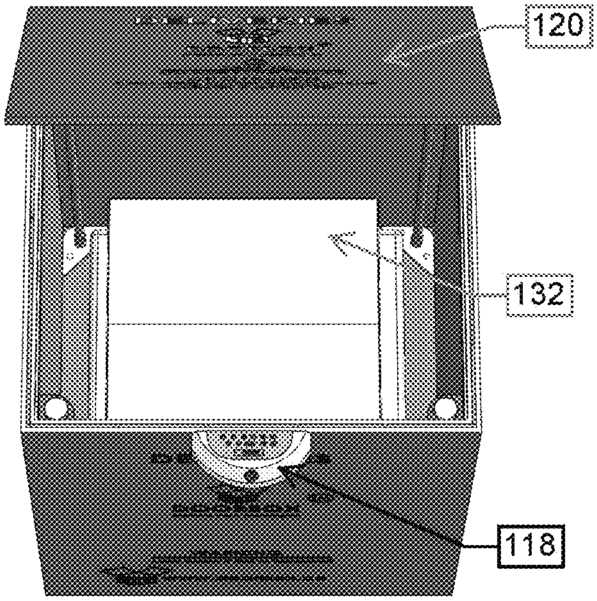
Figure 13A:
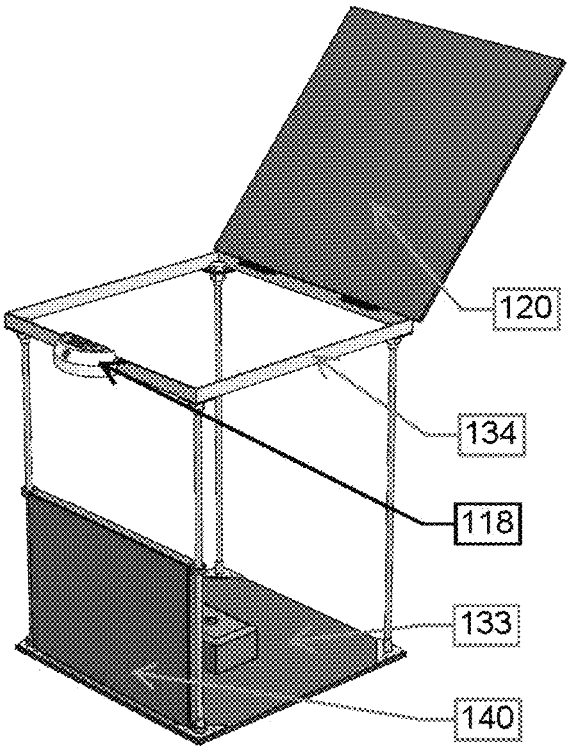
Figure 13B:
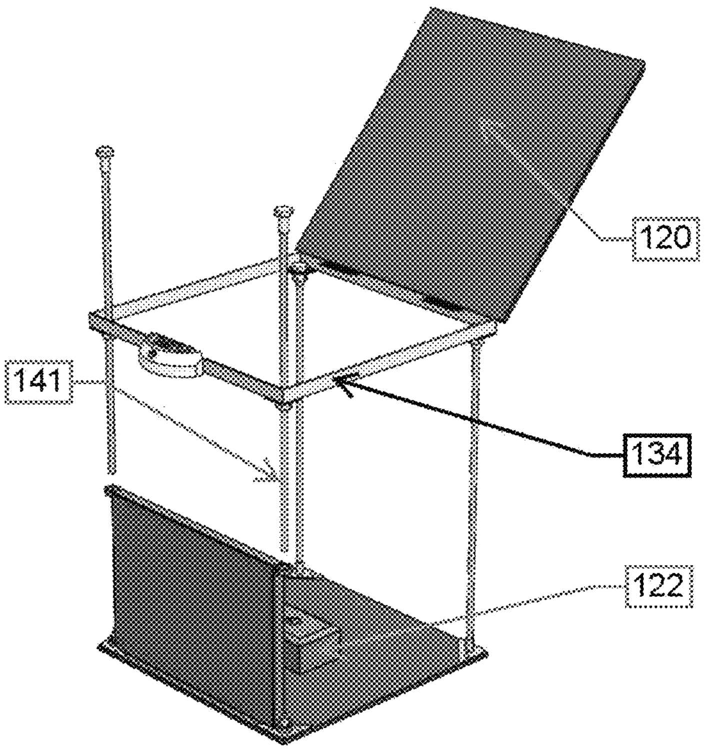
Figure 13C:
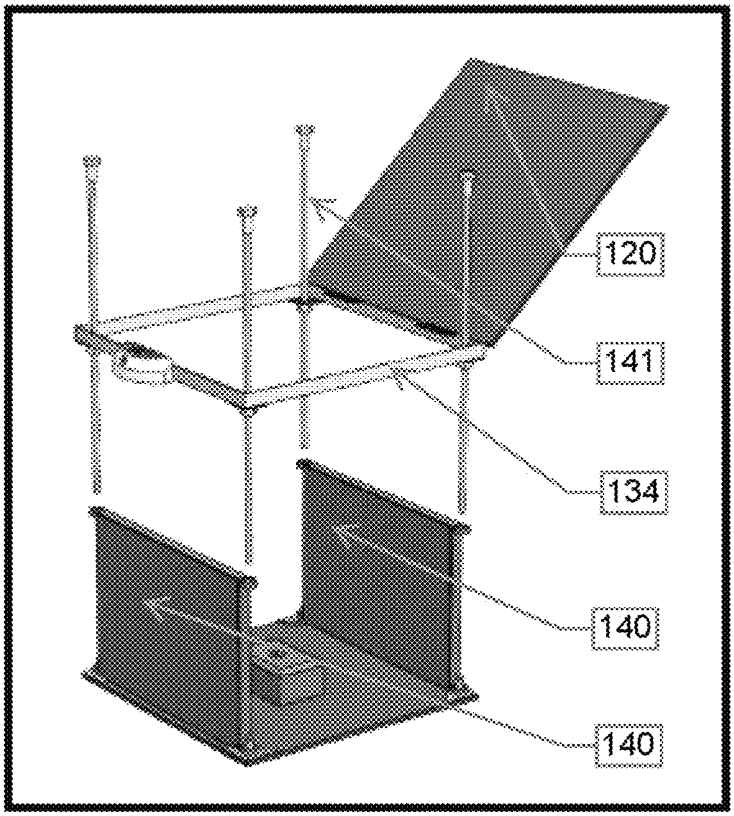
Figure 13D:
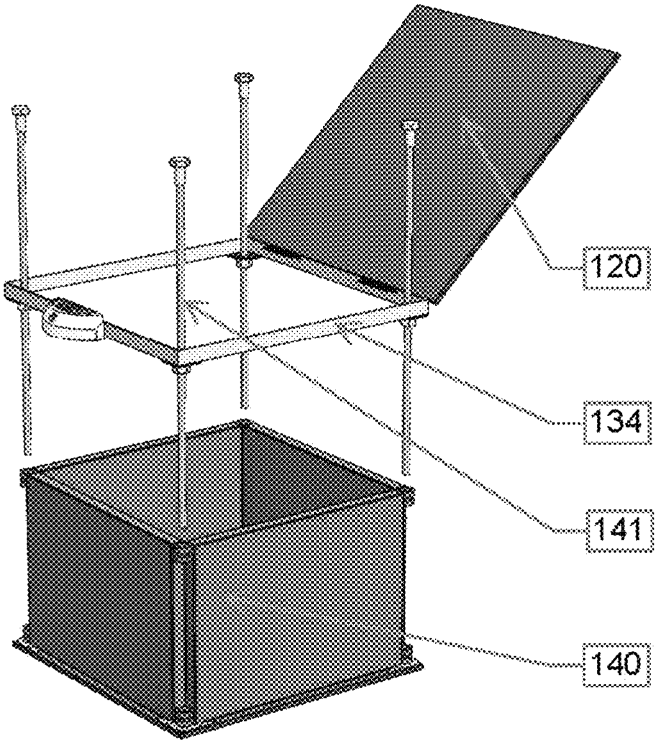
Figure 13E:
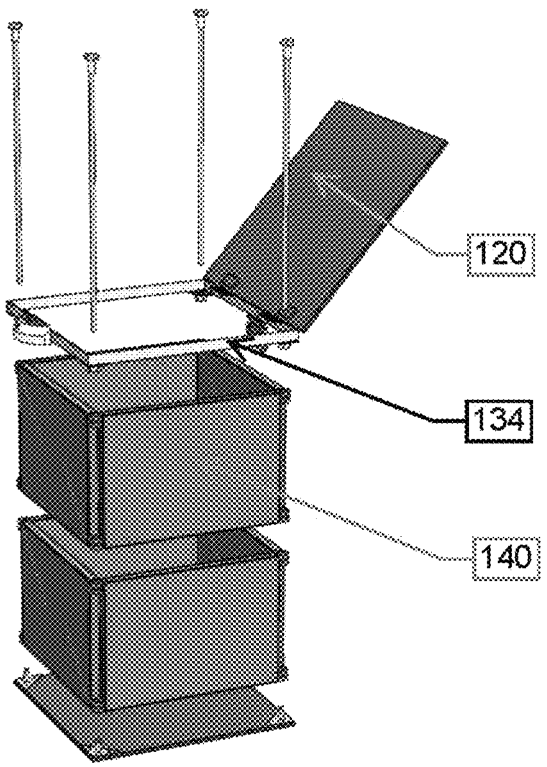
Figure 13F:
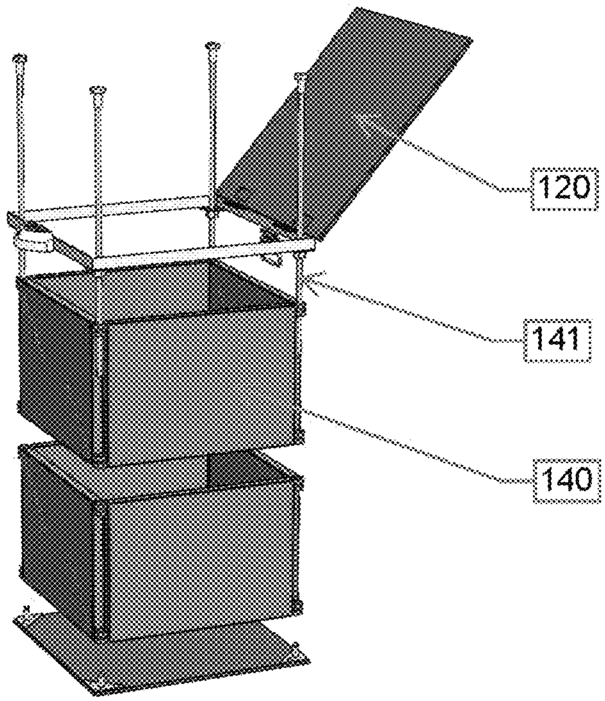
Figure 13G:
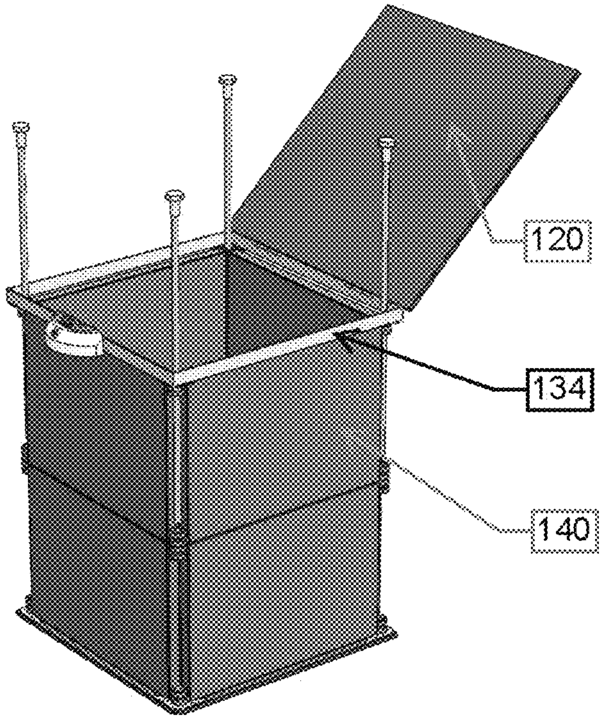
Figure 13H:
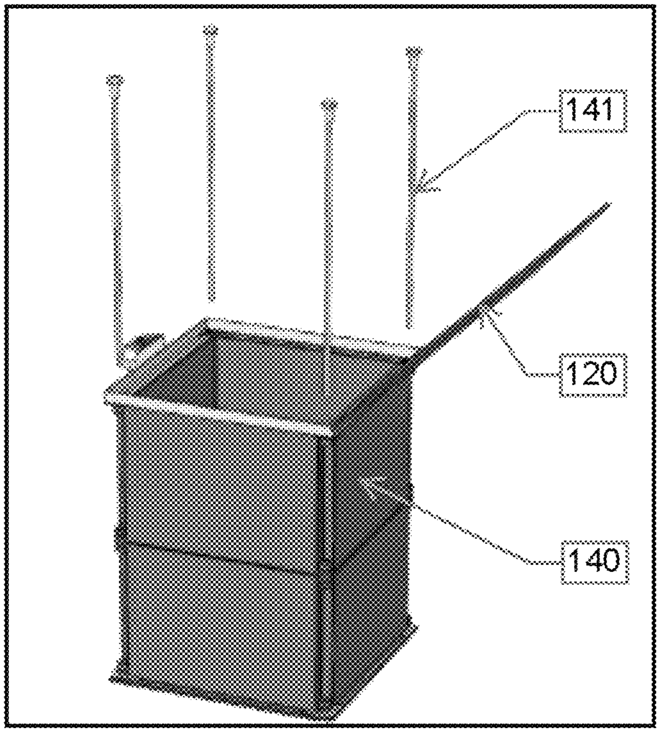

FIG. 11*a* show a typical parcel receptacle appearance from outside, and a typical example of its security mesh (121) inside it as found in FIG. 11*b*. FIGS. 11*c* and 11*d* shows an additional front view camera (112) and an illumination source (137). FIGS. 11*e* and 11*f* shows examples of how those additional parcel receptacle peripherals can be mounted in various ways on parcel receptacle to offer more features and functionalities to fulfill its purpose in a various way.

FIGS. 12*a* through 12*f* show how a sponge type of flexible, easily compressible material can be placed inside a Doorbox. This configuration allows to produce the Doorbox with a good height wherein when the package is lightweight and small, the package remains at the top so that it can be conveniently retrieved by the resident. If the package is large and heavy, when those packages are placed inside Doorbox, the sponge gets compressed and goes inside thereby allowing a larger package to be collected inside Doorbox. This sponge type of compressible materials allows to ensure that both small, lightweight as well as large, heavy-weight packages are easily retrievable by the resident upon returning home.

FIGS. 13*a* through 13*h* shows our parcel receptacle can be configured easily to have additional barriers inside them to increase the security further, and to increase the tamper-proofing mechanism. The barrier can be configured, to be anchored with or secured to, either the vertical rods (141) or the top frame (134), or the bottom base (133) to minimize package theft by tampering of the exterior fabric layer by some means. This design enhances the security of parcel receptacle.

Figure 14A:
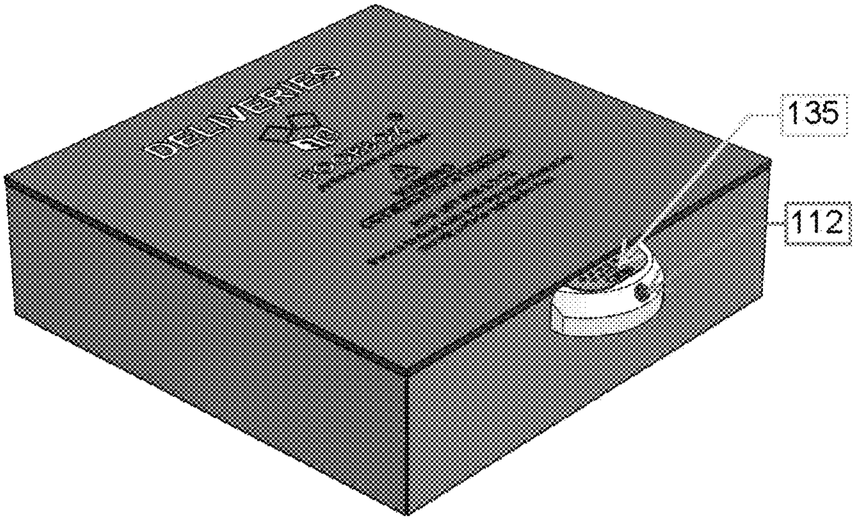
Figure 14B:
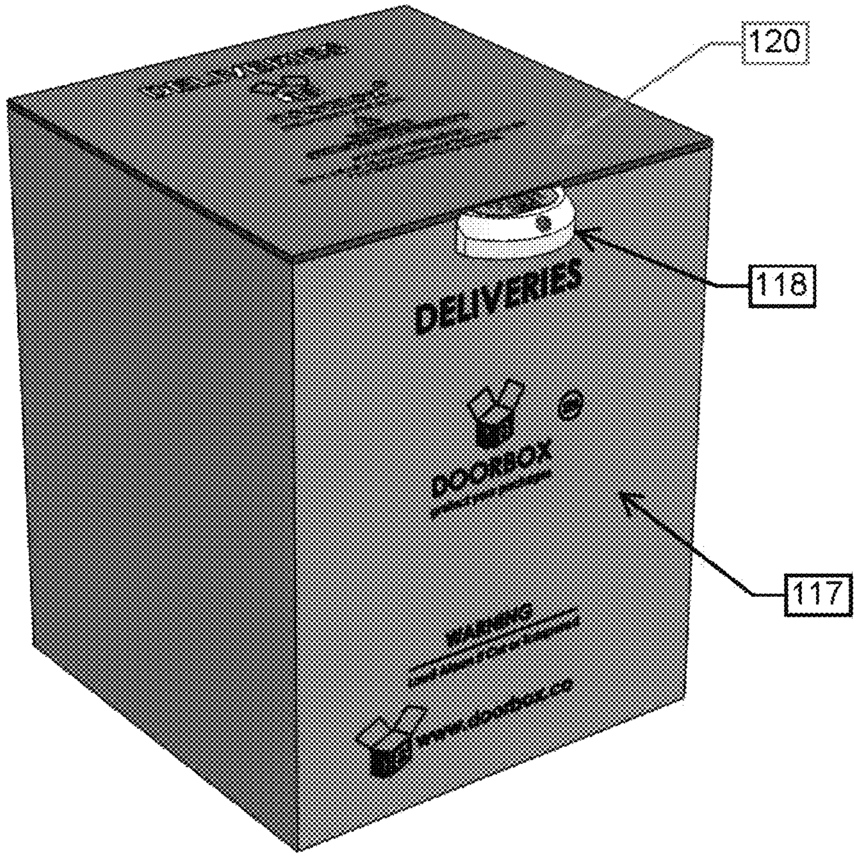
Figure 14C:
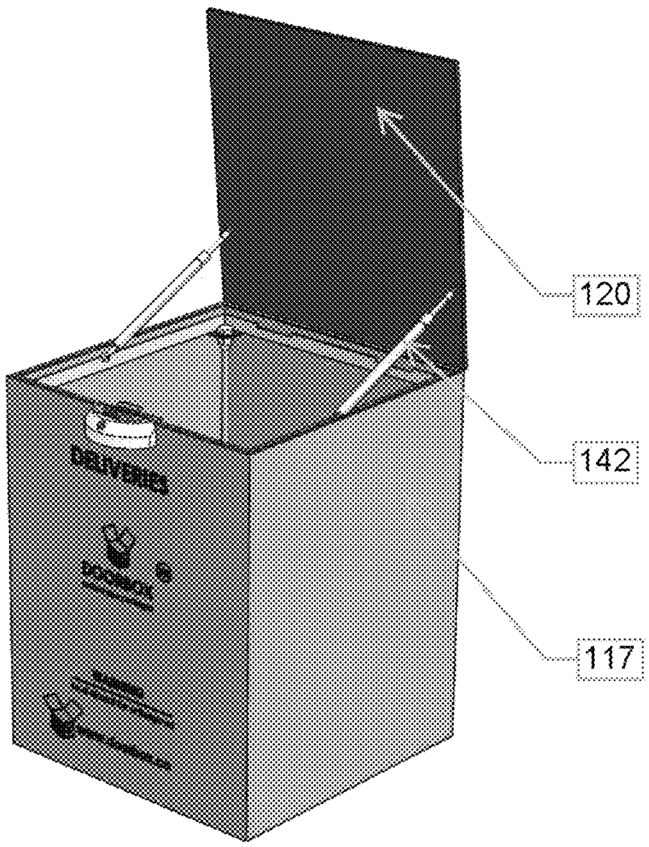
Figure 14D:
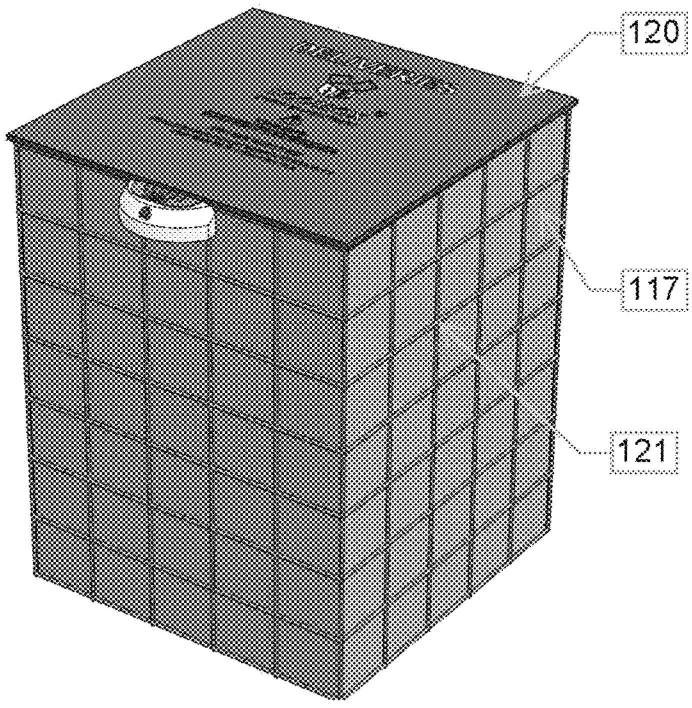
Figure 14E:
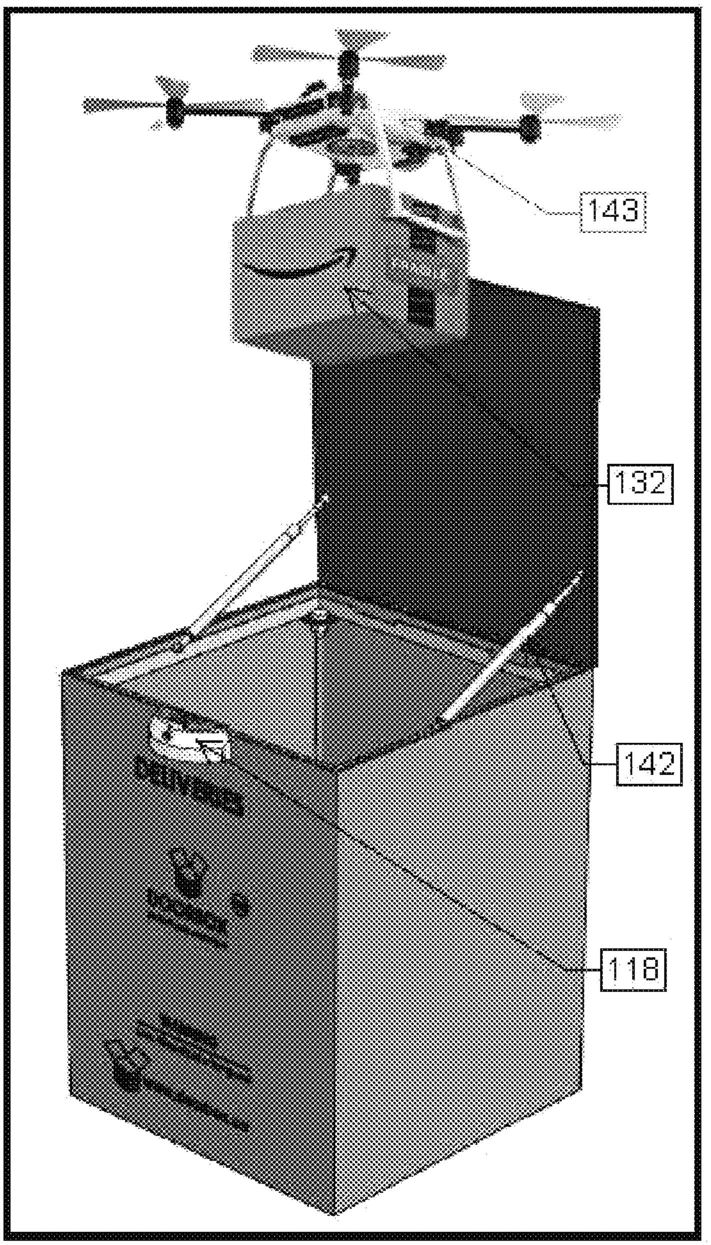
Figure 14F:
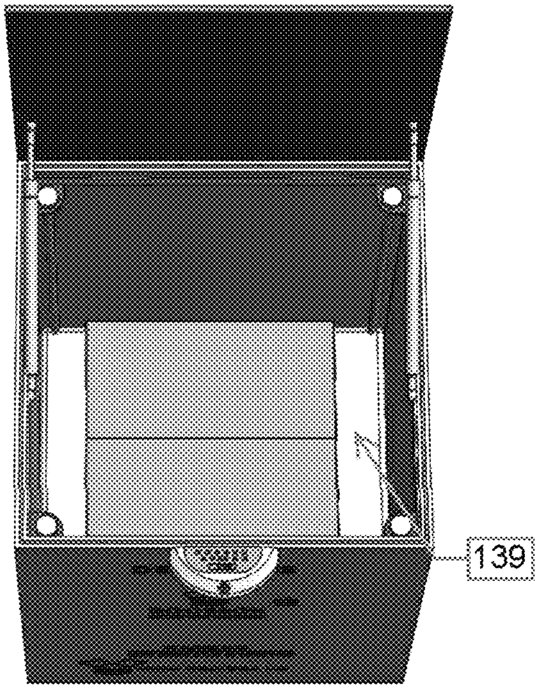
Figure 14G:
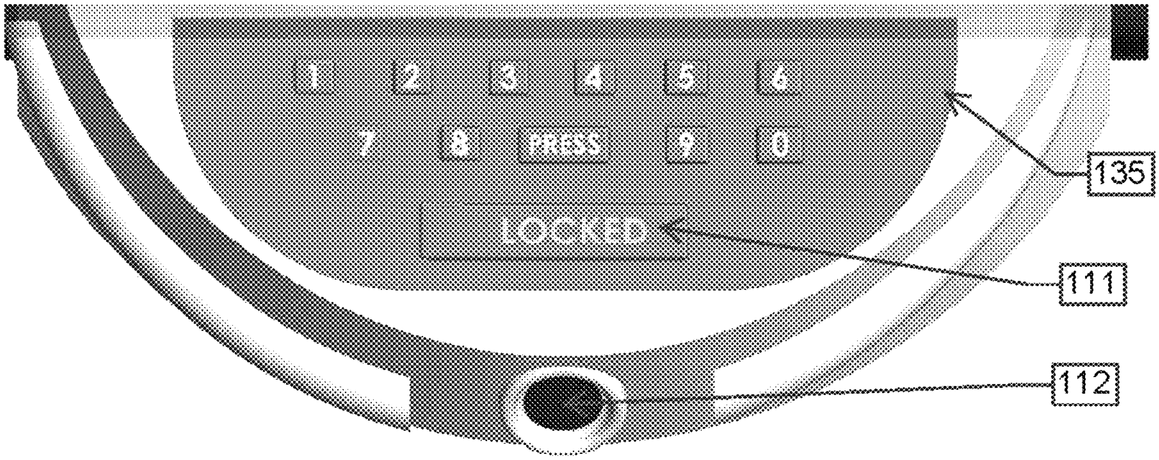

FIGS. 14*a* and 14*b* shows that our parcel receptacle is completely foldable because of the flexible fabric outside. FIG. 14*c* shows that a gas strut (142) or any other mechanism can be used to automatically open and close the parcel receptacle. FIG. 14*d* shows the mesh (121) inside that enhances protection and security of the packages inside. FIG. 14*e* shows that our parcel receptacle, with its sensors and communication devices in place and its automation and capability of technologies in it, can be configured to open and close to accept deliveries from autonomous delivery vehicles or drones also. FIGS. 14*f* and 14*g* shows top views of the parcel receptacle and the external enclosure (146), and some of its components.

Figure 15A:
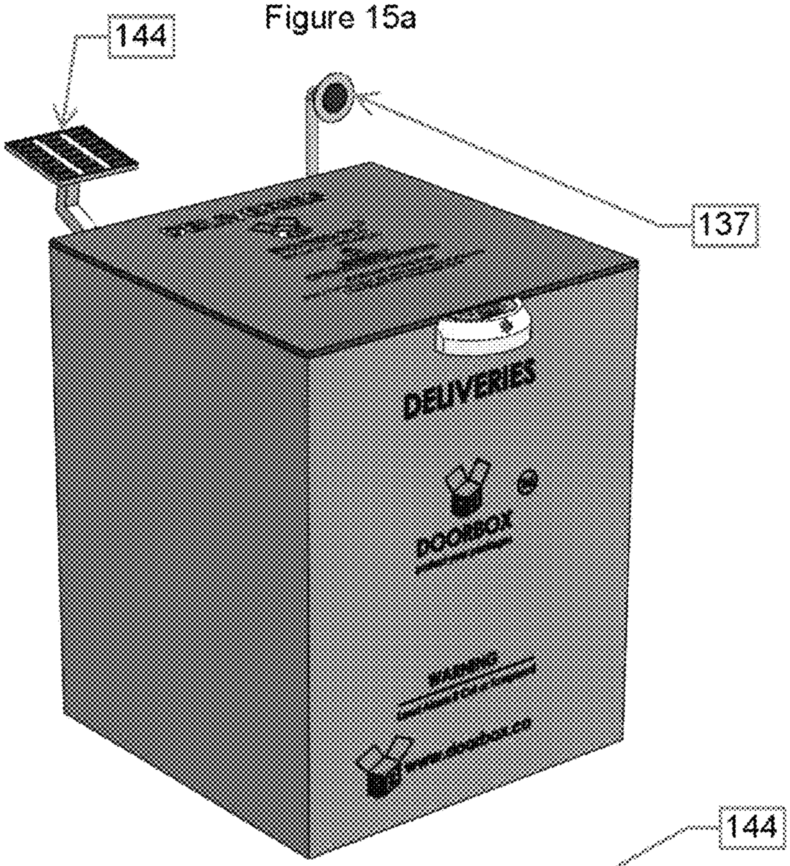
Figure 15B:
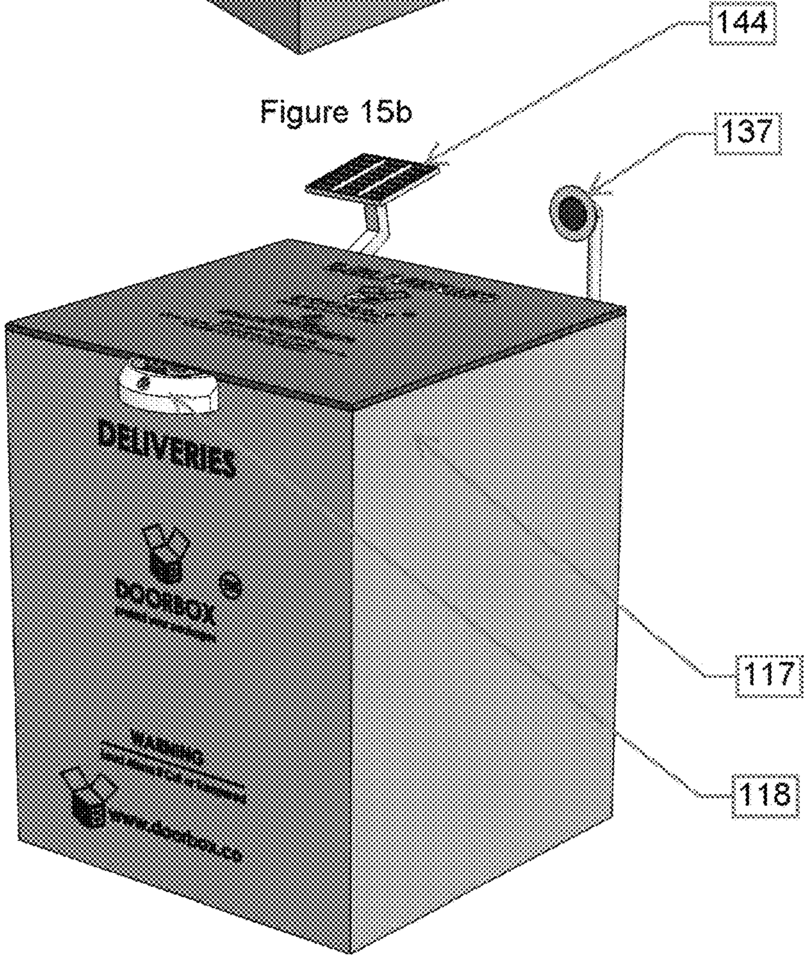
Figure 15C:
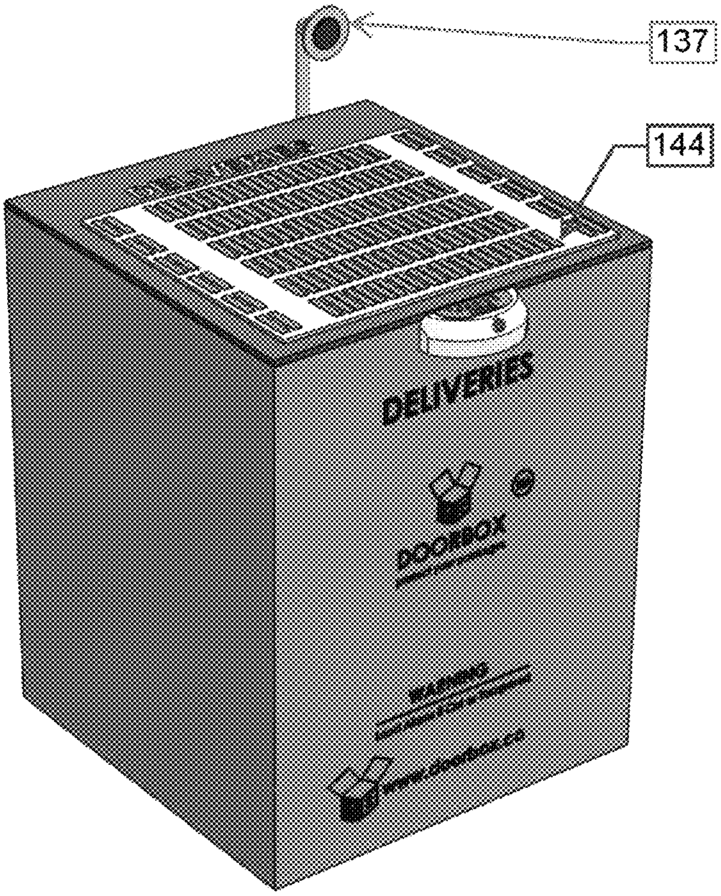
Figure 15D:
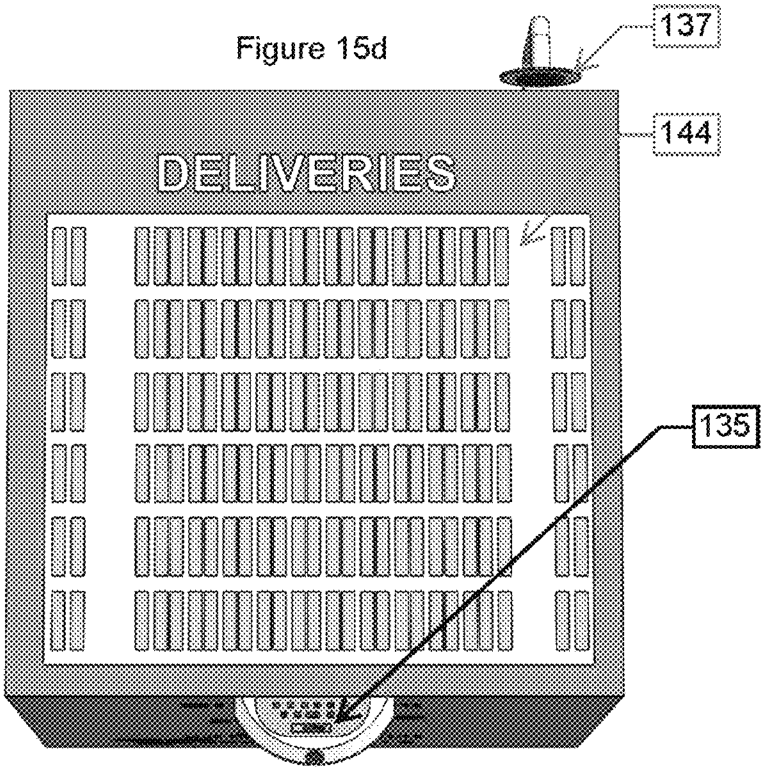
Figure 15E:
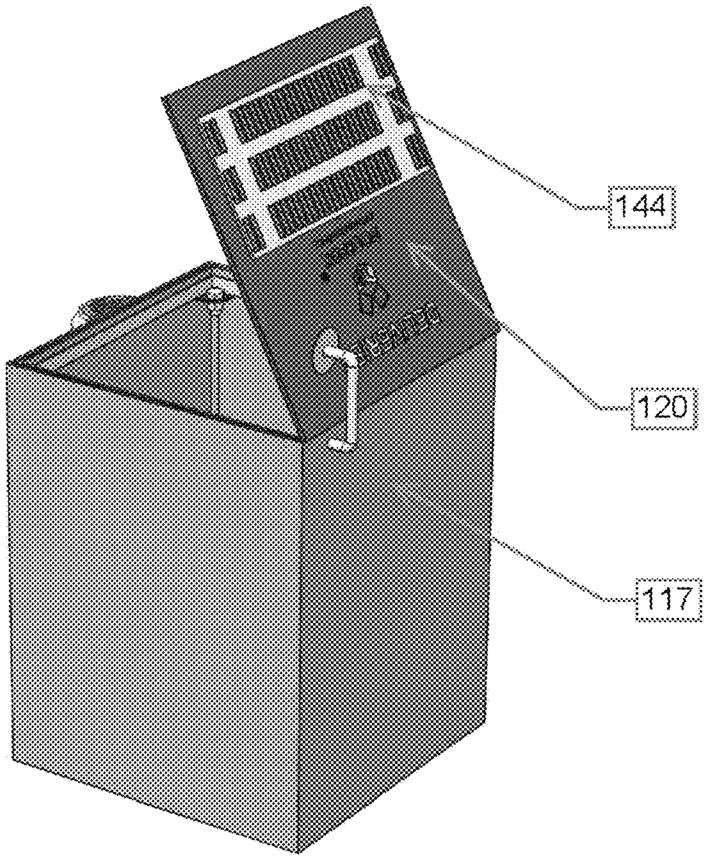
Figure 15F:
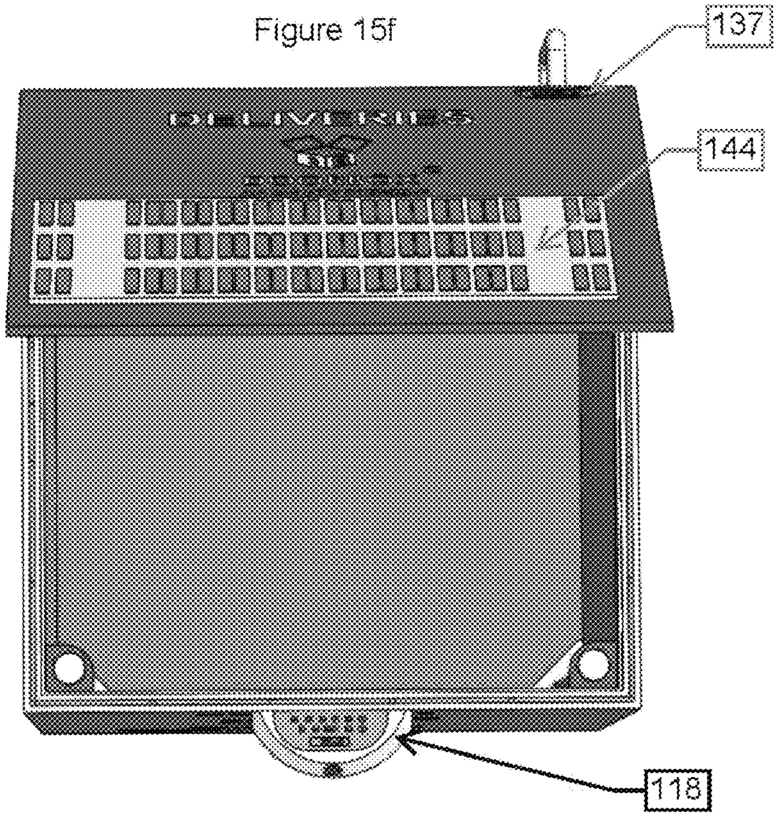
Figure 15G:
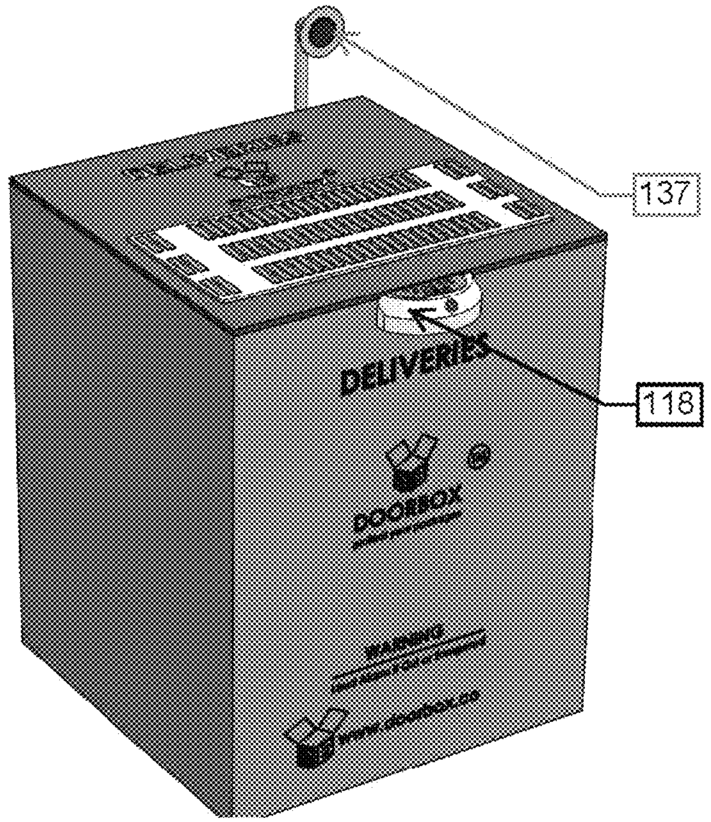
Figure 15H:
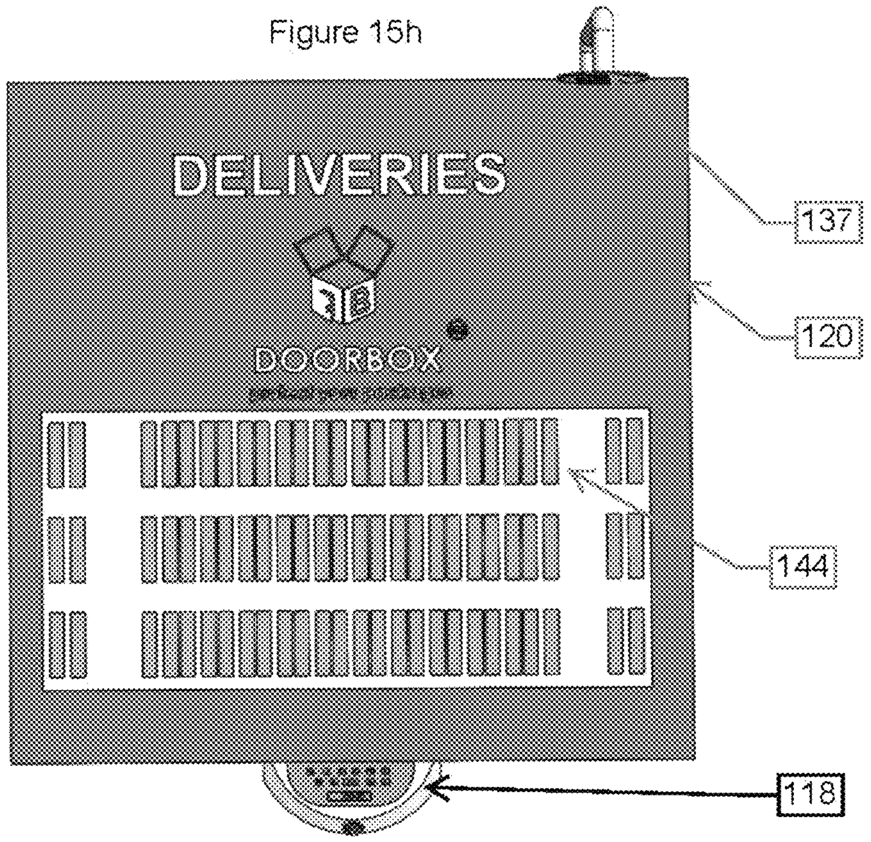

FIGS. 15*a*-15*b* show that our parcel receptacle can be configured to have a solar panel (144) and an illumination source (137) to aid in its application. FIGS. 15*c* and 15*d* shows that the top surface of the lid can be used nicely as a location to place solar panel to generate energy to power the devices in the parcel receptacle. FIG. 15*e* through 15*h* shows that a portion of the lid can also be used to place the solar panel to generate energy needed to power the devices.

Figure 16A:
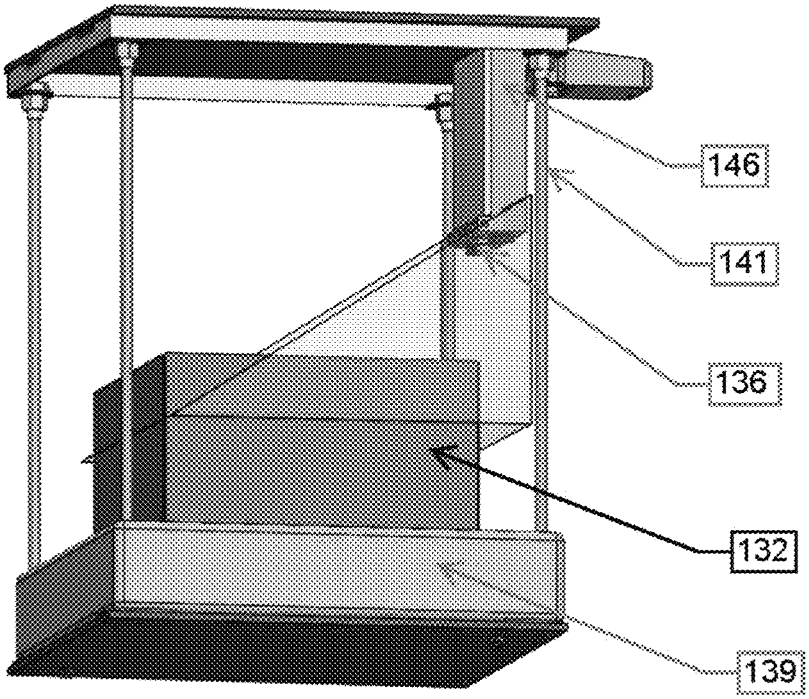
Figure 16B:
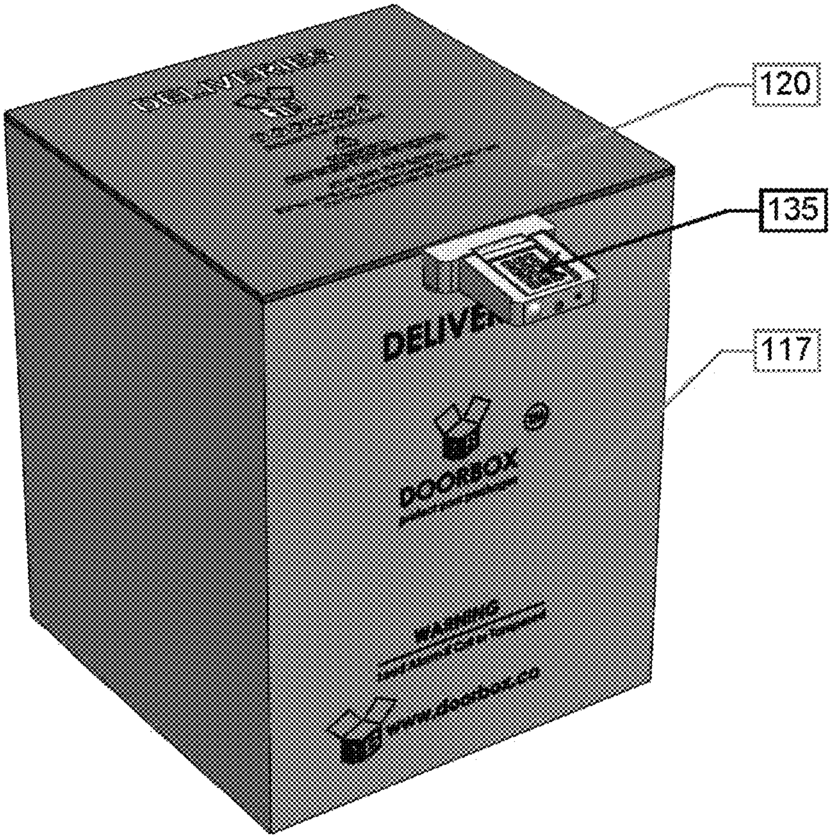
Figure 16C:
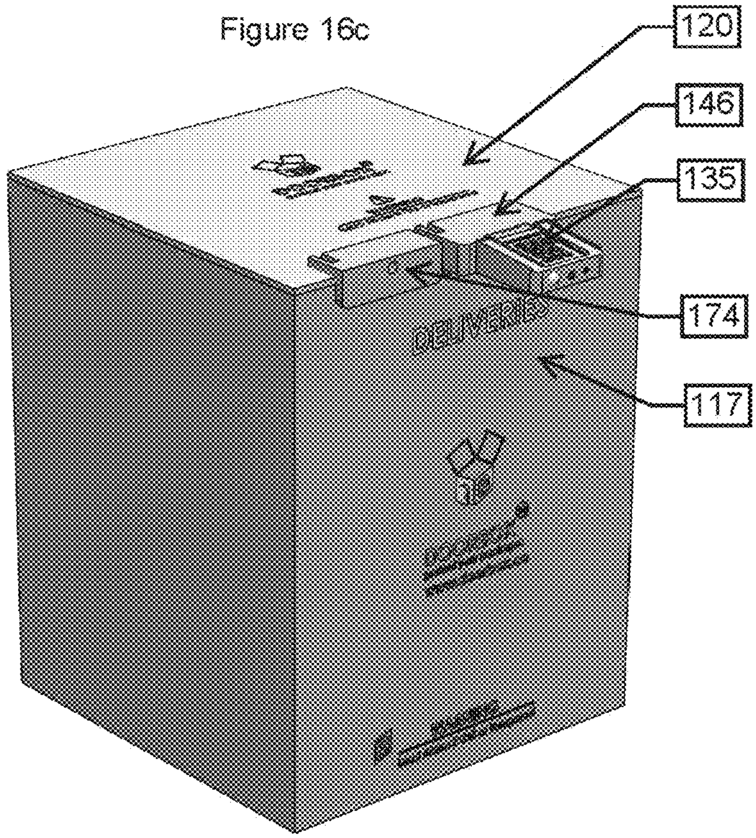
Figure 16D:
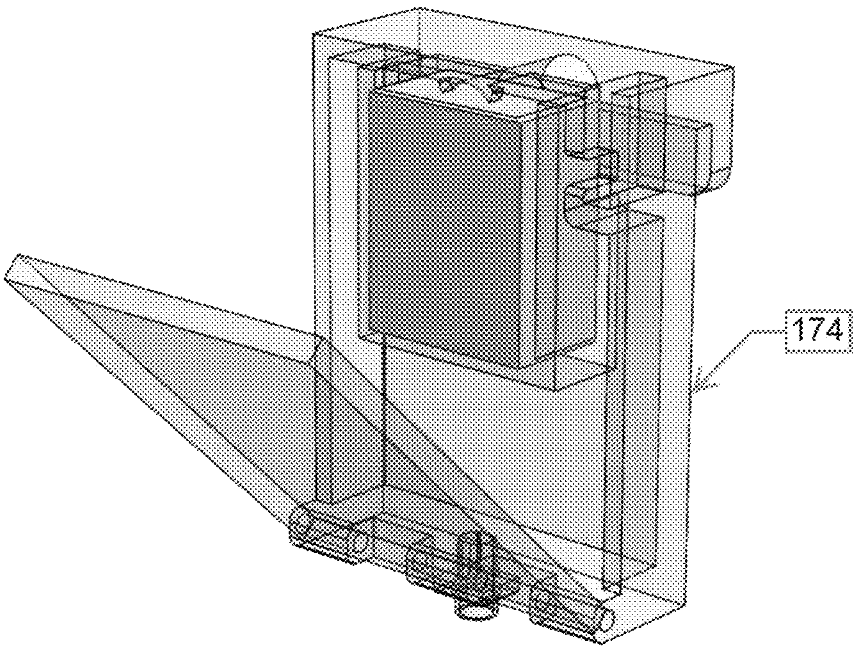
Figure 16E:
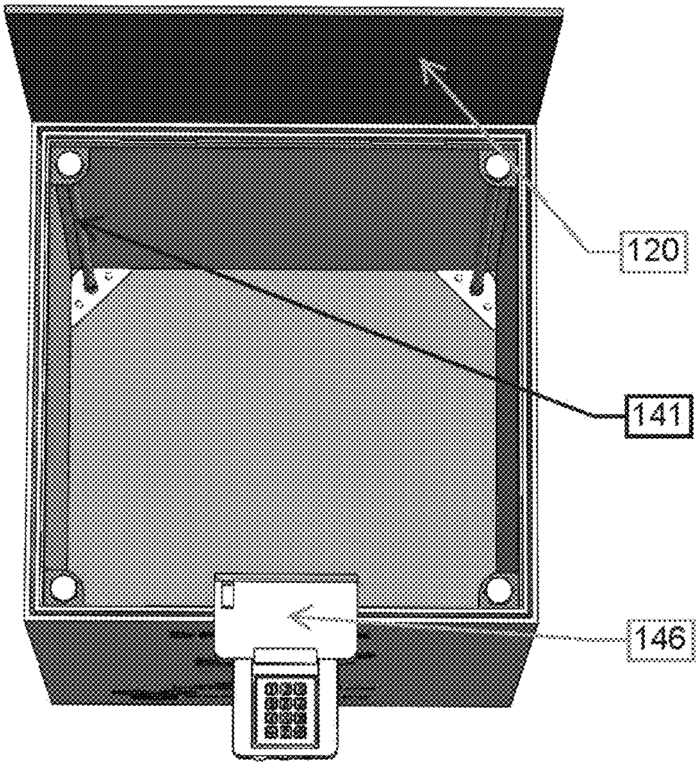
Figure 16F:
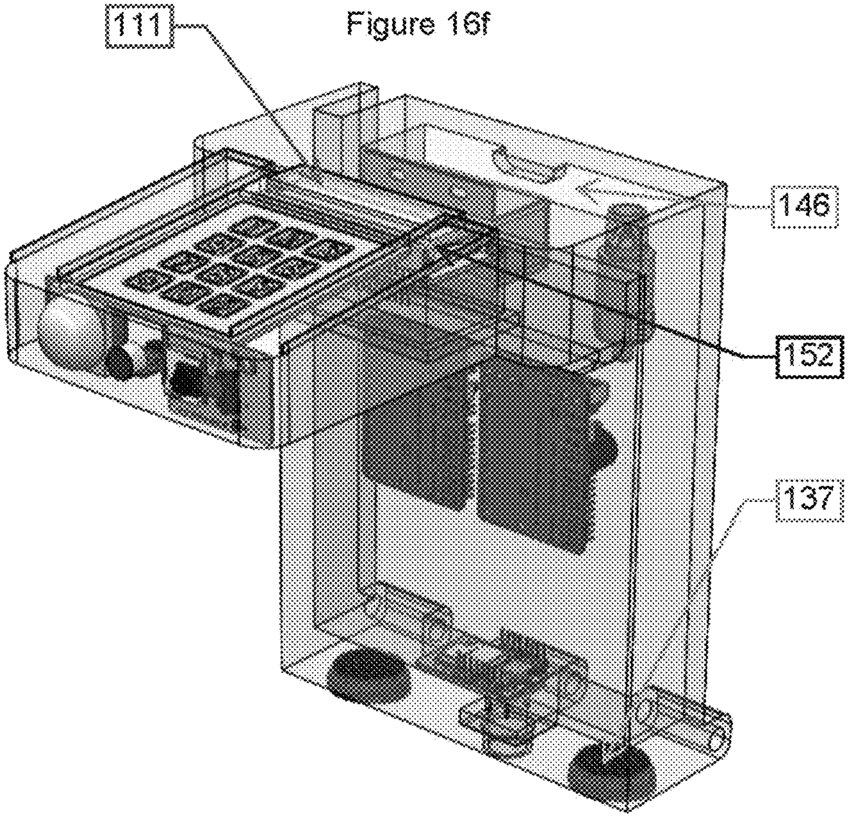
Figure 16G:
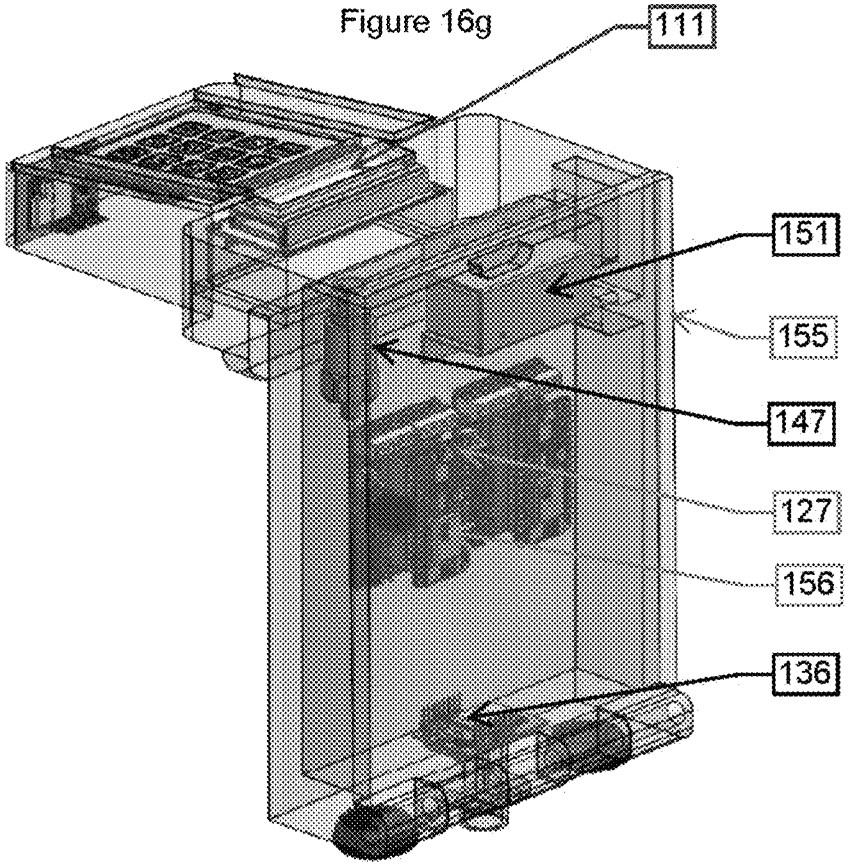
Figure 16H:
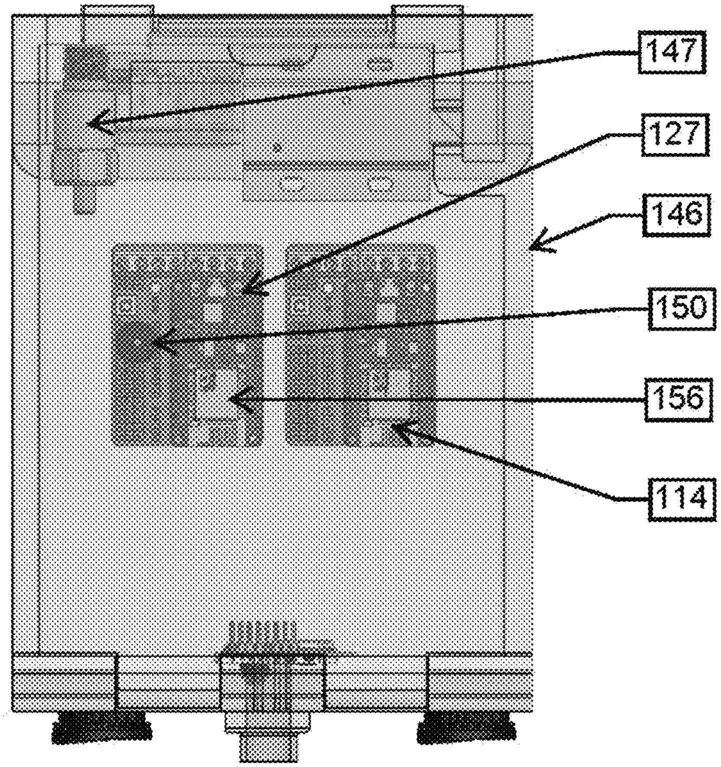
Figure 16I:
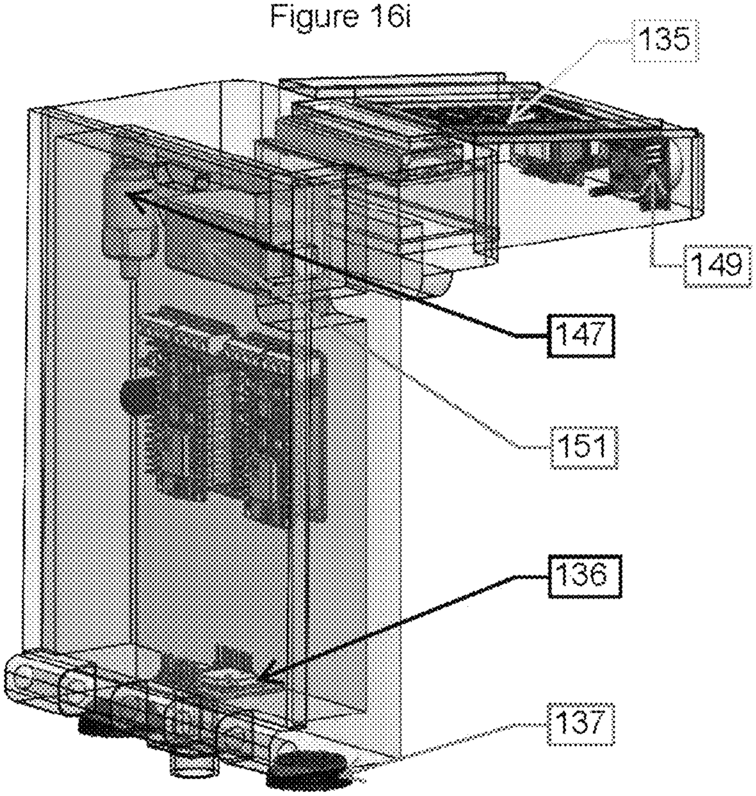
Figure 16J:
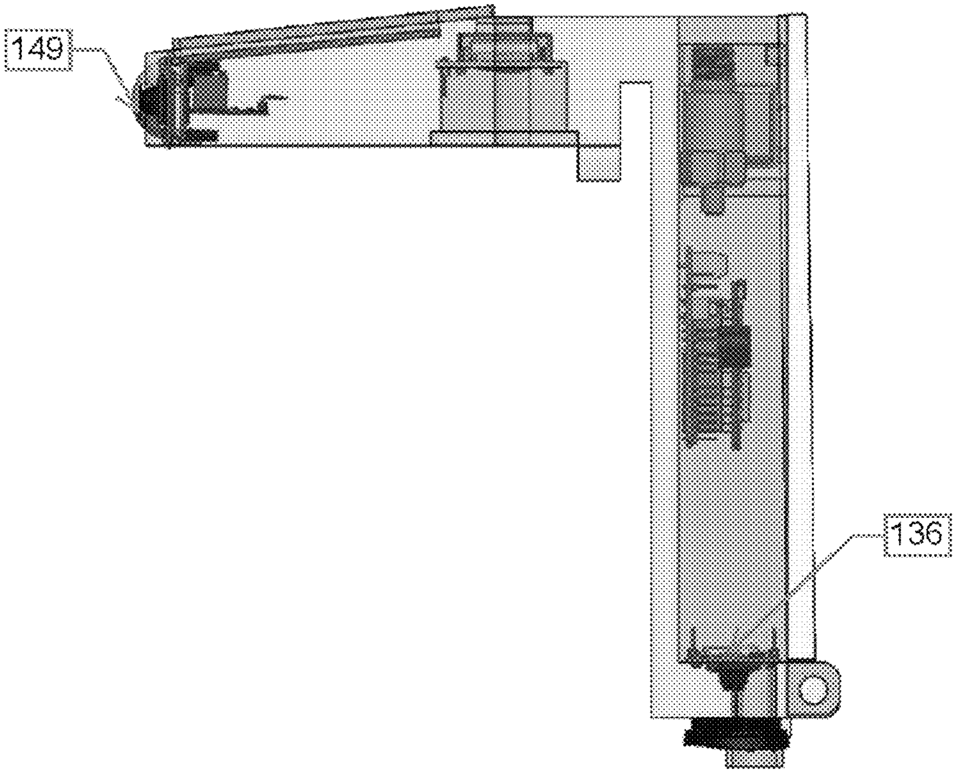
Figure 16K:
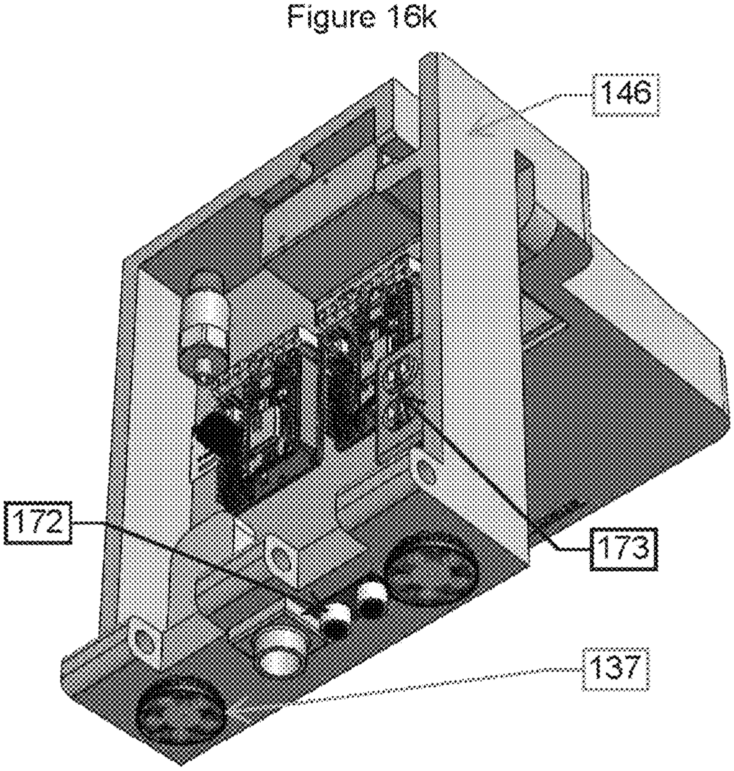
Figure 16L:
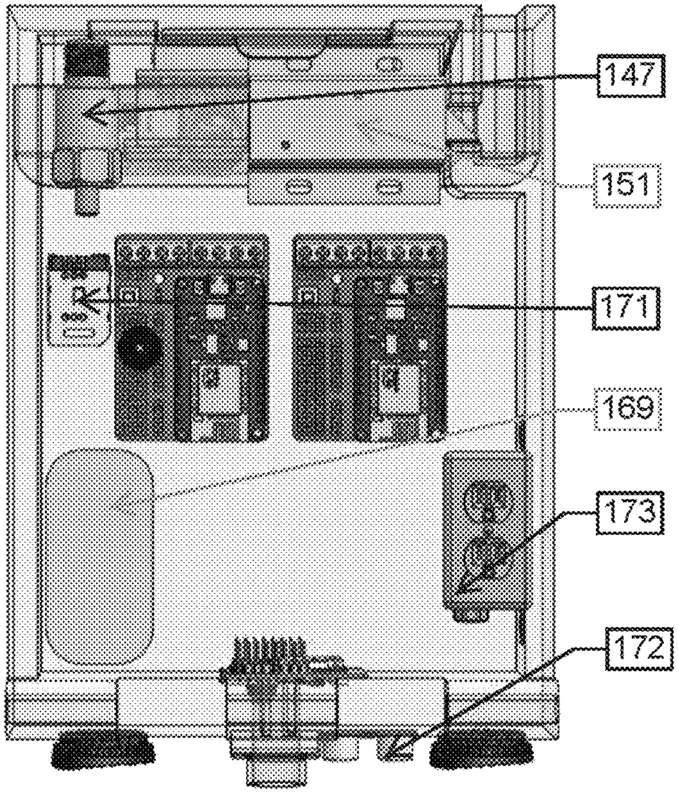
Figure 16M:
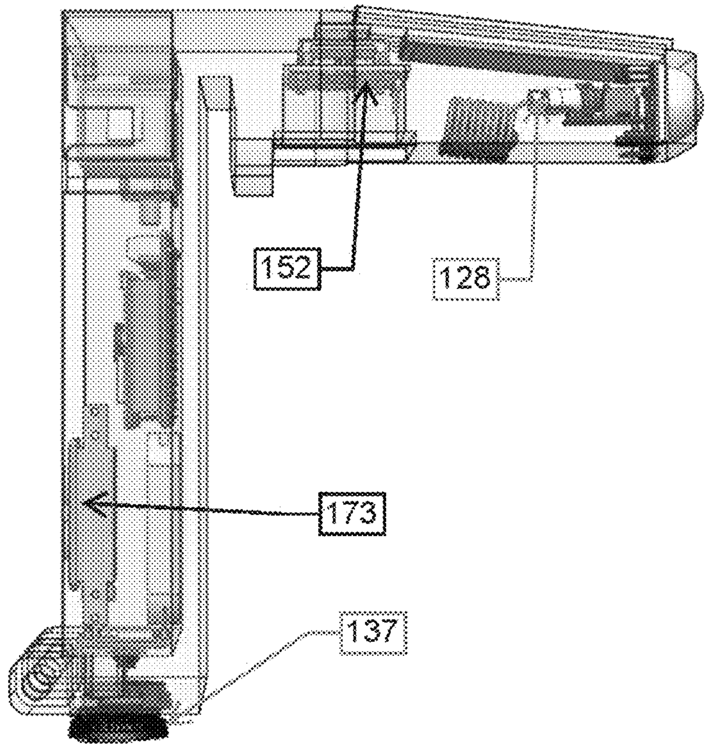
Figure 16N:
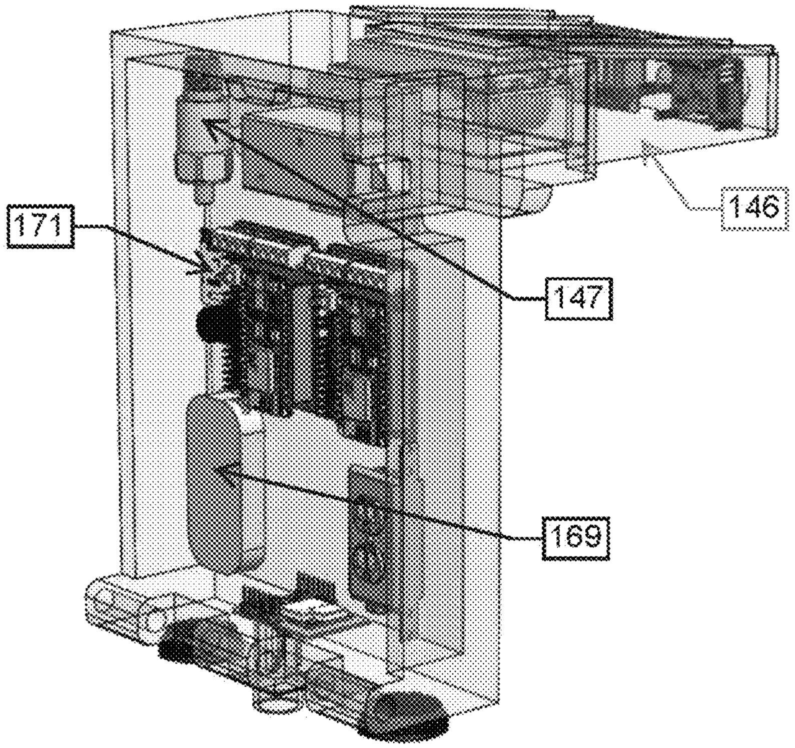
Figure 16O:
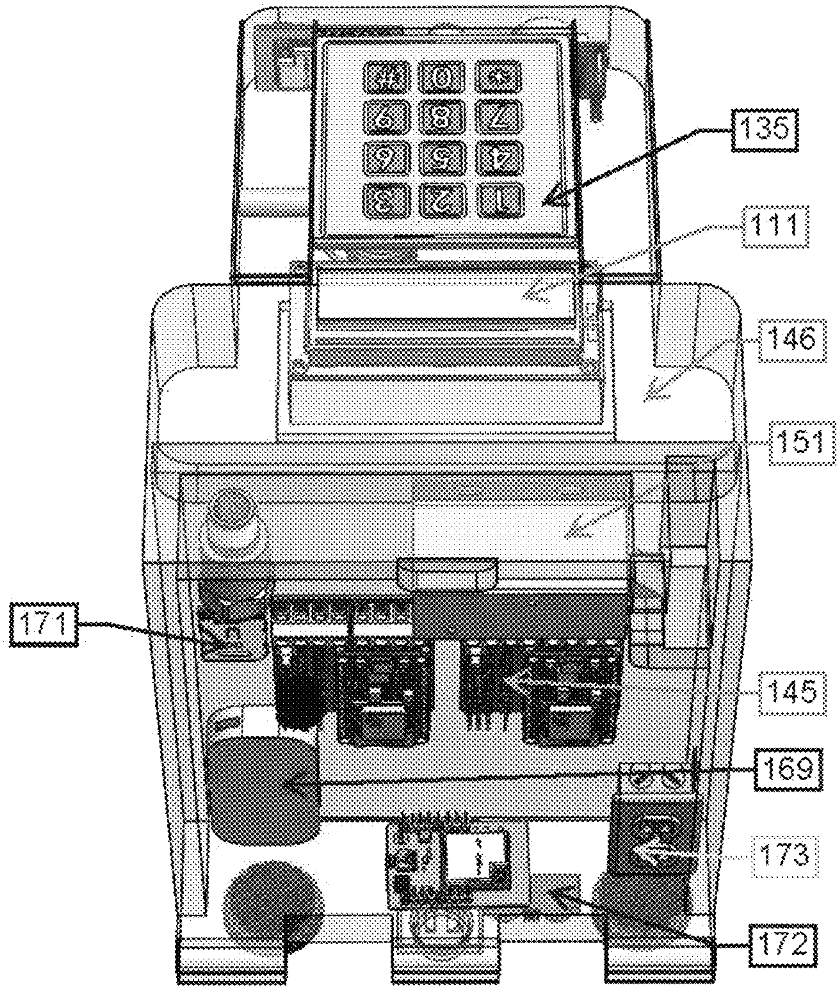

FIG. 16*a* shows a parcel receptacle with an inside camera (136) that can see what is inside. This is an example location only, and it can be placed anywhere, including on the bottom of the lid, or anywhere inside the parcel receptacle to fulfill this objective since each configuration offers certain benefits. FIG. 16*b* shows how the parcel receptacle looks from outside. FIG. 16*c* shows the parcel receptacle with an additional external enclosure for placing other vendor products and such other vendor products could include devices such as camera (example from ADP, google nest, Blink, Wyze, etc.) or lights, and the goal is to offer customers a well-integrated parcel receptacle solution that not only can be used to securely exchange packages, but that can also be used as a place holder for the products that customers love. This feature is expected to bring synergy between us and other vendors and a mutually benefiting feature to promote each other's products. FIG. 16*d* shows another view of part number 174 and how someone can open and place other cameras or other devices inside and lock and place it for their use. FIG. 16*e* shows a top view of a technology-enabled parcel receptacle.

Figure 17A:
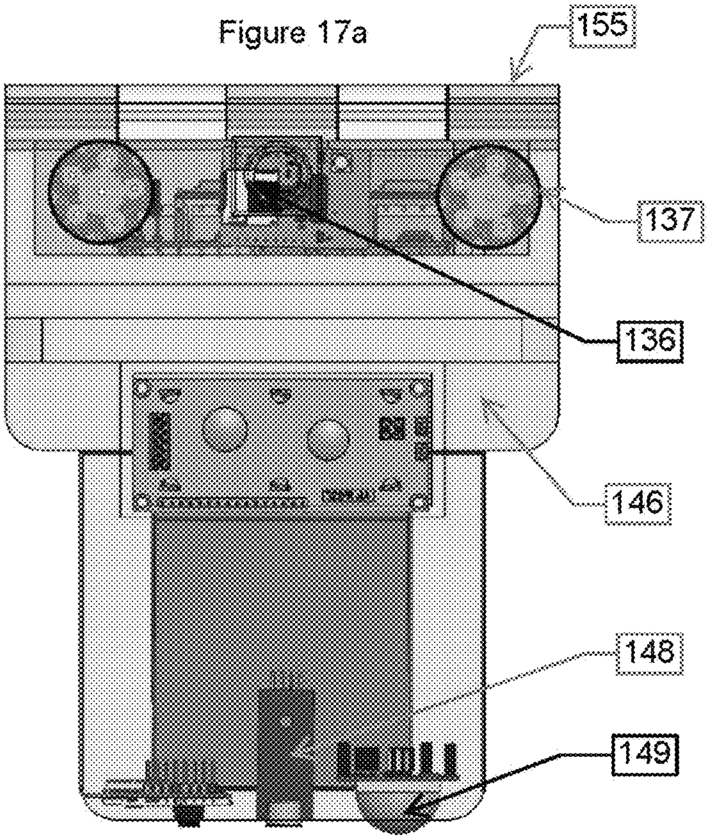
Figure 17B:
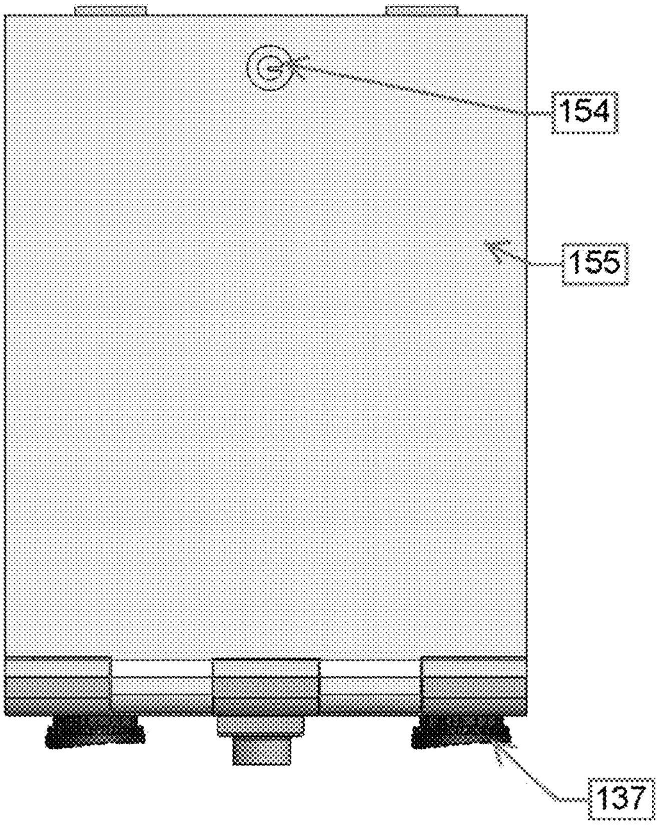
Figure 17C:
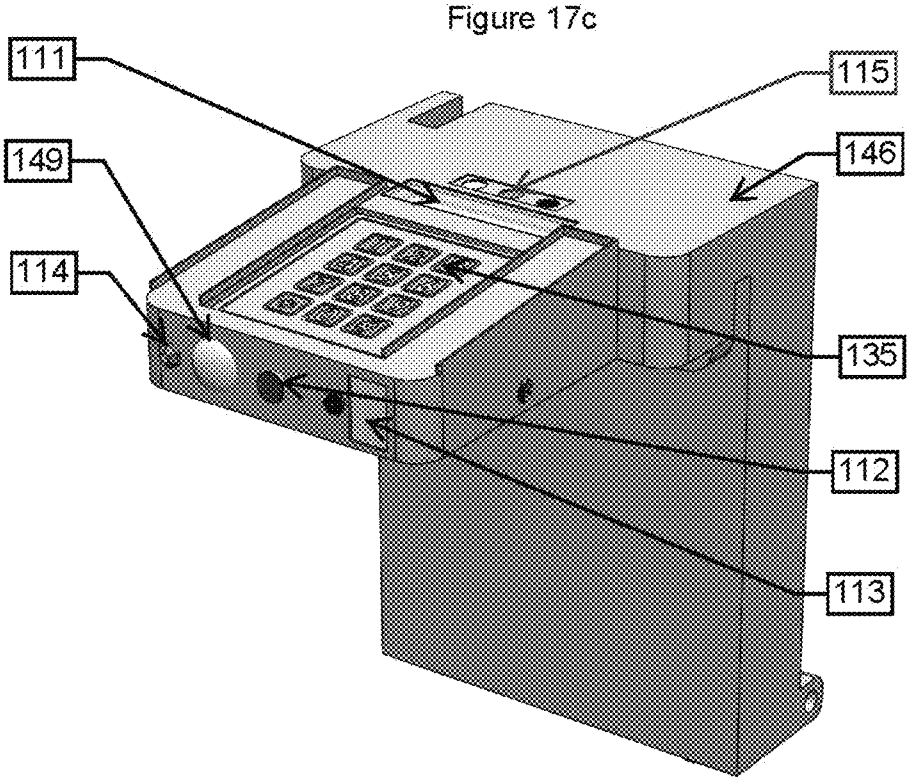
Figure 17D:
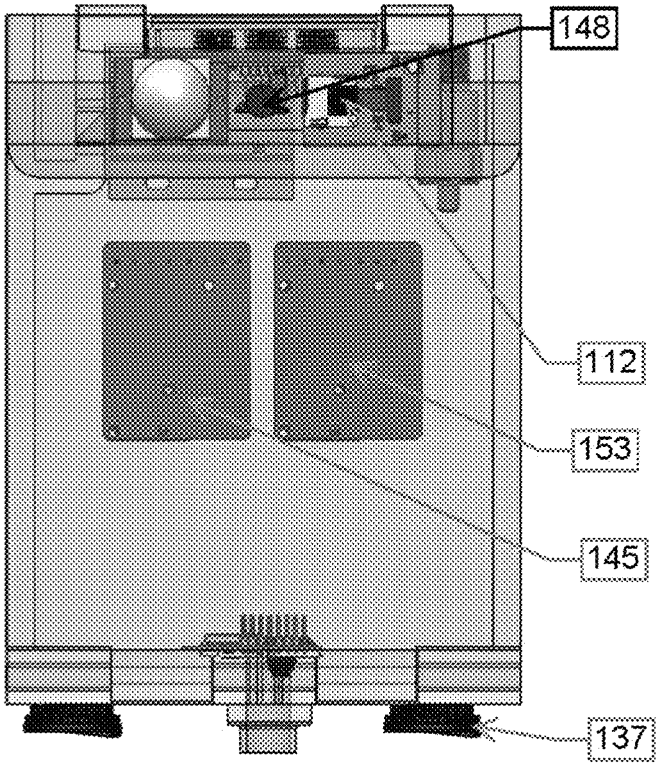

FIG. 16*f* through FIG. 16*o* shows the external enclosure (146) and many parts that it houses from various angles and perspectives. Many of these are explained in the parts list, and elsewhere in this application. FIG. 17*a* shows the view of external enclosure (146) from inside bottom, and FIG. 17*b* shows the external enclosure (146) lid (155) and how it can be locked (154) securely so that only authenticated users can always have access to it. FIGS. 17*c* and 17*d* shows the external enclosure (146) from two more angles to give a better understanding of the parts so that the parts can perform their intended functions.

Figure 18A:
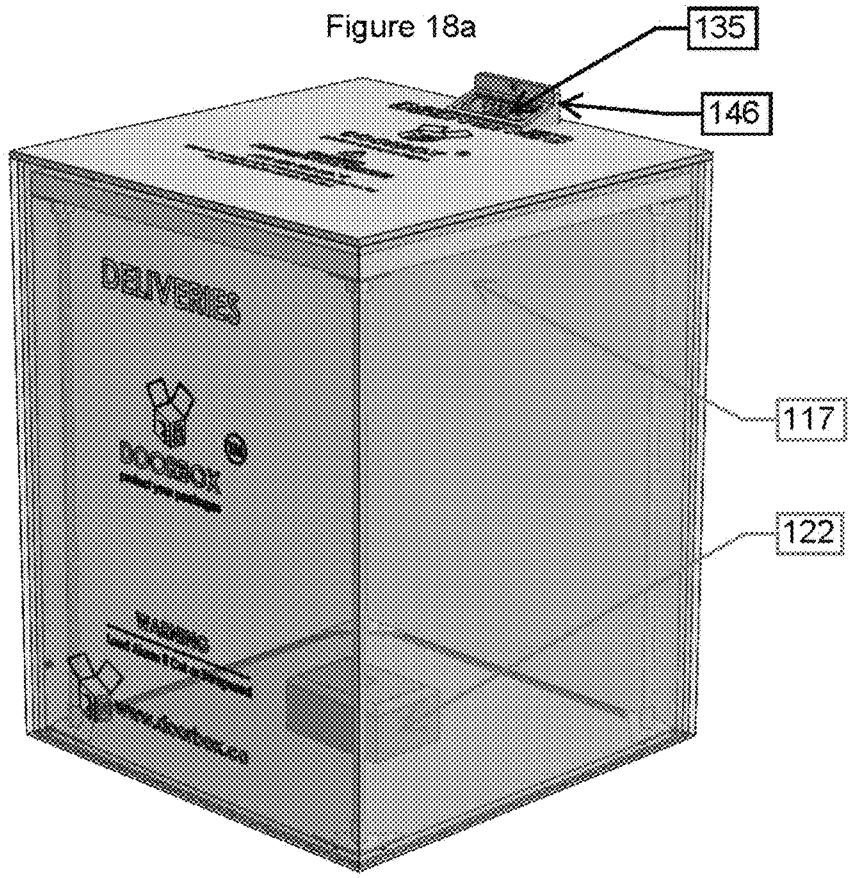

FIG. 18*a* shows the external enclosure (146) on top of the lid, instead of being on the front like in FIG. 16*b*. There are some unique advantages of this location as the external enclosure (146) is not protruding outside, and the external enclosure (146) does not need any extra support to provide structural strength to it. The only downside is that mounting the external enclosure (146) will create some vibrations on all the electronic and electrical parts and hardware pieces and sometimes these vibrations can create loose contact between the wires and can cause the electrical and electronics to lose communications from one another thereby creating malfunction and need for repair. In addition, the external enclosure (146) can be mounted completely on the backside, top frame thereby offering an excellent view of the entire parcel receptacle from behind. All these locations are different embodiments for placing our external enclosure, and the locations shown in FIG. 16*b* or FIG. 18*a* are just some examples.

Figure 18B:
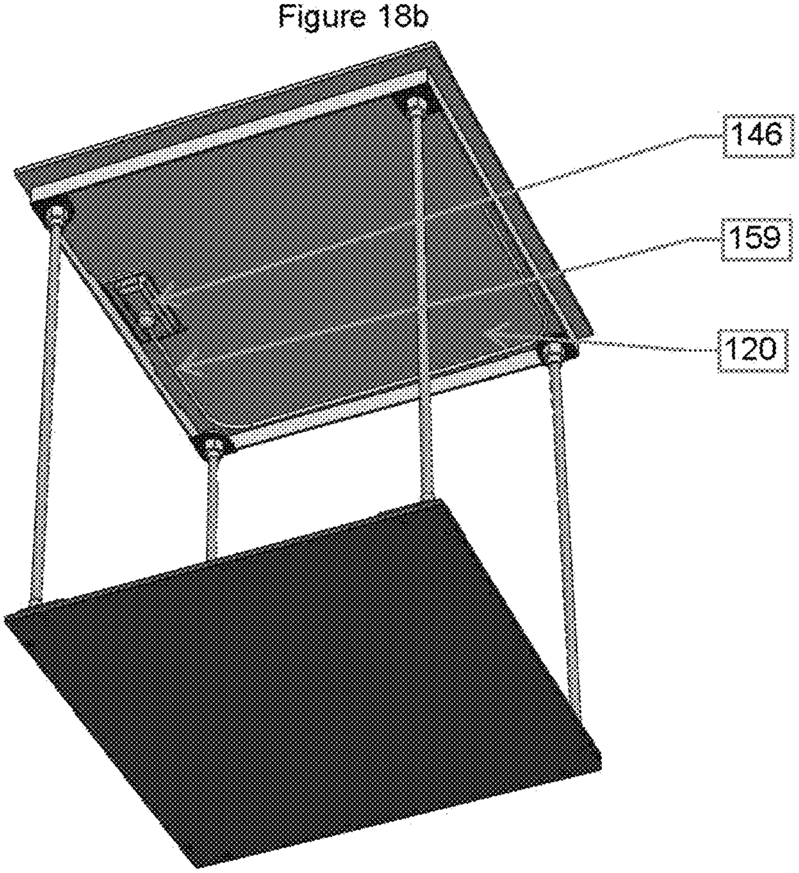
Figure 18C:
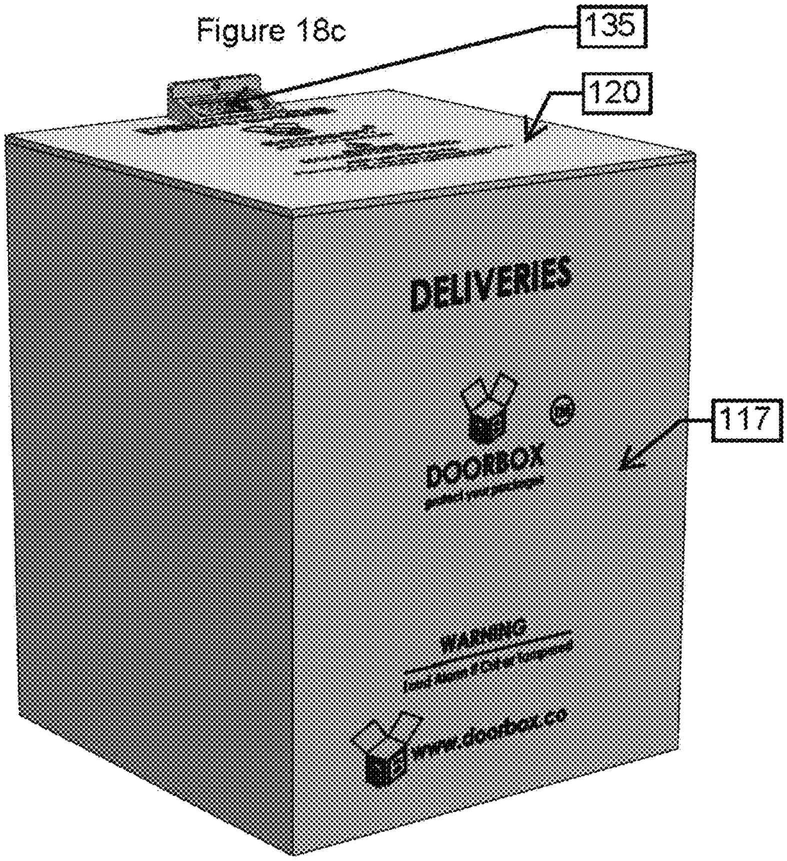
Figure 18D:
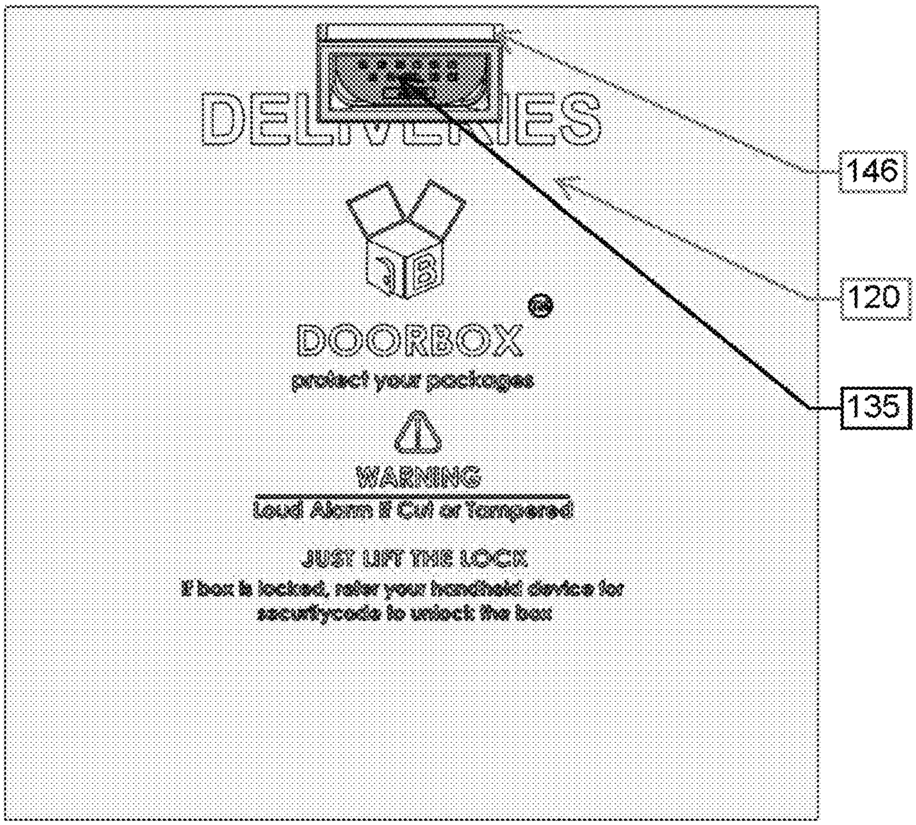
Figure 18E:
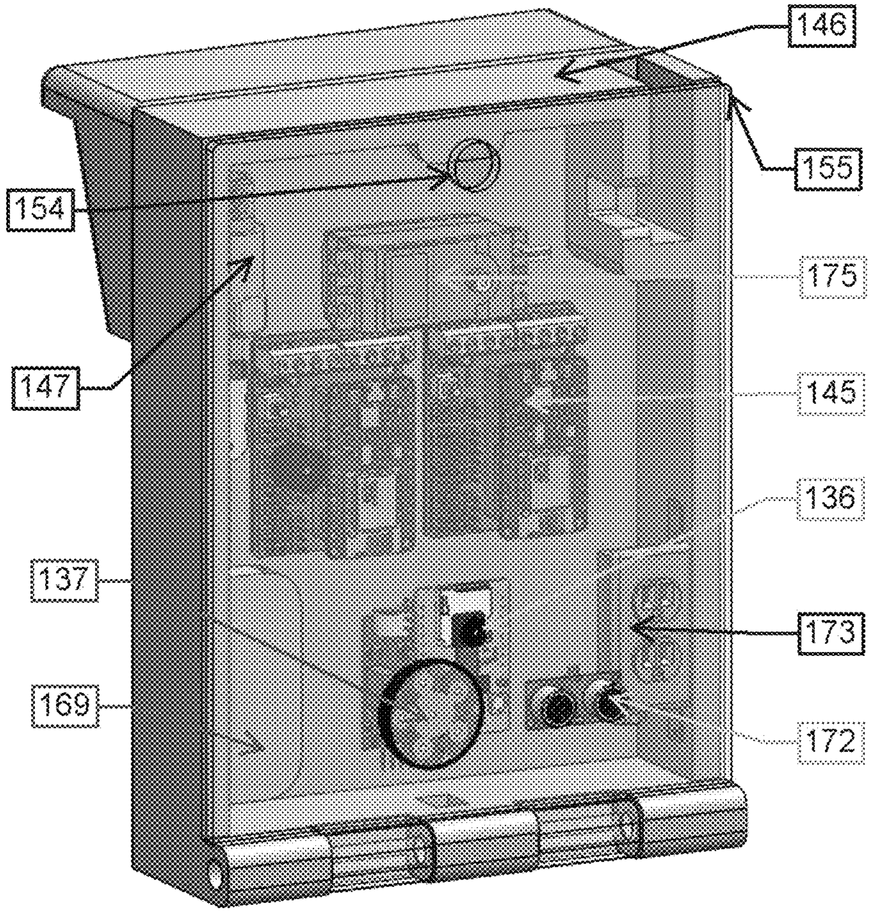
Figure 18F:
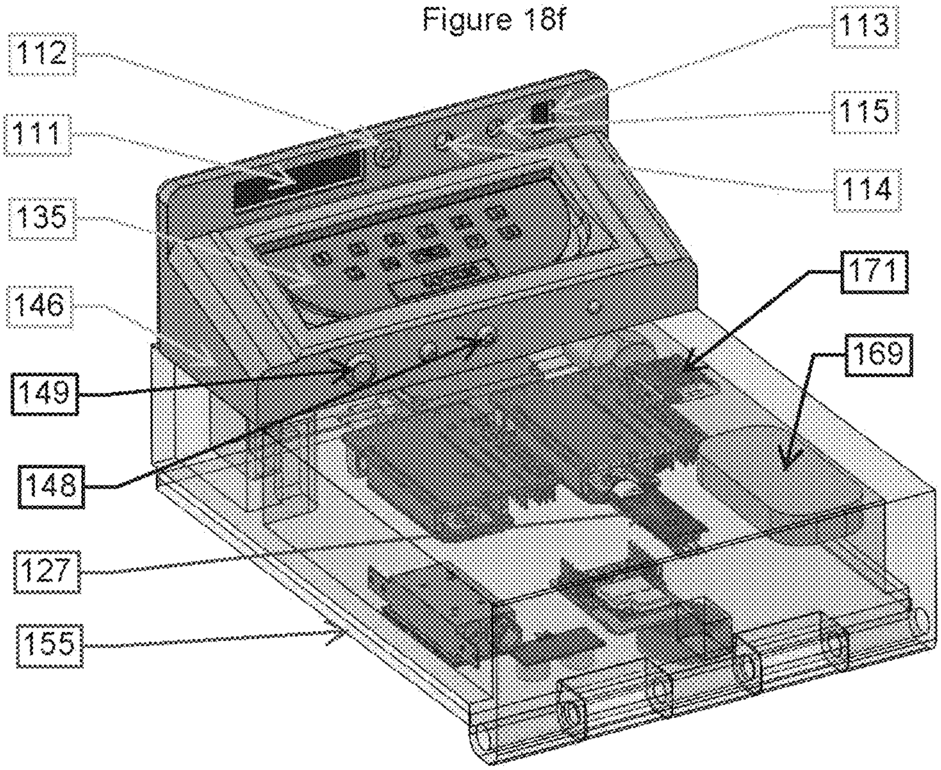
Figure 18G:
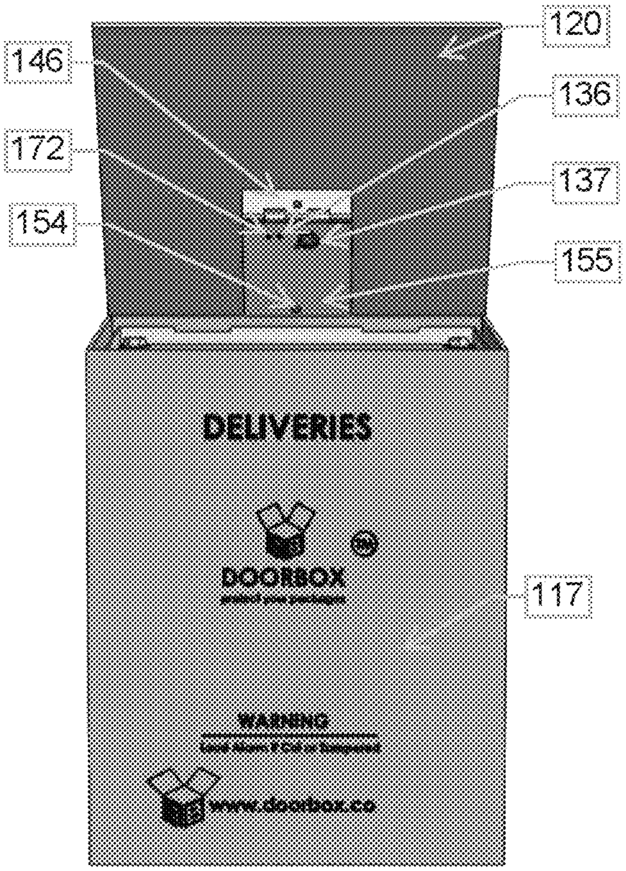
Figure 18H:
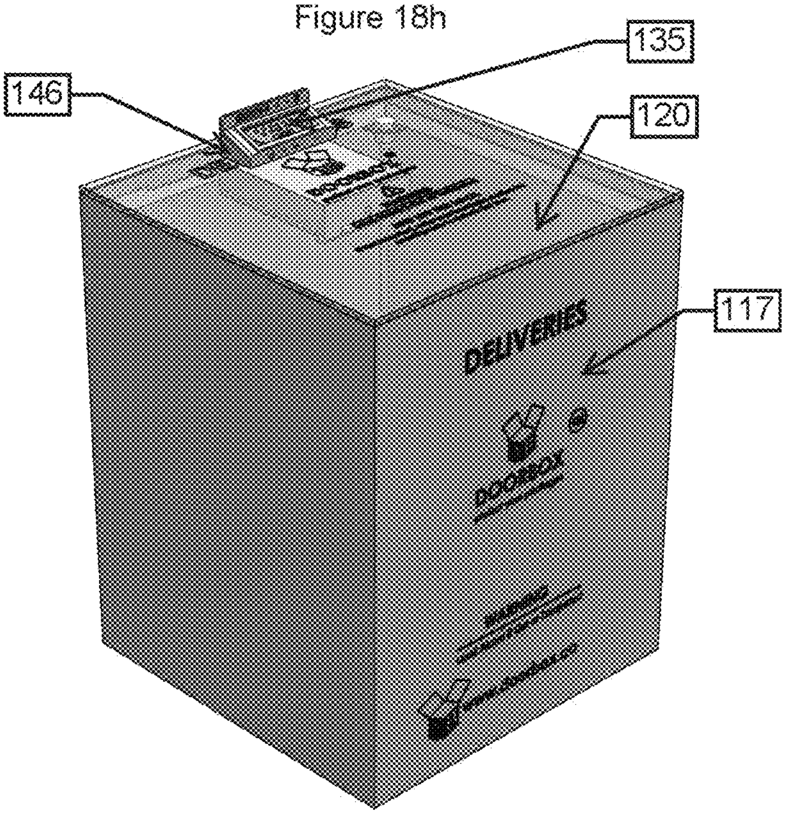
Figure 18I:
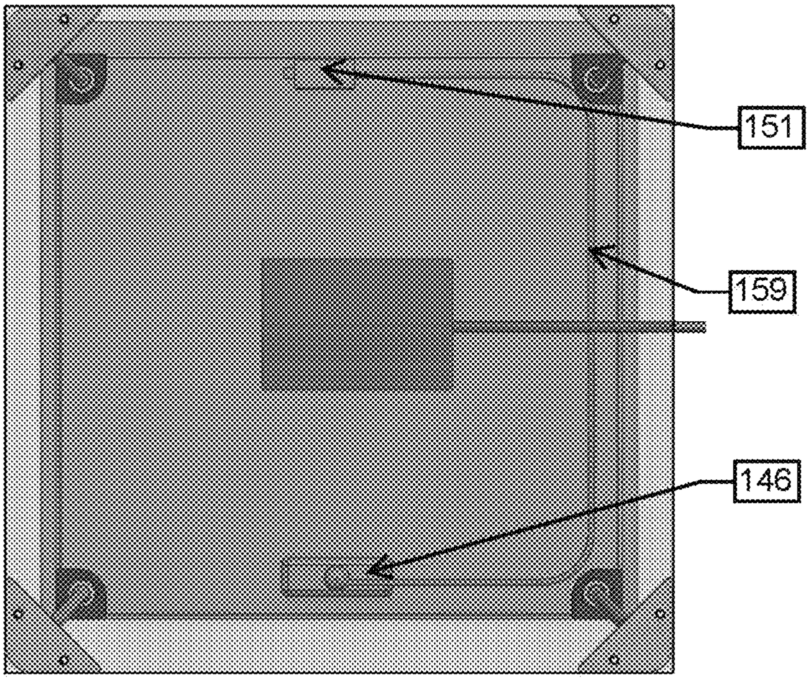

FIG. 18*b* shows a closer look wherein there exists a communication channel between the external enclosure (146) located as shown in FIG. 18*a*, and with the locking unit (151) present at the front of the parcel receptacle, thereby the parcel receptacle lid can be locked or unlocked (FIG. 18*b*, part number 151) from the controls (146) inside. FIGS. 18*c* and 18*d* shows additional side view and top view of the FIG. 18*a* where the external enclosure (146) is placed on the parcel receptacle lid itself. FIG. 18*e* and FIG. 18*f* show close-up views of the external enclosure (146) from two different angles, and a possible configuration for the keypad and other electronic hardware of our parcel receptacle. FIG. 18*g* shows a front view of the parcel receptacle when the lid is opened. Note the physical and electrical connections between part 146 to the locking unit (151) is not shown in this figure. FIG. 18*h* shows a transparent view from an angle, and FIG. 18*i* shows from the top (i.e., the top lid of the parcel receptacle is made transparent to show the parts behind them) to help imagine the external enclosure (146) in the backside and the lid locking setup (151) at the front of the parcel receptacle. Part number 151 is shown an example configuration and it can go from 146 to 151 in any number of ways, including directly as well, instead going around the sides as shown in FIG. 18*f*.

Figure 19A:
Figure 19B:
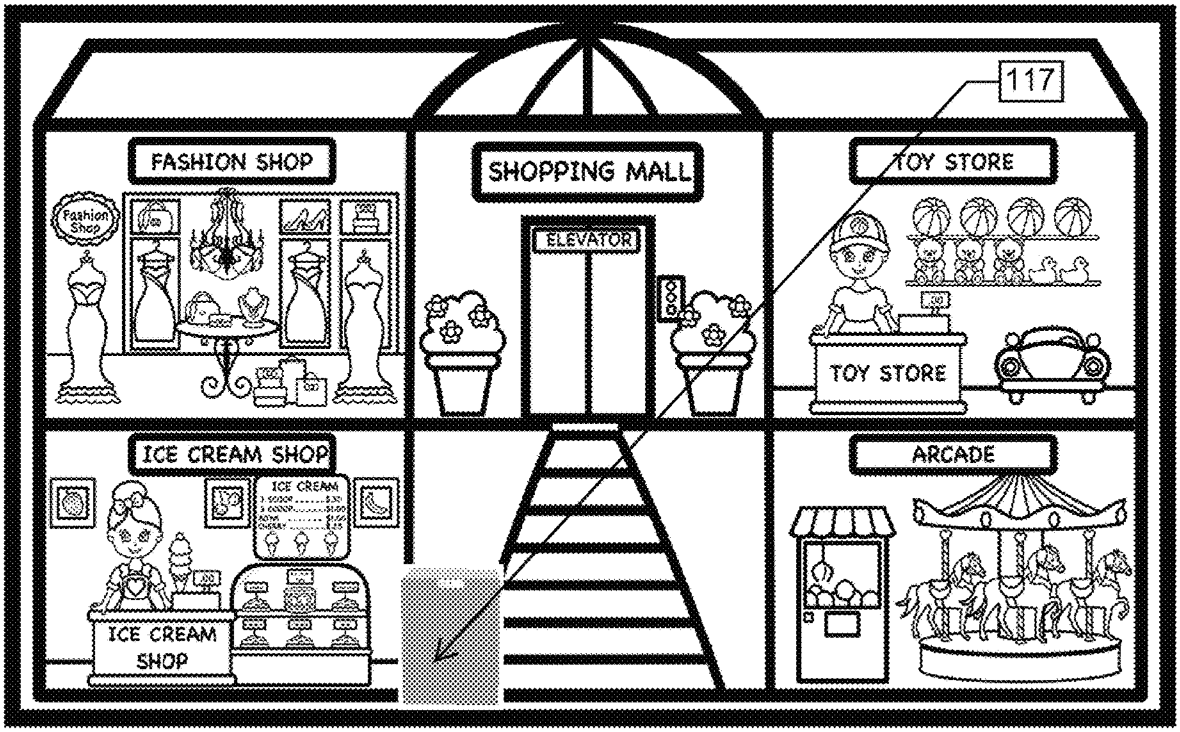
Figure 19C:
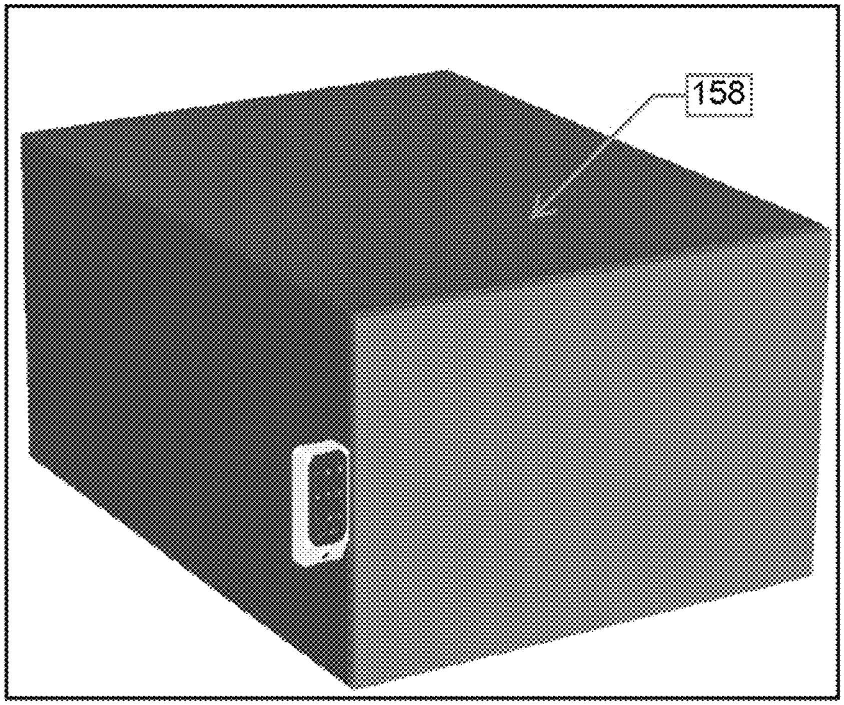
Figure 19D:
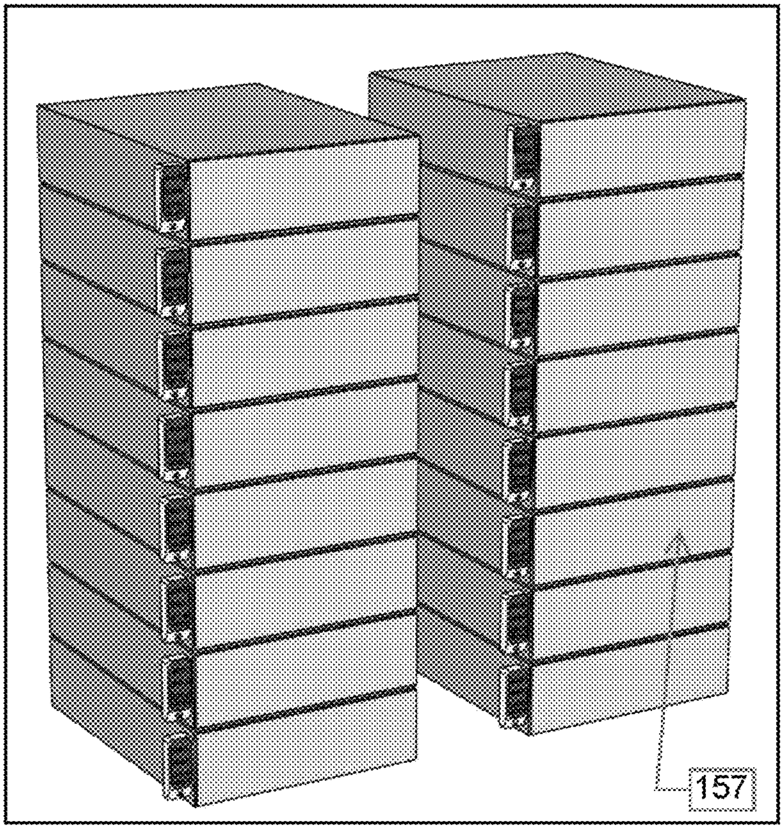

FIG. 19*a* shows an example where one or more of our parcel receptacles can be used by anyone in any building or pharmacies or any stores if they have the necessary authentication for access. FIG. 19*b* shows an example where one or more of our parcel receptacles can be used by anyone in any shopping mall or other public places if they have the necessary authentication for access. FIG. 19*c* shows an example of our medium parcel receptacle, and in this case the external enclosure (146) is located on the side, but technically it can be positioned in any place around the parcel receptacle if a tethering method to this unit is provided for its content security. FIG. 19*d* shows another configuration of parcel receptacle and this consists of a series of parcel receptacle, stacked one on top of another. The external enclosure (146) is shown one per unit, and it can be configured to have one external enclosure (146) that can control all the individual parcel receptacle with a centralized external enclosure.

Figure 19E:
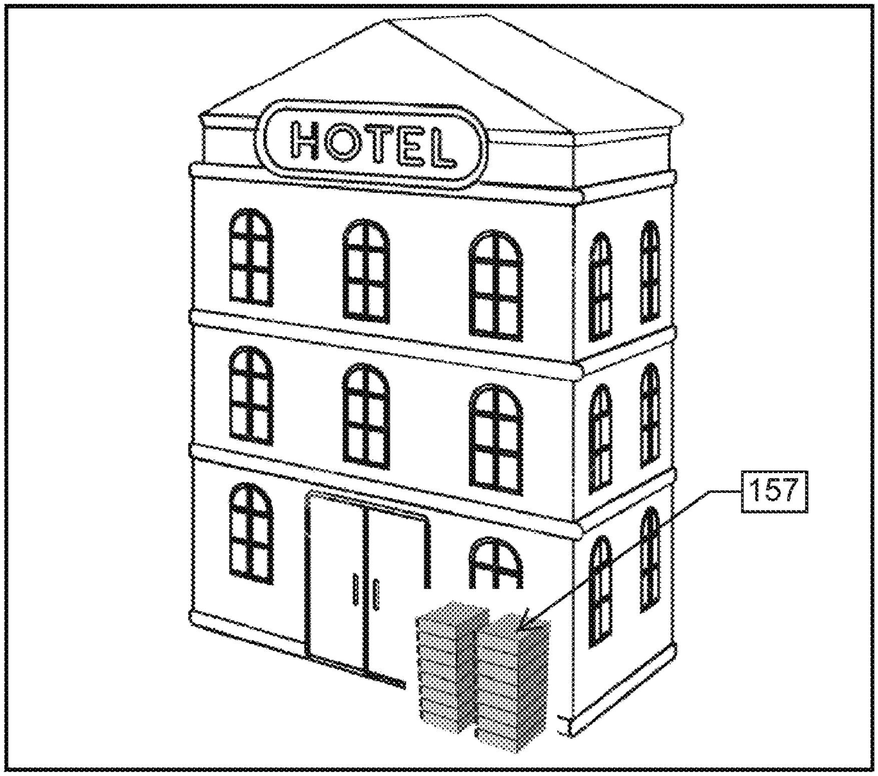

FIG. 19*e* shows an example wherein our parcel receptacle can be configured to be used by anyone in a hotel if they have authentication to access, and such authentication can be produced by our software programs which will generate one-time codes and multi-use codes.

Figure 19F:
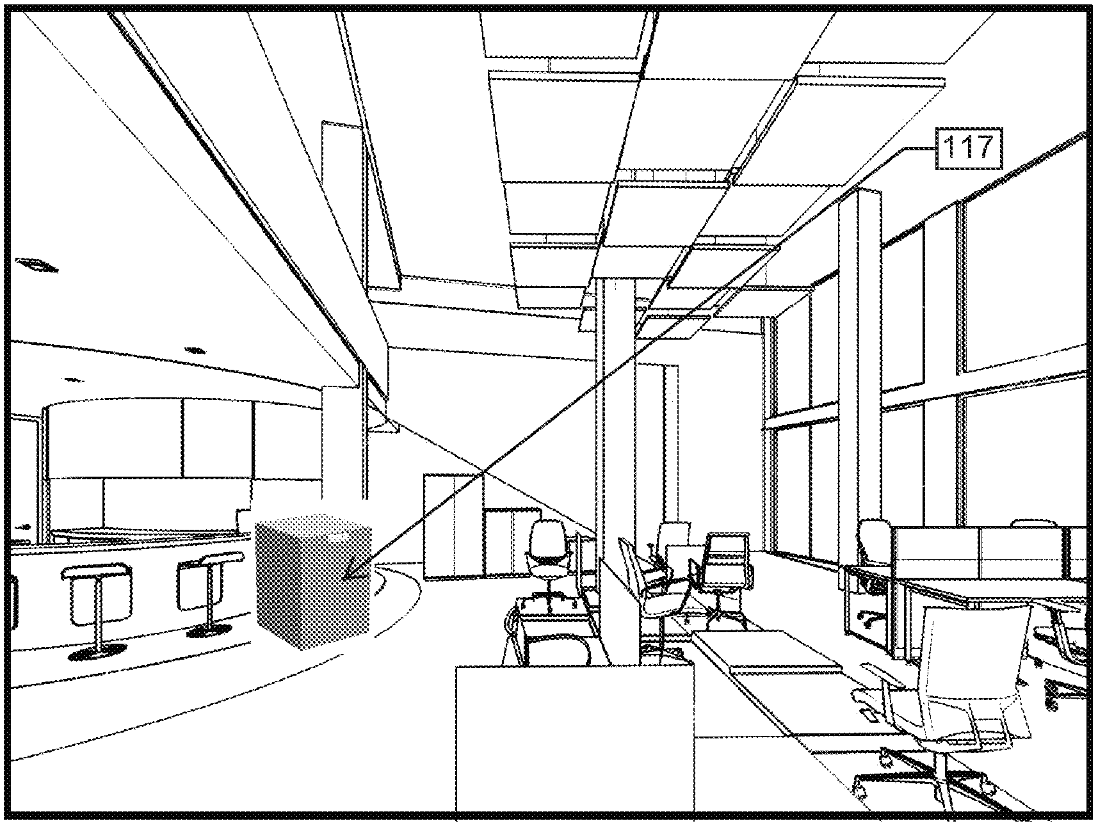
Figure 19G:
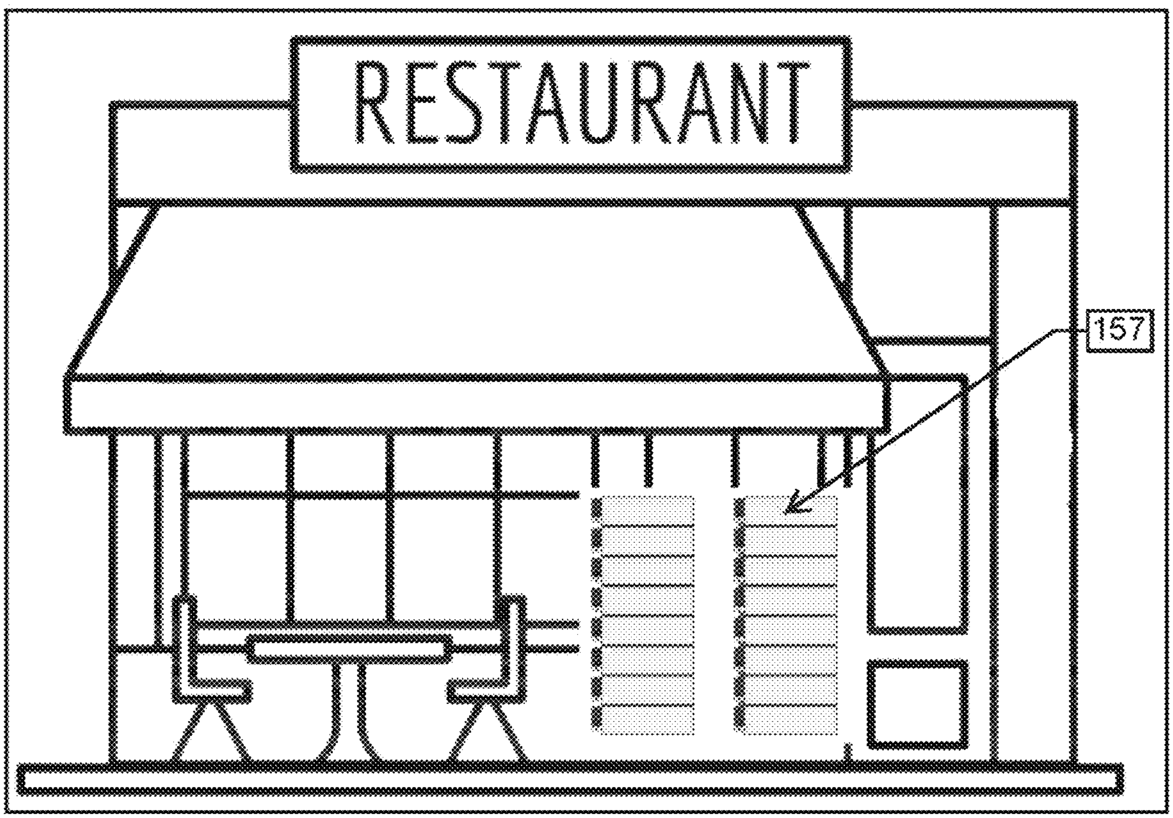
Figure 19H:
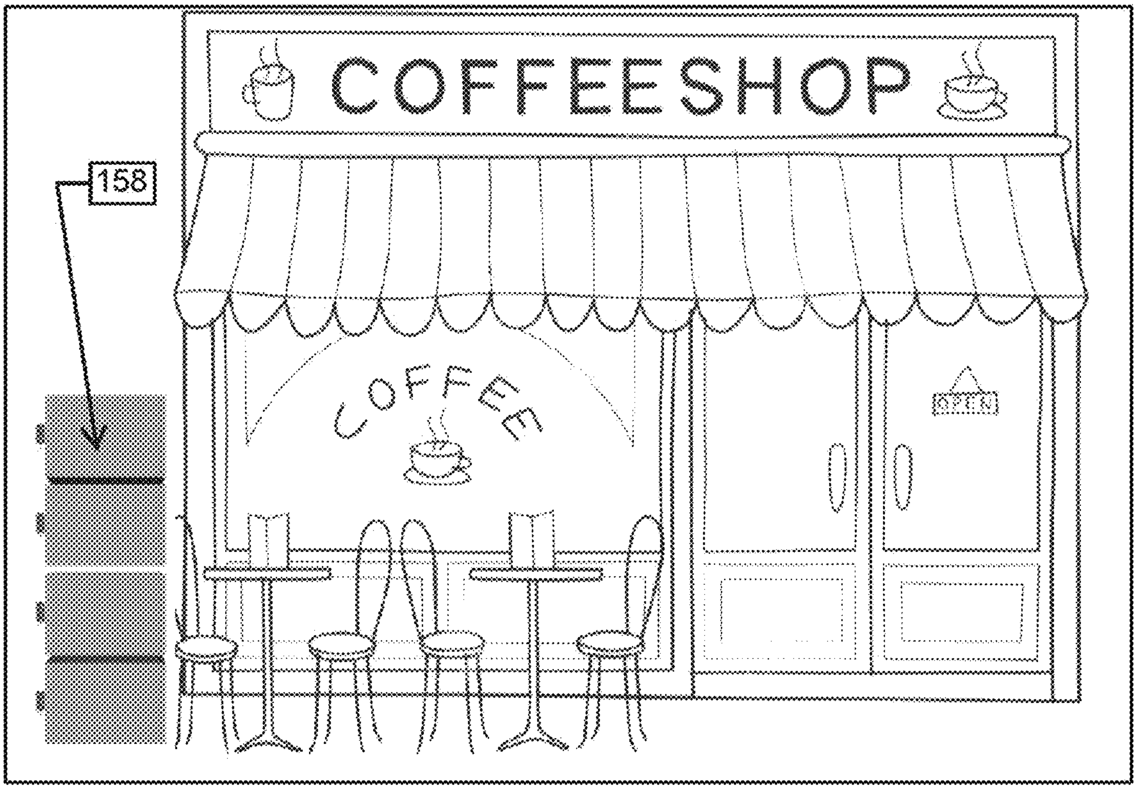

FIG. 19*f* is very similar to that of FIG. 19*e*, except that it is shown in office locations wherein anyone in an office can be provided access for its use. FIG. 19*g* is like usage of FIG. 19*e*, and the parcel receptacle can be used by restaurants or its customers to exchange their purchases and goods securely. FIG. 19*h* is very similar to that of FIG. 19*g* and as an example it is shown in front of a coffee shop and can be used by the coffee shop owner or its customers.

In all these FIGS. 19*a* through 19*h*, the idea is that our parcel receptacle can be used in a very broad set of applications as the fundamental concept is about secure exchange of packages.

Additionally, one or more of the electronic and technological components of the parcel receptacle shown in these figures can be configured in many ways to secure the parcel receptacle without the need of a connecting cable between the parcel receptacle and a doorknob or door handle or hook, or any fixed object. In my previous U.S. Pat. Nos. 10,083,561 and 11,206,939 some additional references of electronics, PCBs and their designs and configurations were explained, and for people familiar with the art, their function and purpose are standard and common and hence such knowledge is assumed in this application for the sake of brevity.

An example of a typical use of an embodiment is described to help in understanding the application of this invention. This scenario is to provide a general understanding of a typical application and operation. It should be noted that any real-world applications of the various embodiments can be significantly broader and should not be limited to the application or operation described in this section. In addition, there are features of various embodiments, some of which could be optional in nature, (for example an electronic solution involving technologies such as RFID, Bluetooth, Wi-Fi, mobile phone-based applications, NFC and other wireless solutions), and may involve steps that are slightly different when compared to the steps of using a non-electronic, physical mechanism that involve a manual lock and key solution as described herein. For the sake of brevity, and to avoid over complication of explanations by compounding all possible permutations and combinations of optional features, those optional features or procedures may not be explained or described adequately in this section. However, several electronic parts and components are shown in multiple figures, and for anyone familiar with the art, operation of those electronic or wireless components can be easily substituted appropriately for their physically operated counterparts and are straight-forward and can be inferred by careful analysis and review of all parts and components mentioned or described in this document.

The core objective of this invention is to receive, return or exchange parcels and services securely for online shoppers. A parcel receptacle can be tethered securely to a stationary fixture by means of a physical cable, or by electronics and technological means. When such tethering is tampered or attempted to be tampered, a notification event can be configured, wherein such notification event can sound an alarm and send communication alerts to authorized individuals and/or devices. Both are explained in good details in various parts of this application.

Features and Intended Functionalities of Components and their Usage References

There are many parts that make up this invention. Most of the key parts and key electronics are explained below. However, there are many generic parts that are necessary and common, such as screws, nuts, wires, capacitors, resisters, electronic relays, etc., and that are needed in most applications of this nature and those are considered obvious, and not all of them can be realistically listed here, and those are obvious to people who are familiar with the art and does not require special mention. Here is an overview of some of the key parts and features.

Doorknobs or Door handles or Door Knockers or Any Stationary Object: The physical tethering of a parcel receptacle may involve utilizing doorknobs and/or door handles or wall mounts (161), door knockers or doors. However, it is important to note that any existing stationary object present, that is conducive to be utilized in a meaningful way with the mentioned security apparatus, is expected to be utilized for achieving the intended purposes of this invention. So, when a doorknob or door handle or door knockers or door is referenced, it is understood that any other object or any stationary object, which can potentially be utilized like a doorknob or door handle or door knockers or door, is automatically included for the purposes of this invention, although the words such as “any other object” or “any other stationary object”, may not be referenced explicitly each time. These doorknobs are mentioned as part 101, 102, 103 in various figures.

Parcel Receptacles: The various embodiments of this invention involve utilization of a tamper-proof, weather-resistant, flexible or rigid or semi-rigid parcel receptacle. Parcel receptacle can have access from the top portion as shown FIG. 8*c* or FIG. 11*a*, or it can have access from the front side as shown in FIG. 19*c* or 19*d*. The parcel receptacle can be either a fixed size or a variable size to fulfill one’s need to accommodate various scenarios associated with delivery, return or exchange of parcels. In addition, the parcel receptacles shall have one or more of locking and/or unlocking mechanisms described elsewhere in this application to identify authorized individuals and to facilitate access for delivery of parcels or return or exchange of parcel from parcel receptacles. Also, in many practical implementations, multiple parcel receptacles may be necessary to receive multiple parcels and deliveries in a given day, and as such, every reference to a single parcel receptacle should automatically be interpreted as a reference to one or more parcel receptacles without requiring to be mentioned specifically as such. Additionally, to receive groceries and other goods that are perishable in nature, and that require cool temperature, parcel receptacles can be configured to be refrigerated by dry ice or other appropriate means in order to fulfill the intended use of the application to maintain certain temperature. Additionally, a password and code generating mechanism can be configured using one or more computer or electronic means to access the parcel receptacle so that authorized individuals can deliver, retrieve or exchange one or more packages into a parcel receptacle.

Figure 1A:
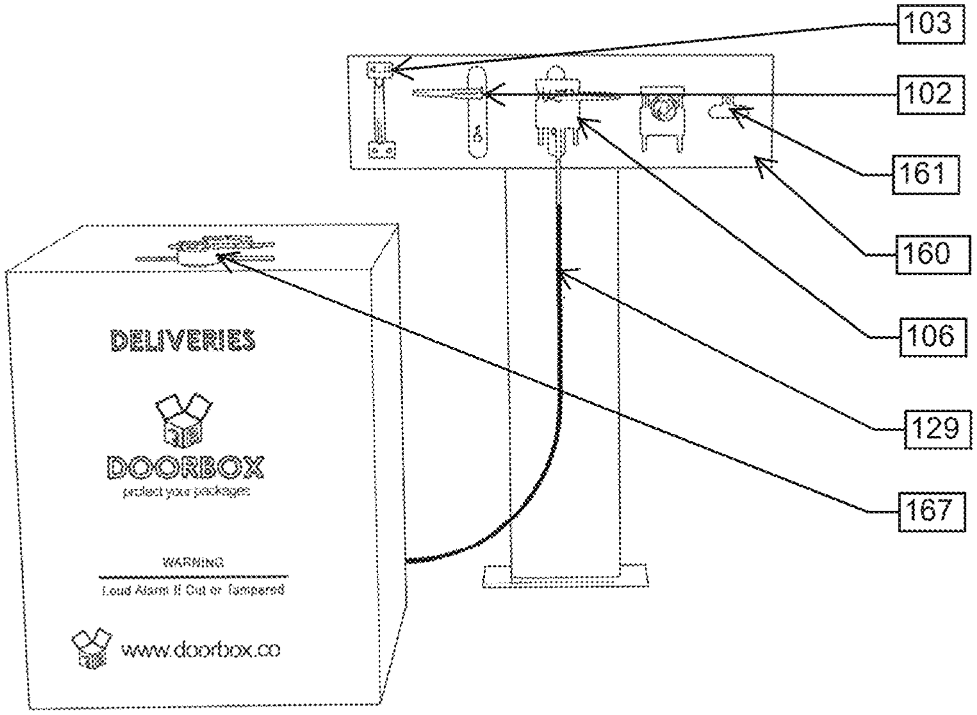
FIG. 1A shows a typical parcel receptacle that can be connected to various types of stationary objects.
Figure 1B:
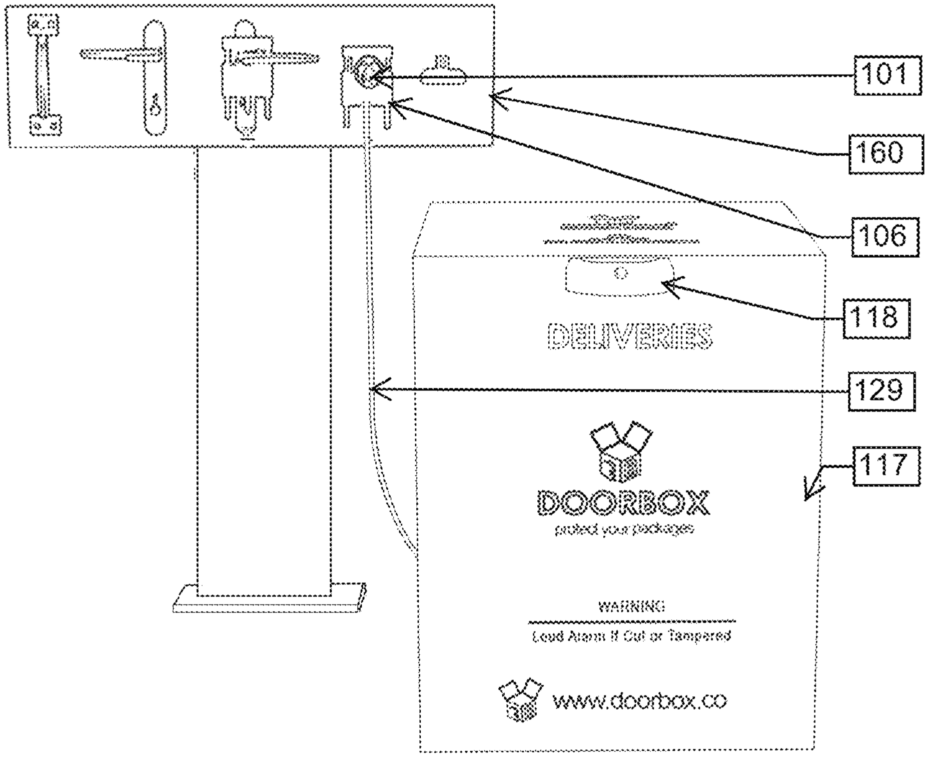
FIG. 1B shows typical parcel receptacle connected to a circular doorknob and tethered physically. This is a smart DoorBox and comprises of several technological elements in it for locking and unlocking and is also tethered physically.

Cable, Chain or Rope References: The word cable or chain or rope are referenced a number of times in this application. It is important to note that these words have meanings that are similar and interchangeable in the context of this application, and these words are not meant to be used in any restrictive manner intentionally or unintentionally. In addition, reference of cable, chain or rope, in general, infer that they are flexible in nature. However, some or all portions of these cable, chain or rope in some of our embodiments, may need to be configured to be rigid so as to fulfill the purpose of its application in specific designs. So, it is important to note that references to cable, chain or rope are not only meant to be interchangeable in nature, but could also mean to refer to a rigid, semi-rigid or flexible material in nature, and no restrictive meaning is intended to be inferred or derived from their usage or reference. In addition, the reference to a cable to wrap around a doorknob could also mean usage of a solid, contoured piece of a material to hold a security apparatus to a door knob securely and can actually mean to refer to a solid piece rather than a cable assembly. So, in essence, the word cable, chain or rope or their respective assemblies such as cable assemblies mean to infer a way of connection between one component and another component in the embodiments in the context of this invention, and shall not be inferred to be restrictive in their meanings intentionally or unintentionally. All these cable/rope/chain comments are applicable even in the context of creating a connection mechanism to connect two different parts or components together securely to prevent separation of one from the other and alerting by audible alarm or other means in case of theft or other such unauthorized tampering or separation. An example cable is shown as part (129) in FIG. 1*b*.

Locking and Unlocking Mechanism: This is a very essential and important feature of this invention. There are a few places where locking mechanisms are utilized in this invention. First, close to the doorknob or door handle to which a security apparatus can be connected. Second, on the parcel receptacle to secure the parcel inside the parcel receptacle to ensure only authorized individuals have access to it. The locking and unlocking mechanism can be a) simple, conventional physical type involving combination locks or electronic locks (FIG. 1*a*, part 167) or other locks that utilize latest advancement in technologies such as b) IOT-operated wi-fi locks, c) Bluetooth-based locks d) mobile phone-based applications e) Fingerprint based activation, or f) any wireless-based communication such as Near Field Communications (NFCs) protocols and other Wi-Fi and wireless technologies. In addition, the locking and unlocking mechanisms could involve electronically or electronically activated solutions such as a solenoid valve driven, or other electrically or electronically and wi-fi activated locking and unlocking mechanisms. So, it is important to note that any reference to a locking or unlocking mechanism anywhere in this application automatically means the use of one or more of any of these solutions without requiring any specific mention or reference them to avoid repetition.

Figure 8F:
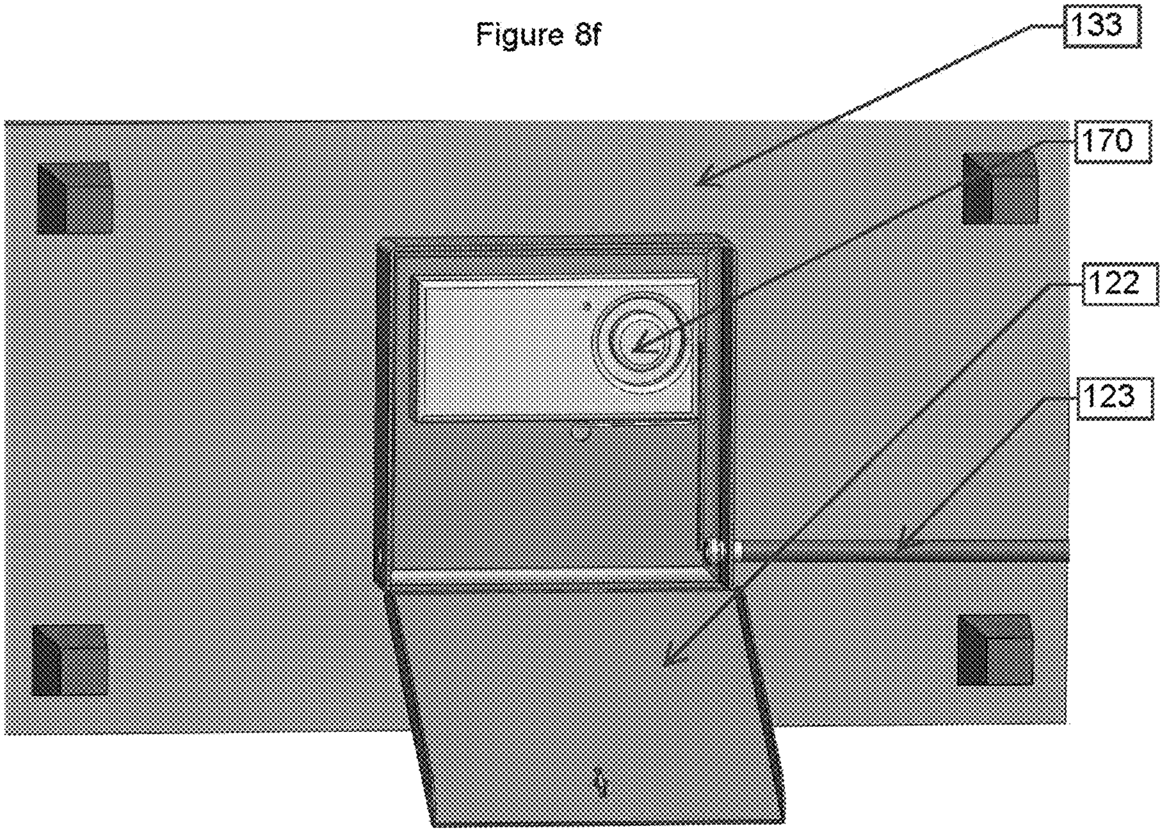
Figure 8G:
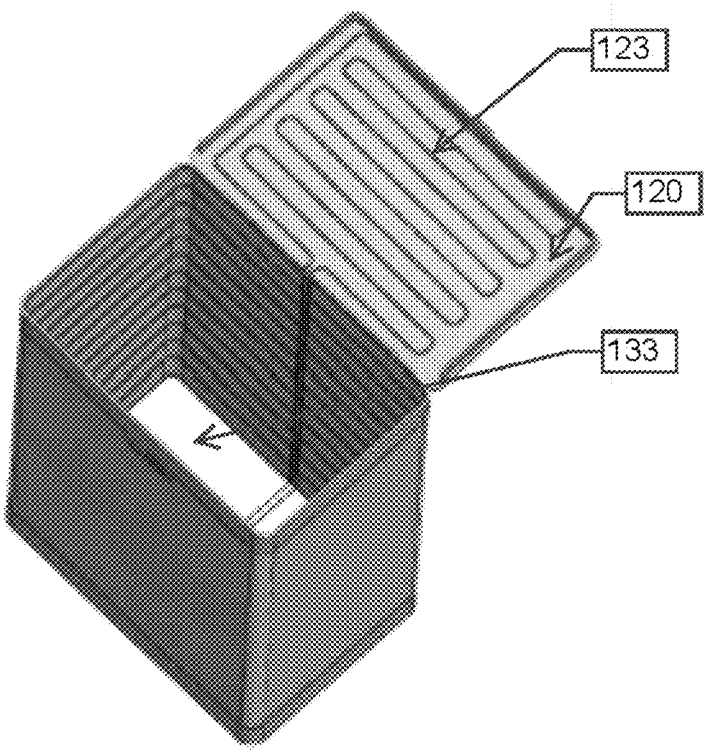
Figure 8H:
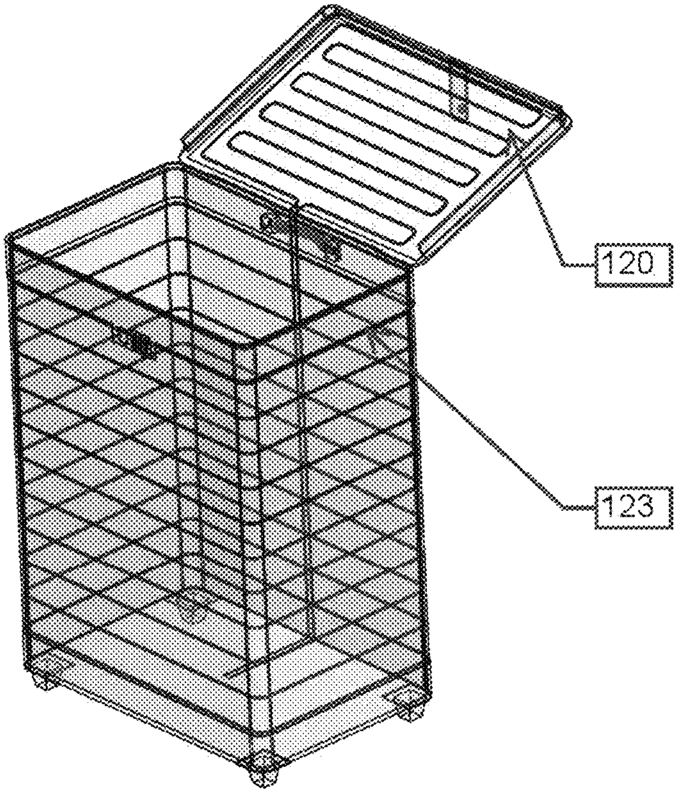
Figure 9A:
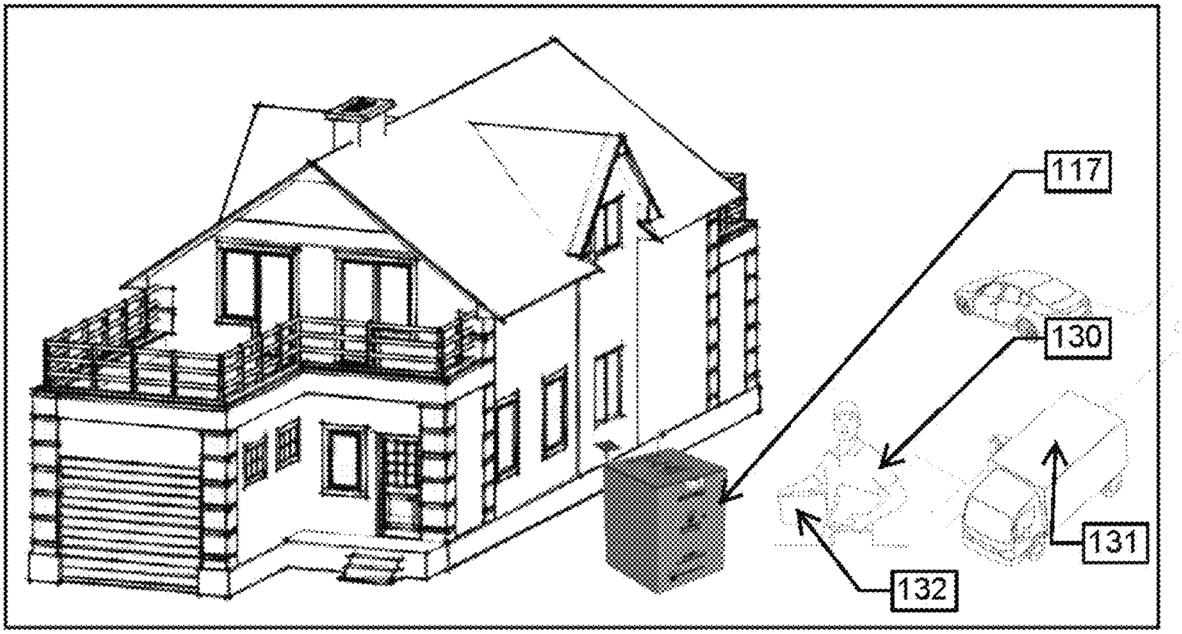
Figure 9B:
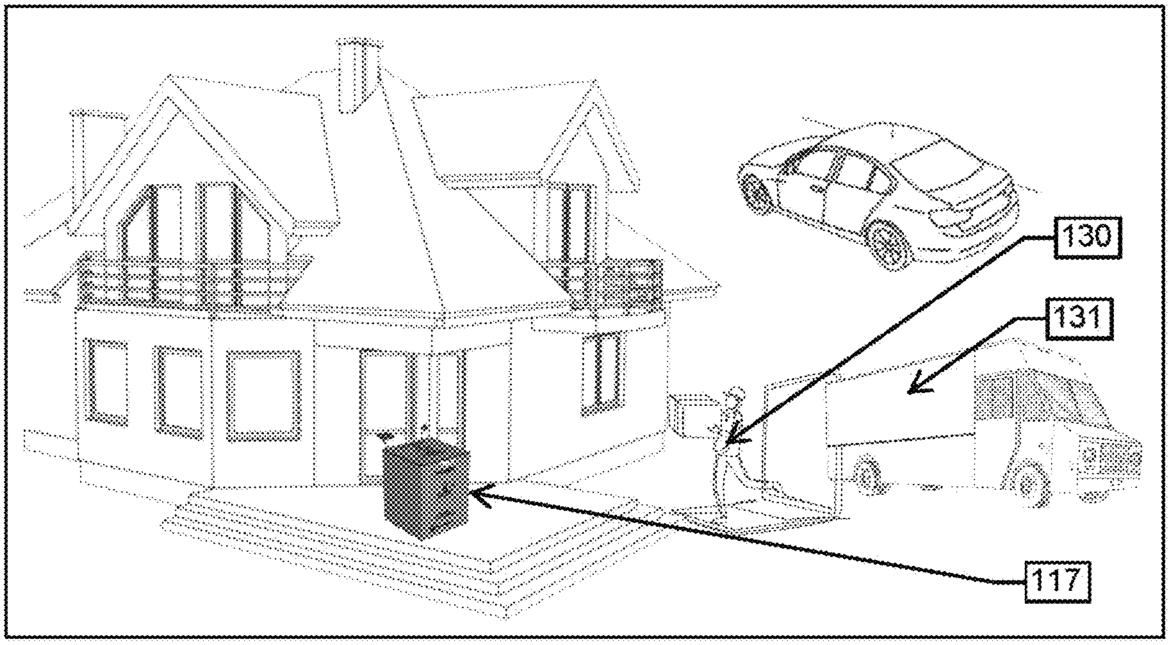
Figure 10A:
Figure 10B:
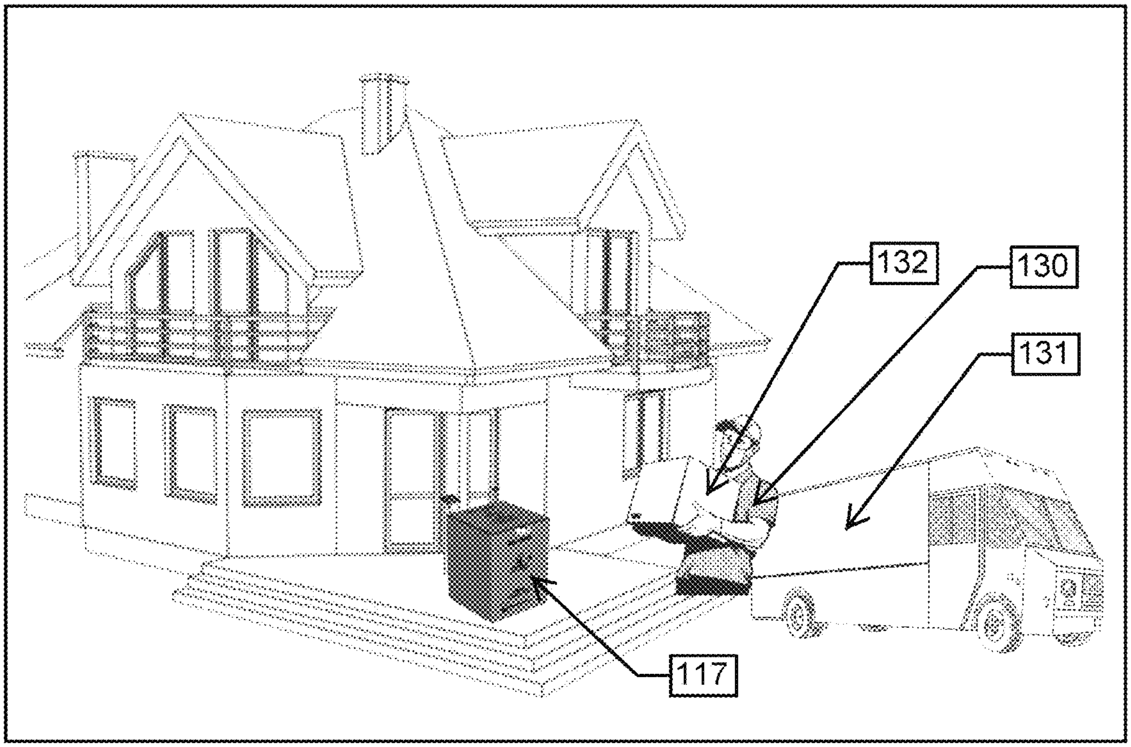

Intrusion and Audible Alarm: The various embodiments can have an intrusion alarm system if the security attachment and/or parcel receptacle and/or lock(s) are attempted to be tampered. The sound alarm will last for a preset time interval so as to not drain a battery or any source of energy and at the same time deter unauthorized person from continuing their intrusion or tampering. This can be an embodiment where additional security is desired in certain locations or applications. An additional embodiment is also to have a feature where the decibel level of the sound and time duration of the alarm can be adjusted. A typical example the audible alarm set up is shown in FIG. 8*f*, but it can be present anywhere in or around parcel receptacle or the various enclosures (146) attached to it.

Motion Sensor, Camera and Video: To enhance usefulness of our invention, a camera system can be configured in the security attachment and/or parcel receptacle to capture activities associated with various scenarios and events that occur while the system functions to fulfill its intended use. The camera system can be configured to capture pictures or videos of activities in and around its place of use and operation to enable monitoring and/or controlling and/or recording of activities. The camera system can be configured to be equipped with a motion sensor (can be integrated or can be an additional Passive Infrared (PIR) Sensor to detect motion) that is expected to trigger capturing of activities when there is any motion or tampering of the system, or when a record-worthy event occurs near the parcel receptacle. There are many record-worthy scenarios during which the camera and video recording can be configured to be used and not all scenarios can be adequately covered or explained in this application, but here are some common examples and scenarios during which the camera can capture activities. For example, the camera system can capture pictures or videos when a delivery personnel approach to deliver a parcel. The camera can capture when a customer or recipient intends to return a parcel and when a carrier personnel approach to retrieve the parcel from the parcel receptacle. The camera can capture when there is any movement near the vicinity of the security apparatus when such movement is expected, or unexpected or suspicious. The camera could also capture when there is any unexpected jerk or tampering of any of the components of the system/apparatus. The pictures and videos can be configured to be either stored locally or on the cloud or transmitted or communicated wirelessly or streamed instantaneously depending on the scenario.

In addition, camera can be configured to be used like a scanner to trigger various actions. For example, such actions could include monitoring or controlling of the locking and unlocking mechanisms of the security apparatus and/or parcel receptacle. For example, when a carrier scans the tracking number or order number, the camera can be configured to enable such scan, and if such parcel is expected or authenticated, allow unlocking of the parcel receptacle to enable placement of the parcel inside the parcel receptacle. In addition, integration of quick response (QR) codes or Universal Product Codes (UPCs), or other forms of barcodes with the camera scanning can be configured to monitor and control the locking and unlocking of the parcel receptacles. In appropriate cases, upon authentication, such actions can be configured to be integrated with the digital displays to communicate messages, alerts and codes. This camera is shown as part (112) in FIG. 4*a* and FIG. 14*g* as an example. The camera can also be used to take, store or transmit still pictures of the contents inside the parcel receptacle at any time or when needed or on-demand.

Notifications, Communications and Alerts: The various embodiments can be configured to utilize one or more of technologies to offer features to notify communicate or alert the owner or recipient of the system/apparatus during appropriate events. For example, when a parcel is delivered, it can communicate the status to the recipient that a parcel has been delivered. The parcel delivery event can be configured in one of many ways. For example, when there is a movement in the vicinity of the assembly followed by an action where the parcel receptacle is locked, it can be configured to accept those activities and associate them to an event of parcel receipt. Similarly, when there is a movement in the vicinity of the unit, followed by an unlocking of the parcel receptacle, it can be configured to associate and conclude that a parcel has been collected by carrier personnel to return a parcel by the recipient. Similarly, where there is any movement in the vicinity of the assembly and when there is any unexpected tampering, it can be configured to notify the recipient to alert such uncommon activities. By integrating the parts of the system with appropriate computer program and appropriate algorithms, detection and transmission of any appropriate notifications or alerts via email, phone, wi-fi or instant messages can be configured.

Device Software and Mobile-Phone Applications: The various embodiments can be configured to utilize integration of appropriate mobile phone-based applications, commonly referred to as mobile phone app, or software installed on the device, to communicate various scenarios, events, statuses, notifications, alerts, pictures, videos, etc. to authorized individuals, so as to allow interaction with the security apparatus and parcel receptacle in a meaningful way. For example, locking and unlocking of the parcel receptacle and/or the security apparatus can be configured to be controlled wirelessly in many ways including control from a mobile-app or from an internet cloud-based software program remotely, or can be configured to automatically lock and unlock based on package delivery status.

Electronics and Computer Hardware: Any technological solution comprises of electrical or electronic parts and one or more of computer hardware. Our security apparatus and/or our parcel receptacle will house the necessary electrical and electronic parts and one or more of the necessary computer hardware including the necessary PCBs (printed circuit boards) to support and fulfill the features and functionalities described in this invention. For pictorial purposes, some of these were displayed in multiple figures in my earlier U.S. Pat. No. 10,083,561, and it is shown for conceptual reasons only and their actual location may be anywhere. This electronic circuit PCB Board is shown as (145) in FIG. 17*d*, and it would be housed inside a weatherproof enclosure and may not be visible from outside. Depending on a specific embodiment, this part can be housed anywhere inside, outside or near the parcel receptacle (117) to suit a particular application.

Microcontrollers such as Arduino or Arduino-like or Arduino equivalent have many attractive features that can be utilized in our application. Also, hardware like Raspberry pi or its equivalent also offers significant benefits for our application. Wi-fi modules, LED lights, 2-way audio, voice guidance, and many other peripherals are readily available and present for one or more of these hardware, and not all of them are specially listed in our application or explained in detail. For example, gyro meter, accelerometer and magnetometer all provide excellent features that can be utilized to sense movement, orientation or distance in our application, and they may or may not been highlighted separately. Similarly, an ultrasonic sensor (172) may be utilized for our package detection algorithm singularly or can be integrated with observations from a PIR sensor or an inside camera image, or other peripherals or software to be configured and deployed in the system. These details are not specifically elaborated as there are many configurations possible and all possible combinations of these hardware are included and covered in this application.

Energy Sources and Supply: To power the electrical and/or electronic or computer hardware, the components need power or energy. Energy can be provided from a regular power outlet (173) or from a battery (169) or a rechargeable battery or from a solar panel (144) or by other means. The batteries can be housed anywhere inside, inside or near the parcel receptacle depending on its size and utilization.

Data Storage & Transmission: Data is powerful and in fact very crucial these days. When camera and/or video is activated either due to motion around the device, or due to a configured event such as parcel receptacle opening or closure, or tampering, etc., data is generated. To store data, a storage device such as an SD card, a hard drive or a flash drive may be used and can be housed inside or near the parcel receptacle. In addition, through a mobile app or through software or programs installed on the device, and with wired or wireless connectivity via wi-fi network, or via carrier-operated networks via SIM cards, data can be stored or transmitted remotely or streamed instantaneously to one or more external devices including to an internet cloud platform. Working with other electronic or computer hardware that is present in the system, such data can be transmitted to appropriate authenticated devices via commonly available data transmission protocols. In addition, when data is not necessary to be transmitted instantaneously at the time of data collection, a mechanism can be configured to be provided to retrieve the data by a wired or wireless mechanism on an as needed basis. In addition, all data associated with the device can be configured to be stored, transferred or transmitted to external sources including an internet cloud platform.

Display Panel: As shown in many figures, part number (111) represents a digital display mechanism that can be integrated into many embodiments, and can be configured to communicate several messages, codes, alerts, statuses, etc. in an interactive fashion to authorized individuals. From those displays and codes, locking and unlocking of locking assemblies and/or parcel receptacles can be configured and selective access to authenticated individuals can be provided.

Illumination Lights: As shown in many figures, part number (137) represents an illumination light. One or more of these can be present and both inside and outside the parcel receptacle. These illumination lights can be configured based on selected events or triggered events at or near parcel receptacle.

Display Signals: As shown in many figures, part number (115) represents a few display signals of varying colors. This can be configured to communicate various statuses such a battery levels, or armed/unarmed status of security apparatus and/or parcel receptacles.

Internet of Things (IOT), Wireless Technologies and Wireless Transmission: In modern days, wireless technologies offer a great level of convenience and there are numerous types of wireless communications. The data transmission, locking and unlocking mechanisms can all be operated either via physical means, or via wireless means. Wireless signals may fall into one or more categories such as IOT, RFID, Bluetooth, SIM card-based Wi-Fi networks, NFCs, other types of Wi-Fi networks and technologies. All these technologies are configured to be implemented with my invention so as to fulfill its intended use effectively even if these are not mentioned specifically each time for sake of brevity.

Fingerprint and Biometric Module: A finger print or biometric module can be integrated in the doorknob security apparatus and/or the parcel receptacle. This feature can be configured to identify authorized individuals, and upon such authentication, these modules can be configured to activate privileges of operation and access to security apparatus and/or parcel receptacle to those authenticated individuals. It is shown as part (113) in many figures.

GPS Module: A global positioning system (GPS) module can be placed either in the doorknob security apparatus or inside, outside or near the parcel receptacle. This feature can be configured for use based on need and/or a specific application. By this GPS feature, one will be able to identify the current location of the parcel receptacle at any given point. For example, this feature exists in most of the smart phones these days to identify and locate a phone, and this feature can be integrated with the security apparatus and/or the parcel receptacle. It is referred as part (127) and can be securely placed anywhere inside, outside or near the parcel receptacle.

External Enclosure: The enclosure can appear curvy as shown in part number 118 as in FIGS. 8*a* and 8*b*, or in different shapes as shown as part number 146 in FIG. 16*b* or FIG. 18*d* or FIG. 18*h*. These two part numbers 118 and 146 are essentially the same in utility, and it can appear in any other shape, size or form as well. In most embodiments, a keypad (135) is likely to be provided as one of the means to authenticate access to the parcel receptacle at or near this external enclosure. And this keypad can be mounted anywhere outside of the parcel receptacle. The location can be in the front as shown in FIG. 16*b*, or on top as shown in FIG. 18*a*, or it can be mounted from behind using mounting mechanism on part number 134 on the back side. Each of these embodiments and placements offers certain advantages and all are covered in this invention.

Cloud Platform Integration: Technology, software and storage are important elements that are essential for the success of my invention. Internet cloud provides an amazing platform as all three of these are abundantly present in a typical cloud platform. So, wherever possible and appropriate, the cloud platform can be tightly integrated with my system in every aspect of my invention. Specifically, the cloud platform can be configured to connect to the system through a variety of technological means discussed elsewhere in this document and can provide numerous benefits associated with data collection and data dissemination to authenticated users real-time instantaneously or on an as-needed basis. Among other options, wired or wireless internet connectivity to the system is expected to enable optimum and efficient use of cloud platform and implementation of many described features.

Integration with Online Retailers, Pharmacies, Other Stores and Freight Companies: One of the main purposes of this invention is to facilitate online shopping, and to enable deliveries to occur securely and efficiently. So, integration of the locking and unlocking mechanisms of the parcel receptacle with both online retailers and freight carriers is an important feature. Integration of features such as order number, or tracking number and appropriate barcodes on the parcels can all be appropriately integrated with locking and unlocking mechanisms of the parcel receptacle. In addition, these features can be coordinated with online retailers, pharmacies, restaurants, and other stores and freight carriers to come up with a mechanism to authenticate access to delivery personnel or others and to provide appropriate access to lock or unlock the parcel receptacles. Such coordination can happen electronically including via emails from the online retailer or from the freight carrier and integration of those communications to trigger one or more actions on the security apparatus or parcel receptacle.

Integration with Other Apps and Other Software from Other Companies: One of the main purposes of this invention is to facilitate security and convenience of online shopping, and secure exchange. Our package receptacle and system can be configured to work with other companies and software to provide more value to our customers. For example, applications such as nextdoor, Ring's neighborhood app, and other apps from security camera companies such as ADT, Google Nest, etc. are all feasible to be technologically integrated with our system and are included and covered in our invention. Such integration provides more security to neighborhoods and convenience to people.

Redundant Display of Parts in Figures for a Reason: It is very important to state that many of the figures show not only basic (physical) parts, but also include, sometimes redundantly, parts that are either substitute to those 'physical' parts or parts that can be optionally used as additional parts to augment the features and functionalities of our invention. For example, locking and unlocking of security attachment (106) and/or parcel receptacle (117) can be solely achieved by a physical lock and key mechanism. However, as an option and/or as a feature, RFID (114) and fingerprint (113), are shown additionally and redundantly in many figures, to explain that any one or more of these mechanisms/technologies can be used to fulfill the locking and unlocking, although not all of them (i.e., 113 and 114) need to be present in each embodiment to function as intended. Similarly, there are other many other parts such as 112, 113, 114, 115, 111 that are shown in both security attachment and parcel receptacle and the part could be in one or both depending on a particular embodiment.

Usage in or near Office Premises or Other Buildings: Employees often tend to order their personal items and have them delivered in their offices. This has caused increased workload to mailroom staffs, and increased inconveniences to office staff and growing number of organizations have informed employees not to order their personal items delivered to their office anymore. Our DoorBox can be offered by organizations that want to offer their employees the convenience of receiving their goods securely near their offices without burdening their mail-room employees. If multiple parcel receptacles are deployed in office campuses, employees can use the respective parcel receptacle number and make use of them for a temporary usage. Via GPS and other technologies present in our parcel receptacles, widespread adoption and usage is possible.

Usage For Food and Other Deliveries: There are occasions wherein people are living in high-rise buildings, or in situations wherein they are unable to meet the delivery person directly and collect their food or other items they have ordered or purchased. In those cases, they just want the delivery person to drop their food or items securely into a parcel receptacle like DoorBox and leave. In this case one can use our parcel receptacle to drop the food so that owner of the food can be notified appropriately, and they can come and collect at a later point when it is convenient for him/her.

Usage for the Travelling People: People who are travelling for business purposes or for personal reasons sometimes must buy something from online urgently. They may be staying in an Airbnb or in hotels and they are not allowed, or they choose to not receive a delivery in the respective addresses. In this case they can choose the nearest parcel receptacle to their location and make the purchase so that they can buy a product without any difficulties wherever in the world.

In the drawings, descriptions and specifications discussed above, a few typical embodiments of the invention are disclosed. Although specific terms and elements are used in description, they are used in a descriptive sense only, and not for the purpose of limitation. It is apparent, however, that various modifications and changes can be made in the specifications, designs, elements to create a greater number of embodiments without departing from the spirit and scope of the invention. The method, device, system, and apparatus are a utility product that can have several embodiments and each embodiment has one or more features to securely receive, return and exchange a parcel. The essential advantages of the various embodiments of the apparatus, method and mechanism are many, and should not be limited to the examples illustrated in this specification only.

TABLE 1

Part number and description
The following table (Table 1) provides a list of referenced parts in many figures and contains a brief description and illustration of the part where appropriate.

| Part Number | Description |
|---|---|
| 101 | A typical circular doorknob. |
| 102 | A typical straight-shaped doorknob. |
| 103 | A typical door handle. |
| 104 | Examples of Doorknockers, and this can be of many types. |
| 105 | Locking cartridges. Varies in geometrics and dimensions depending on doorknob types and other stationary fixtures. |

TABLE 1-continued

Part number and description
The following table (Table 1) provides a list of referenced parts in many figures and contains a brief description and illustration of the part where appropriate.

Figure 1C:
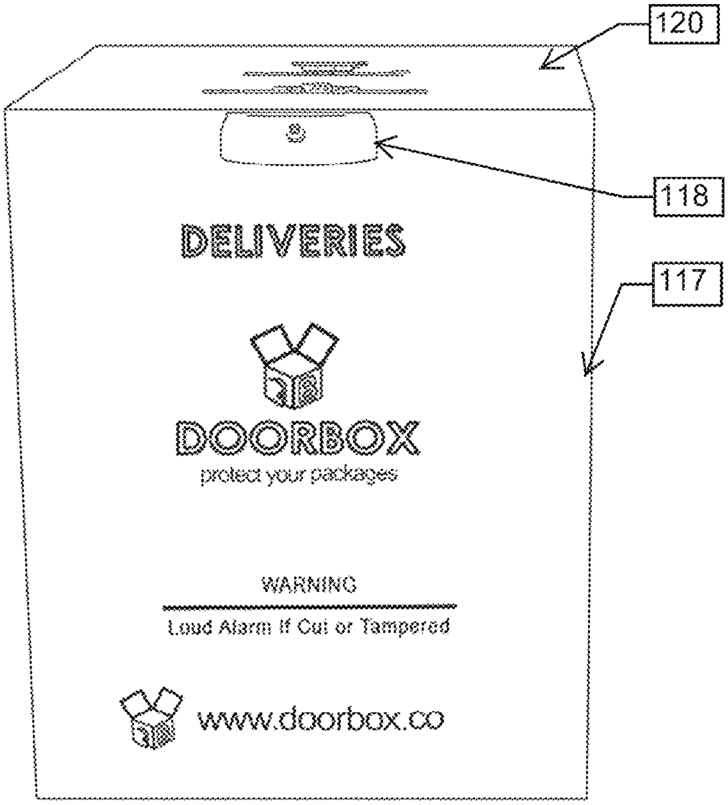
FIG. 1C is also a smart DoorBox and comprises of several technological elements in it for locking and unlocking and is tethered wirelessly by one of several means explained later in this application. This can be placed in front of a home, office or anywhere and is expected to perform all its intended functions of secure exchange of packages and other features and functions, without needing to have a physical tethering to any stationary object using a cable.
Figure 1D:
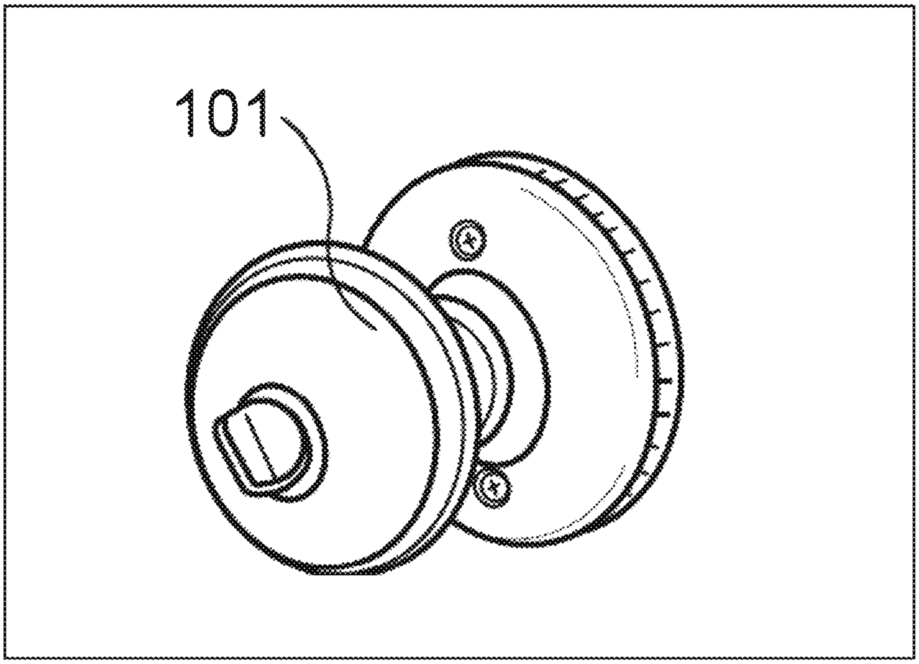
FIG. 1D through FIG. 1F shows examples of typical circular doorknobs.
Figure 1E:
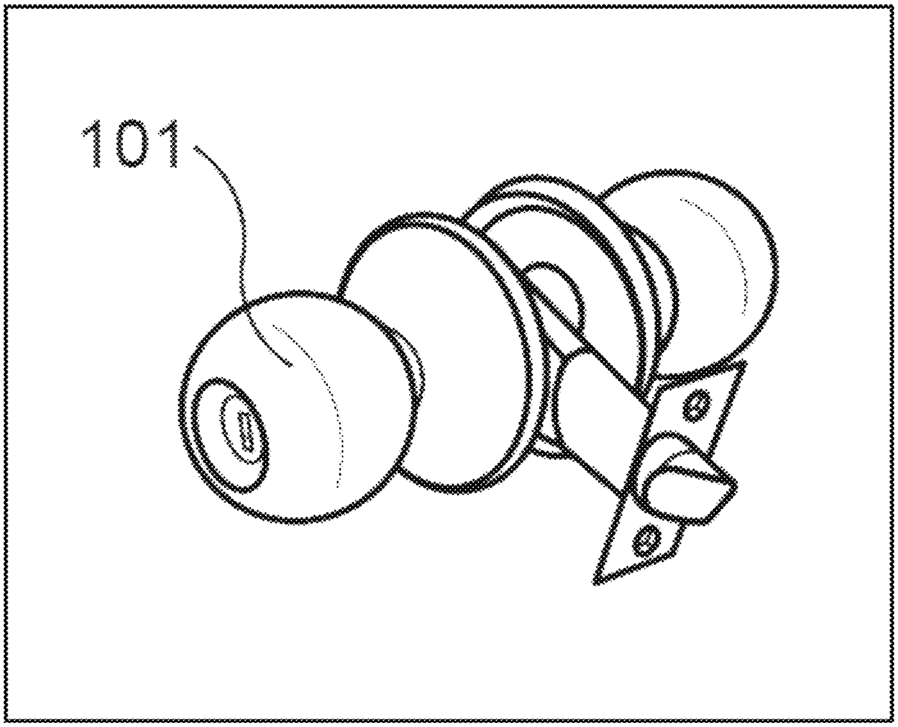
Figure 1F:
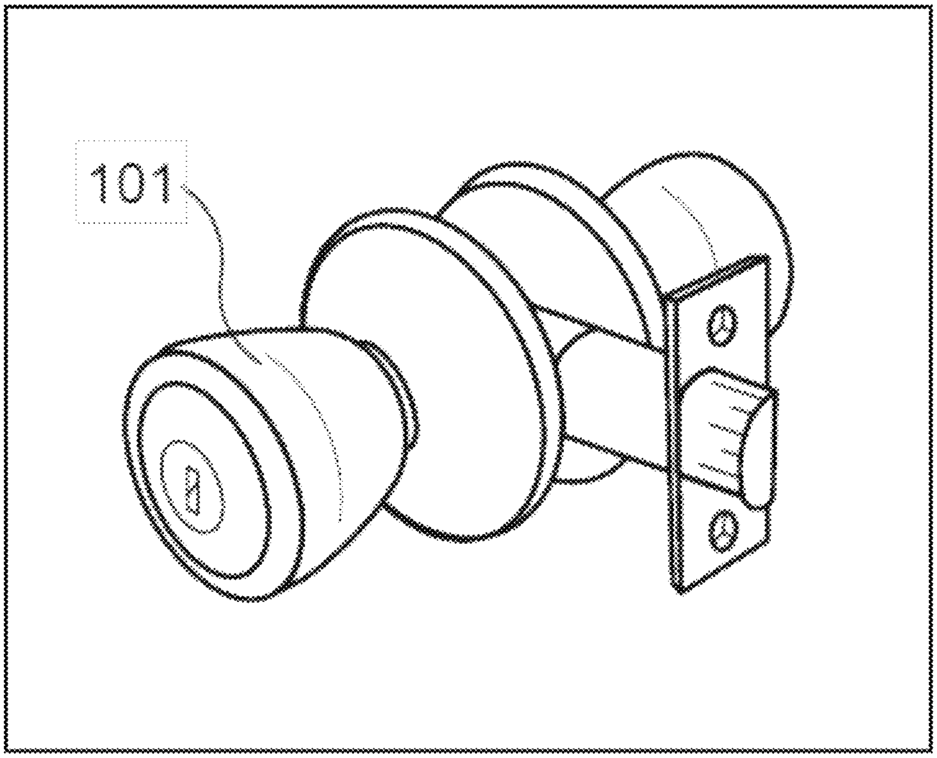
Figure 1G:
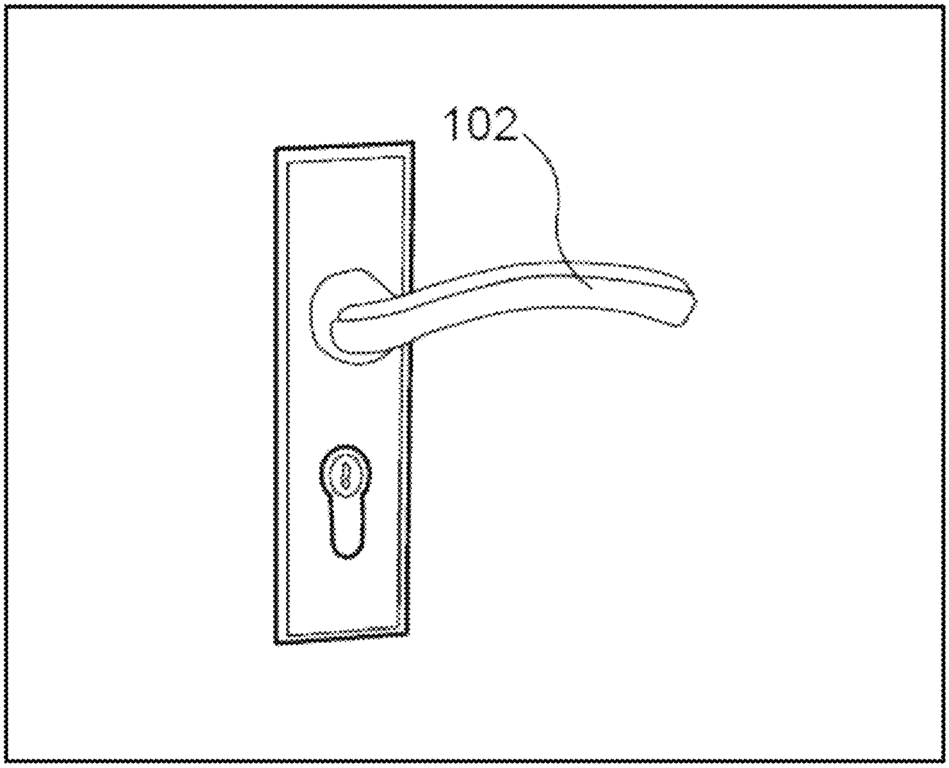
FIG. 1*g* through FIG. 1*i* shows examples of typical straight-shaped doorknobs.
Figure 1H:
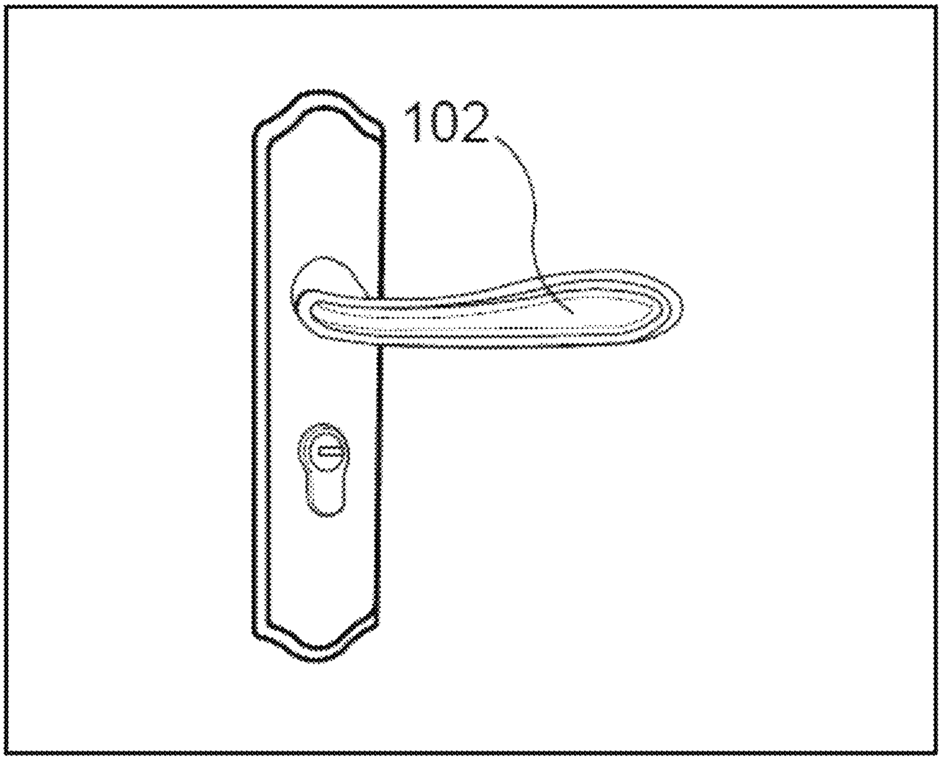
Figure 1I:
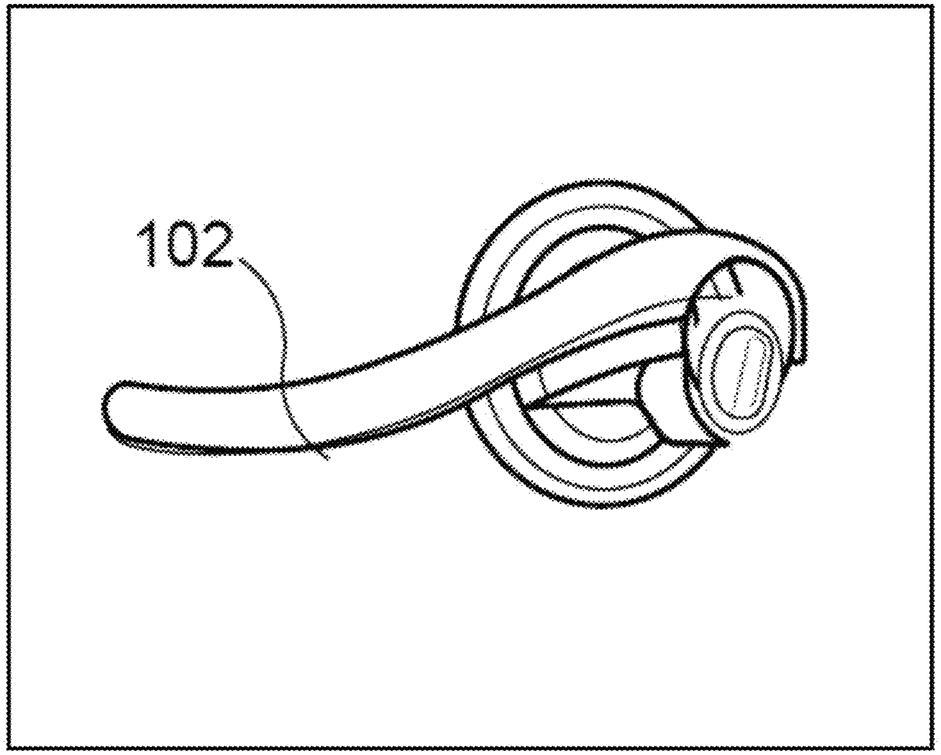
Figure 1J:
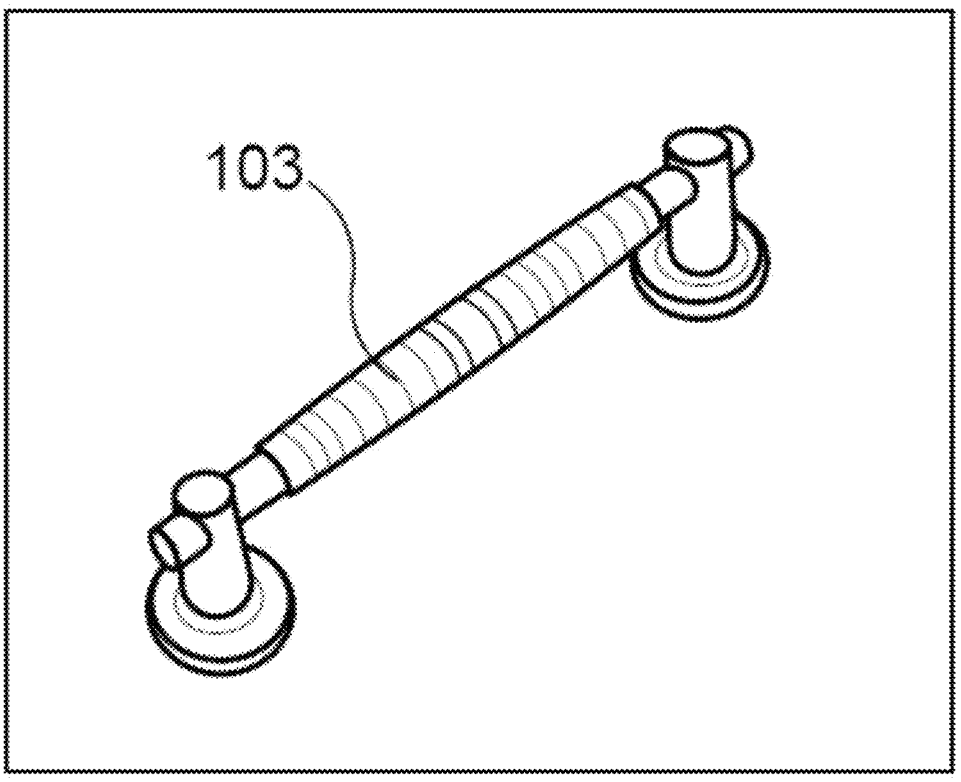
FIG. 1*j* through FIG. 1*l* shows examples of various typical door handles.
Figure 1K:
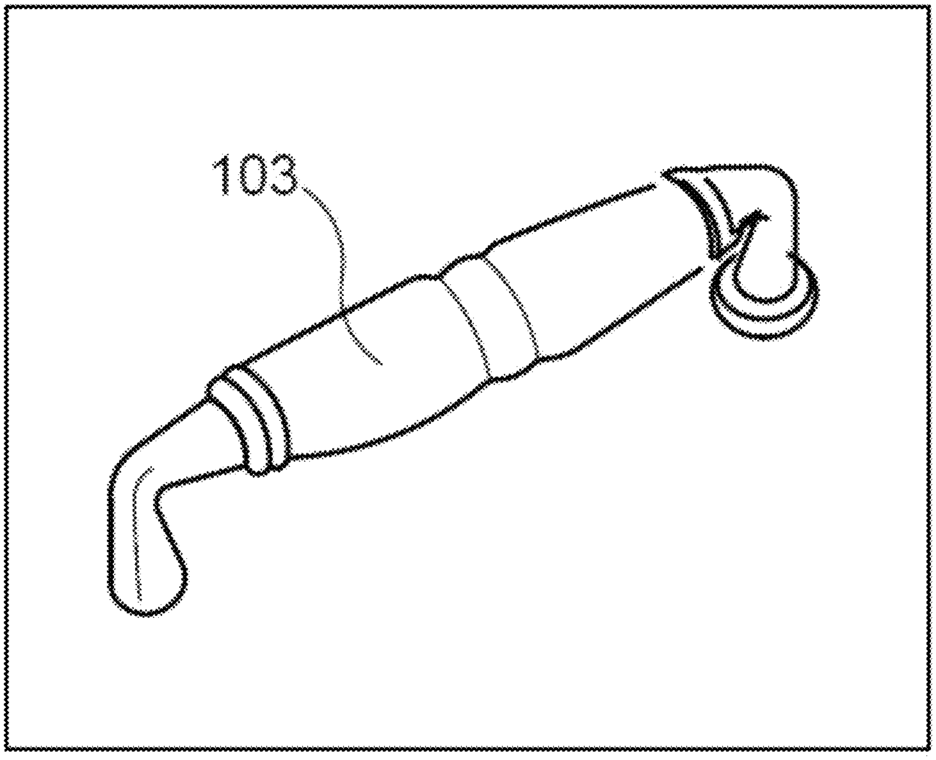
Figure 1L:
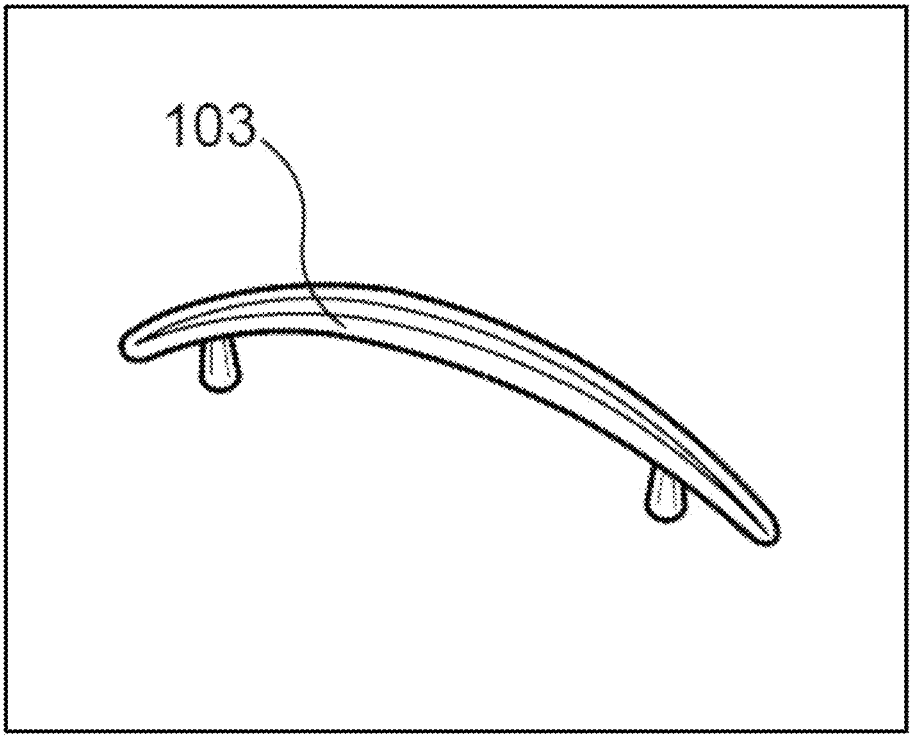
Figure 1M:
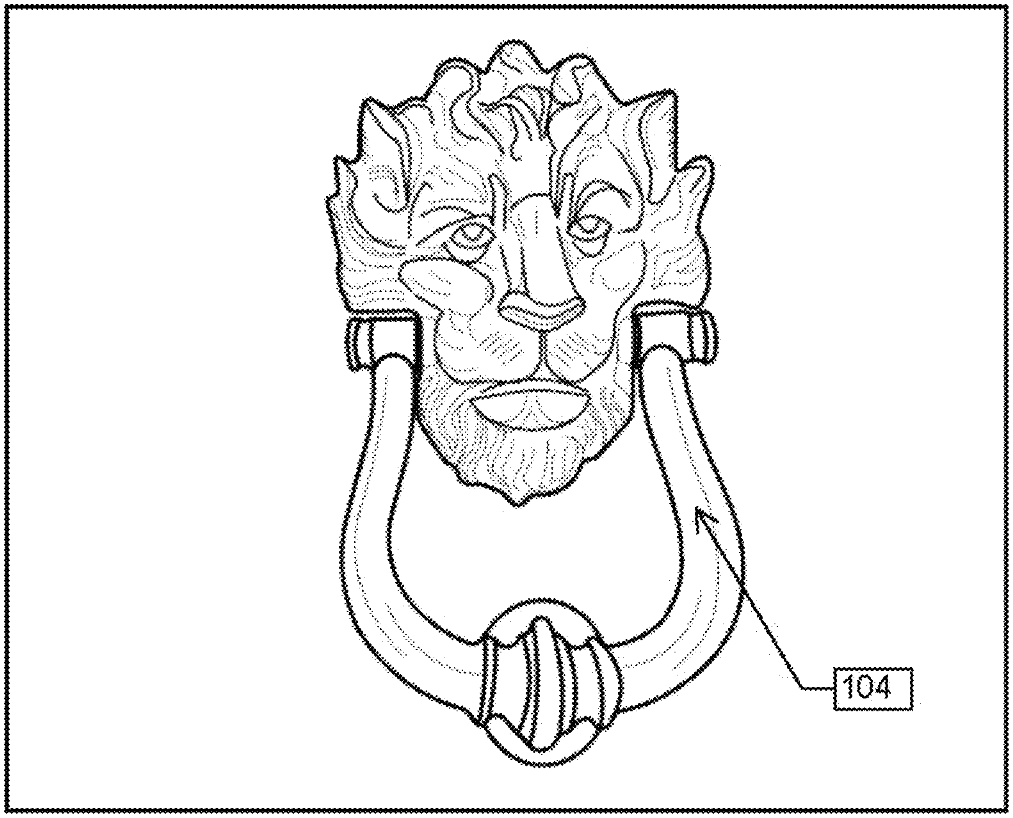
FIG. 1*m* through FIG. 1*s* shows examples of typical door knockers.
Figure 1N:
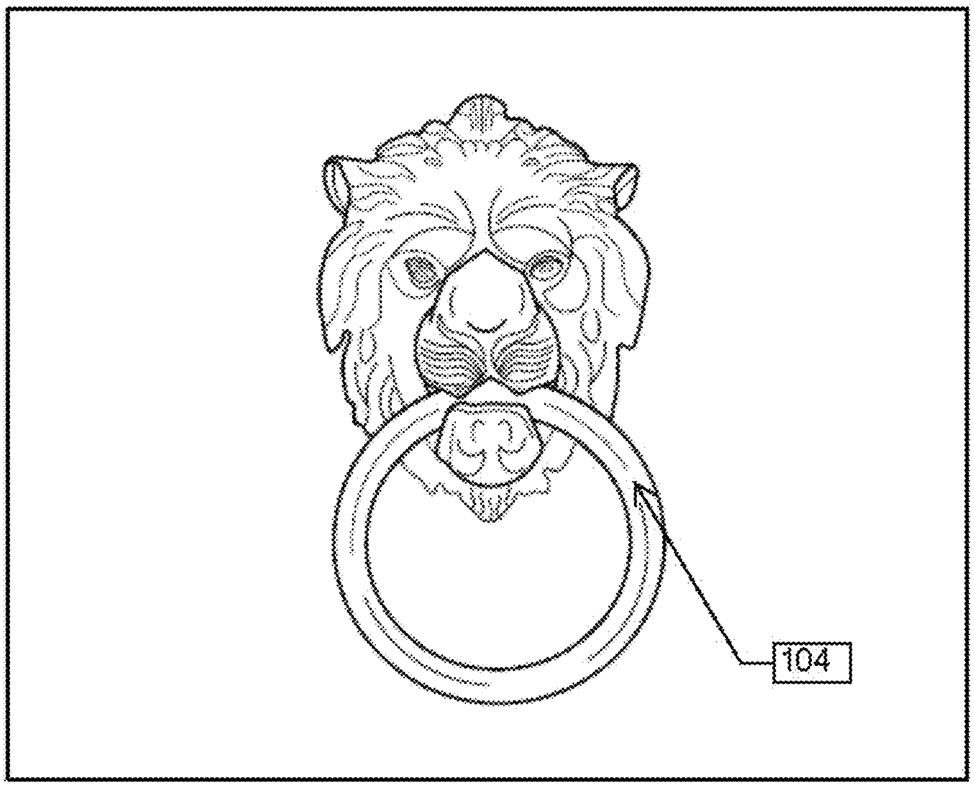
Figure 1O:
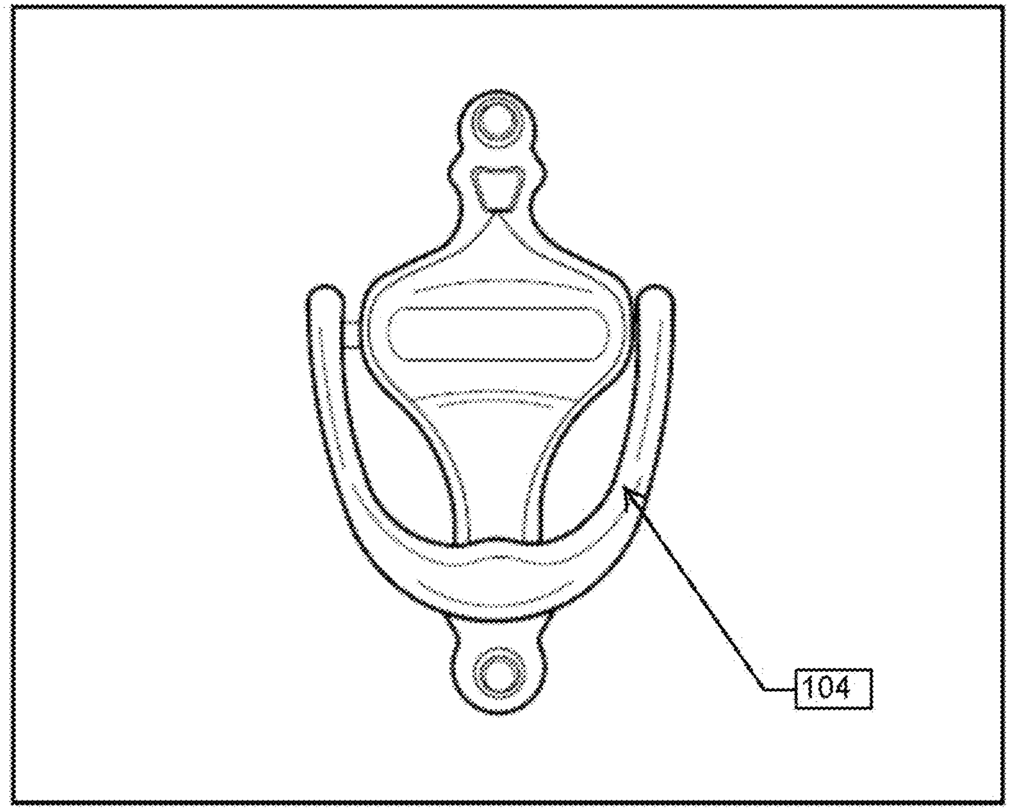
Figure 1P:
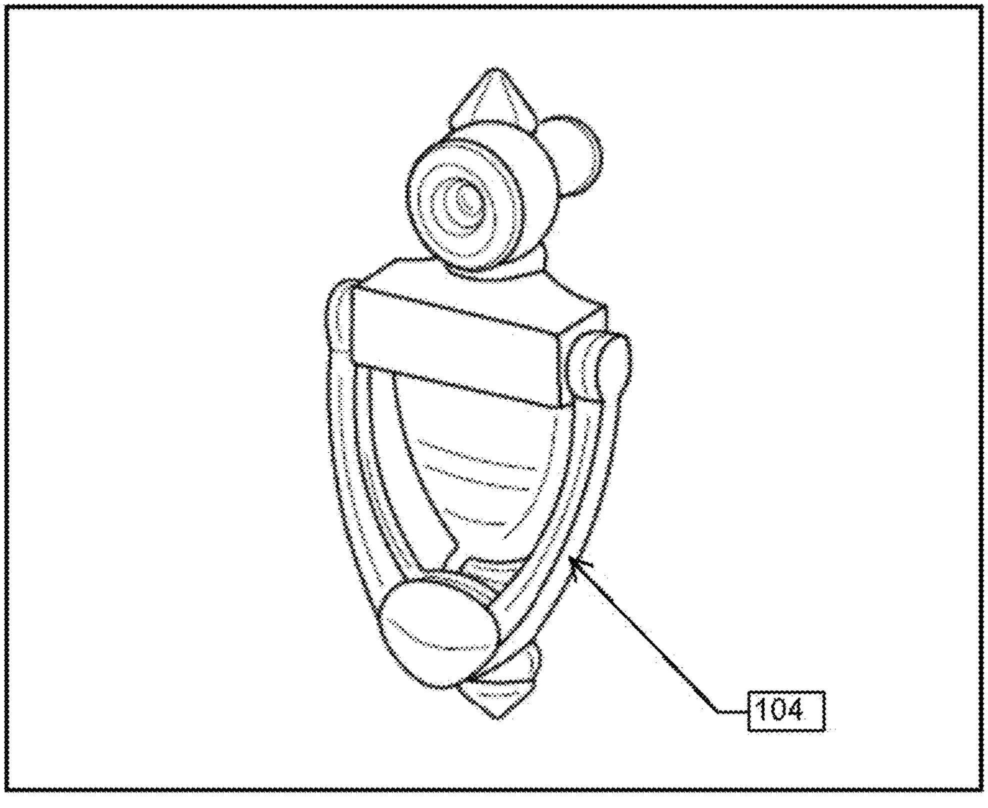
Figure 1Q:
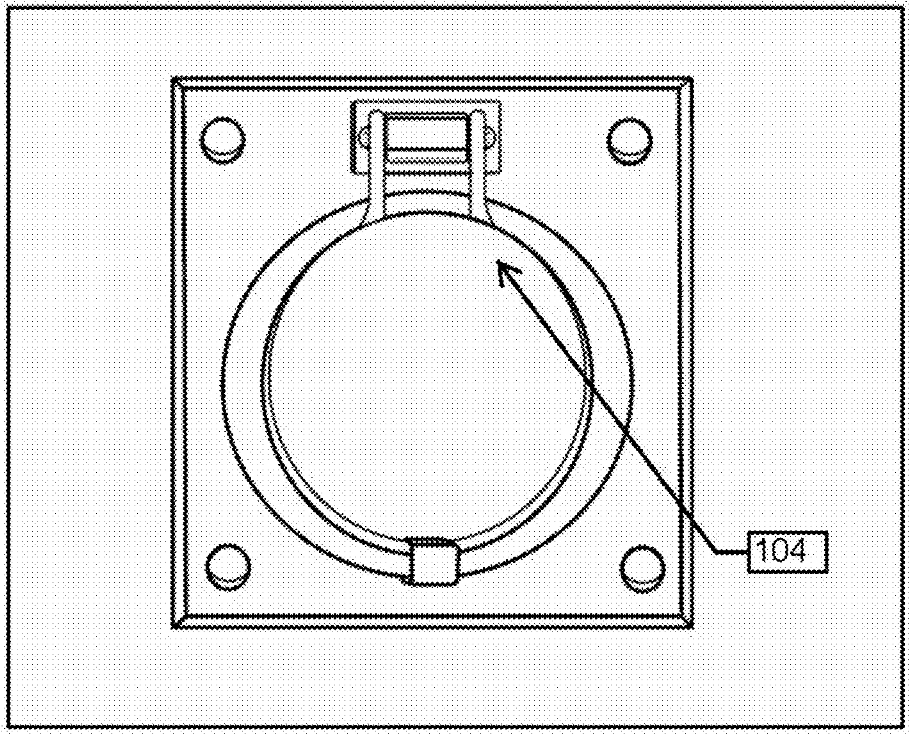
Figure 1R:
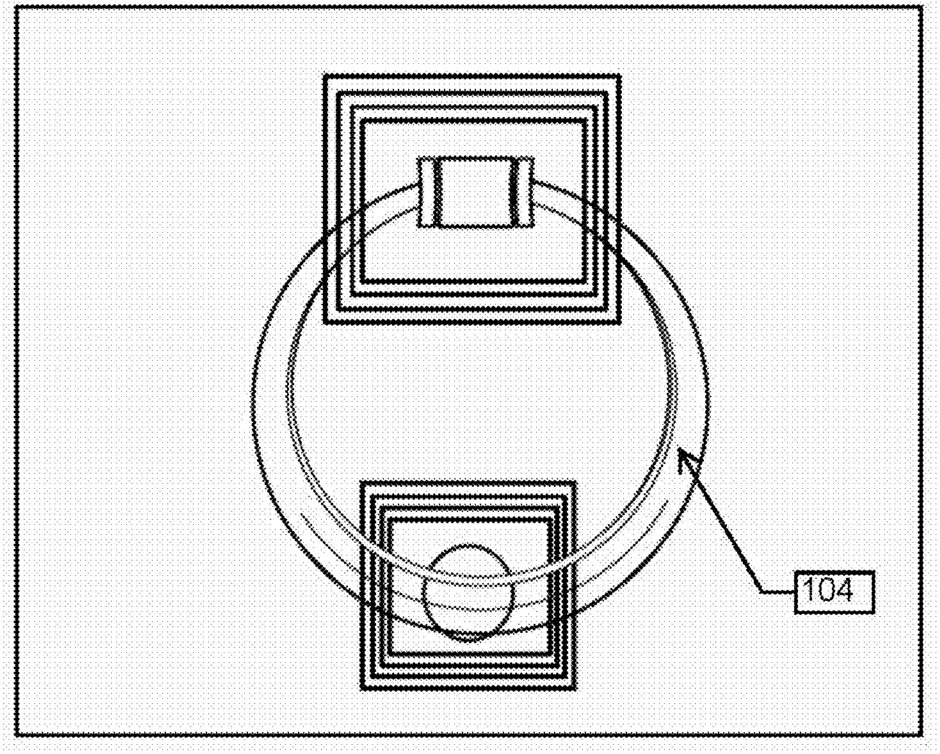
Figure 1S:
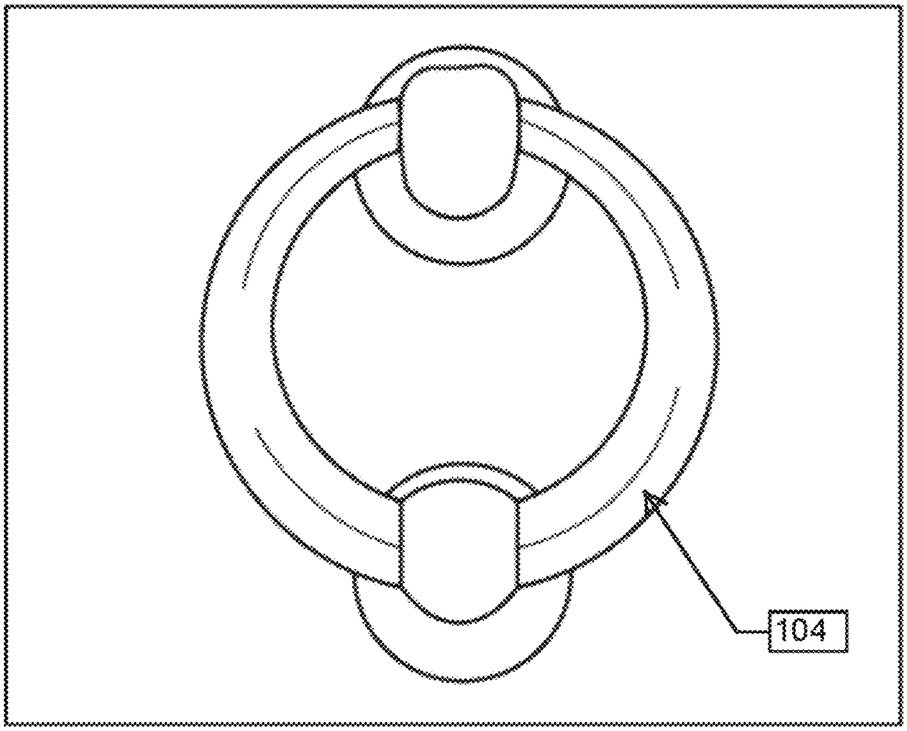
Figure 1T:
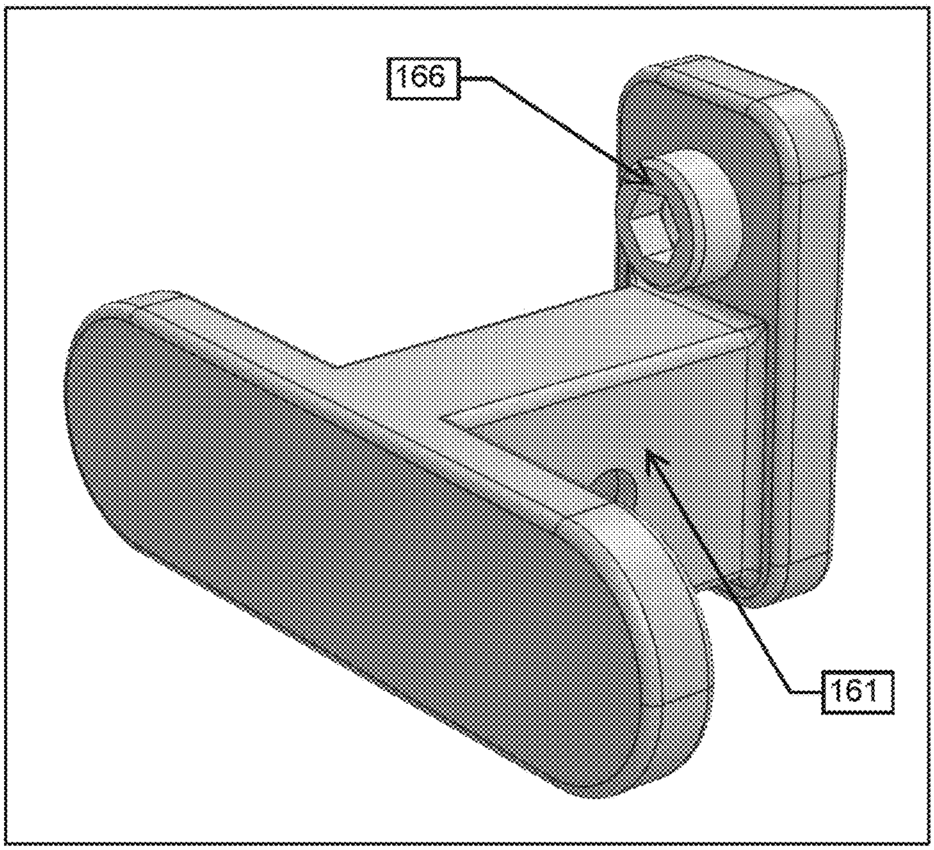
FIG. 1*t* and FIG. 1*u* shows an example wall mount that can be drilled or secured to any place so that wall mount can be used as a stationary object to secure the DoorBox.
Figure 1U:
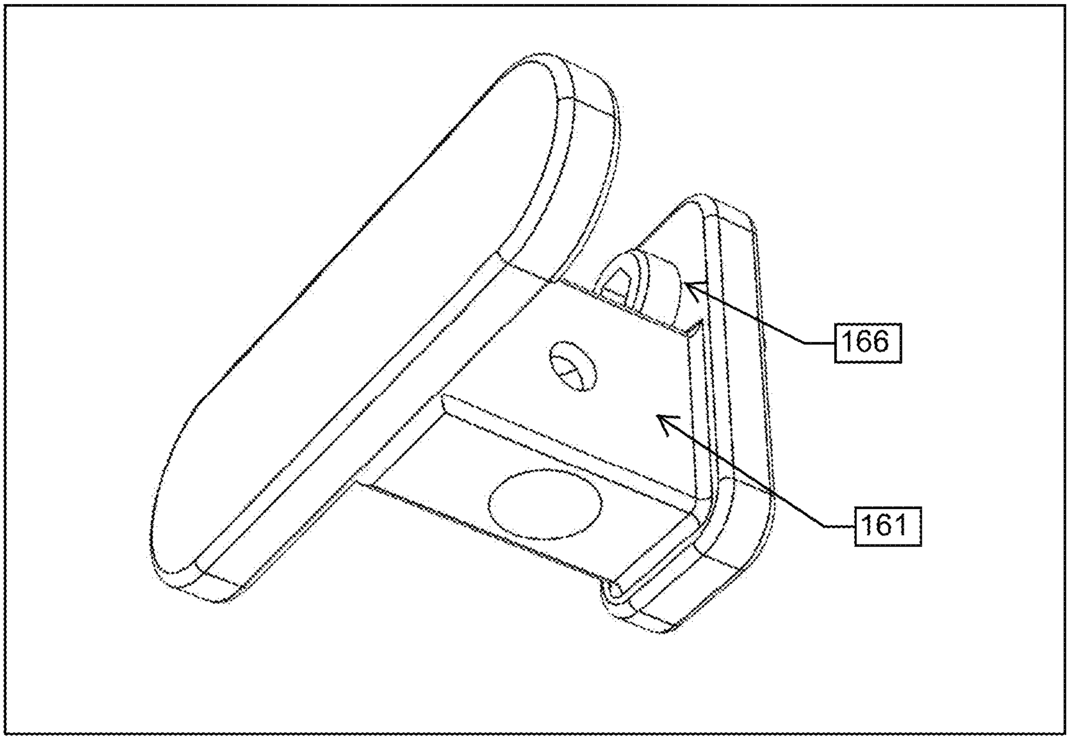
Figure 1V:
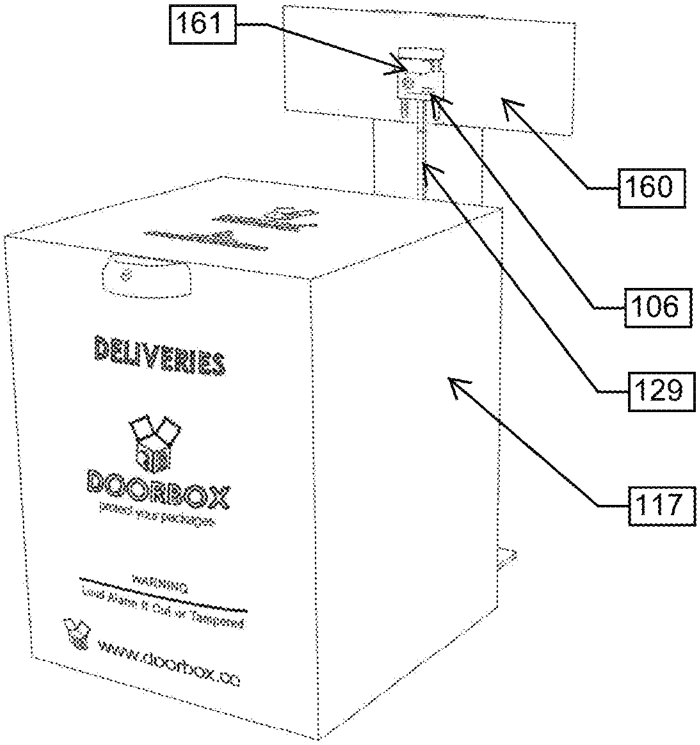
FIG. 1*v* shows examples of how a parcel receptacle can be tethered into a wall mount with a lock assembly (106) or FIG. 1*w* shows how a parcel receptacle can be tethered into a wall mount (161) directly.
Figure 1W:
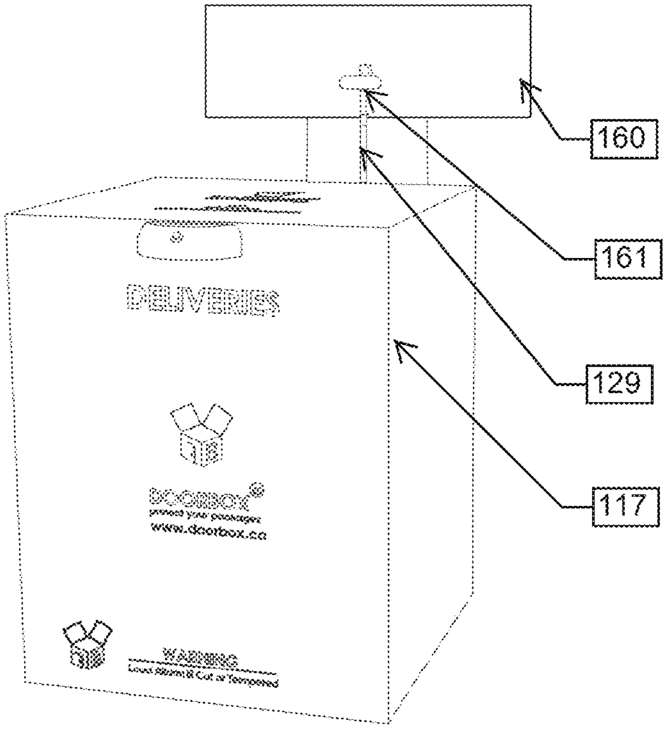

| Part Number | Description |
| --- | --- |
| 106 | Security apparatus or security attachment or locking assembly. This is the part that can be used to tether a parcel receptable physically to a stationary object to secure via a tamper-proof cable or by physical means. This part can be avoided when tethering of parcel receptacle is accomplished via a wireless means. |
| 107 | The key barrel or tubular lock of the lock-key mechanism where the security apparatus key is used to lock and unlock. |
| 108 | Shackle. |
| 109 | Screw to securely hold cartridges to top and bottom bases. |
| 110 | Threads to secure cartridges (109) into top and bottom base. |
| 111 | Display panel (Can be LCD, LED, or any type) to communicate lock or unlock codes, or an interface to communicate any kind of messages such as alerts, notifications, etc. This can be present anywhere near the parcel receptable. |
| 112 | Camera or video recording device or a scanner. It can be mounted on the security apparatus and/or placed on the parcel receptacle in some embodiments, or anywhere along the interconnecting chain or cable in some other embodiments. A camera or scanner can be used to scan barcodes or UPC codes or QR codes or any other codes and act upon authentication as desired. This camera either individually or along with provided software can identify various objects such as a delivery person, their dress color, dress patterns, car, cat, dog, vehicle, delivery vehicle, etc. and perform a subsequent desired action as needed. This can be mounted anywhere in the system shown in FIG. 1a, 1b or 1c, including on the parcel receptacle or can be mounted on the interconnecting cables, etc. |
| 113 | Fingerprint or biometric reader. This can be used to authenticate authorized individuals. Can be mounted on the parcel receptacle, or anywhere in the system shown in Figure 1a, 1b or 1c. |
| 114 | Wireless sensor. This is mainly shown for pictorial representation only. This could be an wi-fi module that connects to internet, or an RFID sensor or other wireless technology-based solution such as a Bluetooth or mobile-based software application. Depending on exact technology utilized in a particular embodiment, this could be placed inside or outside of Parcel receptacle or could be integrated into the PCB board and other internal mechanisms that are not explicitly displayed outside. This can either replace a doorknob lock or can be optional additional feature of doorknob security apparatus as alternate embodiments. Wireless mechanisms can be of many types including RFID, Bluetooth, Wi-Fi, Mobile application-based technologies, NFCs, among other wireless applications. This can be mounted anywhere in the system shown in FIG. 1a, 1b or 1c, including on the parcel receptacle or can be mounted on the interconnecting cables, etc. |
| 115 | This visual display of signals is shown for pictorial purposes only. This can be an indicator for all kinds of statuses such as armed, disarmed, battery levels. A flashing status could also be used for timer-based and triggered mechanism and could indicate when a wireless-activating device is brought near to acknowledge receipt of a wireless signal and display that control programs inside are working at a given time to perform an activity. This can be mounted anywhere in the system shown in FIG. 1a, 1b or 1c, including on the parcel receptacle or can be mounted on the interconnecting cables, etc. |
| 116 | Extra-fitting for a locking assembly that can be made of Engineering plastics or polymers or other similar materials that can be adapted for cartridges of various dimensions and geometries. |
| 117 | Parcel receptacle (or parcel bag or parcel box or parcel container). Can be of many types and many sizes and with many additional options and variations. |
| 118 | Enclosure assembly to hold relevant parts together. This can be mounted in the front or on the top lid. There can be one or more individual of these enclosures each fulfilling one or more of its intended functions. This can be of any shape or size, and can be made of metal, plastics or any other if it fulfills the needed structural strength and aesthetic appeal. Essentially, this is same as part number 146 although this enclosure 118 is used in shapes that appear curvy in its appearance in these figures. For all practical purposes, part 118 and part 146 are interchangeable. |
| 119 | A locking latch. This can be of female-type with a ring or an L-shape plate, or just a flat plate for a locking lever to secure the top lid and to prevent it from opening. |
| 120 | Top lid of parcel receptacle. |
| 121 | A mesh is a barrier made of connected strands of metal, fiber, or other flexible or ductile materials to minimize or prevent tampering from outside the parcel receptacle and to prevent access to packages or goods inside package receptacle. The may or may not be integrated with part number 123 and may be present singularly or along with 121 depending on a specific embodiment. |
| 122 | Enclosure for alarm unit. This could be placed anywhere on the inside or outside of the parcel receptacle. If the alarm is integrated inside other enclosures, this may not be present. This can also be configured to be a buzzer and it can be placed inside enclosure 146 instead of having a separate alarm enclosure for alarm. |
| 123 | A continuity cable/wire that signals when it is tampered with or cut by any unauthorized individuals or actions. The may or may not be integrated with part number 121 and may be present singularly or along with 123 depending on a specific embodiment. |
| 124 | Security apparatus key. |
| 125 | The top frame holder, or a support structure that holds the top frame (134) in its place so that it does not fall due to gravity or other forces. In vertical parcel receptacles, it is present in all 4 corners. |

TABLE 1-continued

Part number and description
The following table (Table 1) provides a list of referenced parts in many figures and contains a brief description and illustration of the part where appropriate.

| Part Number | Description |
|---|---|
| 126 | Handle or holder to lift or move parcel receptacle. |
| 127 | GPS module. Comprises of all necessary parts to transmit necessary signals to reveal present location of a parcel receptacle to authenticated individuals. This GPS module is small, and it can be housed anywhere inside a security apparatus and/or parcel receptacle. |
| 128 | 2-Way Audio Device, i.e., a microphone and a speaker. There can be 2 independent devices, or one integrated 2-way audio device. This could allow a parcel recipient to listen and talk to a delivery person or any one in front of the camera or parcel receptacle. This can be integrated with one of the electronic chips or can be a standalone hardware. |
| 129 | Cut-resistance cable or rope or chain. Some or all portion of this can be solid and rigid to provide strength and other properties needed in appropriate configurations |
| 130 | A package delivery person that carrying the package to deliver into the parcel receptacle |
| 131 | A package delivery truck, van or a car from different companies. |
| 132 | A package that is intended to be delivered inside the parcel receptacle securely. |
| 133 | The bottom side of a package receptacle. It can be of plywood, metals, or plastics or any other kind. |
| 134 | A top frame. This could be metal, or plastic or any kind of material that provides structural strength to the parcel receptacle and provides boundary to the top frame or supports the lid and holds several parts on it. |
| 135 | A keypad interface that allows entry of codes and that provides access into parcel receptacle upon authentication. |
| 136 | Inside-facing Camera that shows whether there are any packages inside DoorBox. |
| 137 | Illumination or light source. One or more may be present both inside and outside a parcel receptacle. |
| 138 | Supporting bracket. |
| 139 | A cushion that is easily compressible so that when heavier packages are placed on top, it would get compressed and go down, and when there are light weight packages are placed, those will remain at the top. This allows more depth of DoorBox wherein the customer don't have to bend too much when the package weight is very little or when packages are very small. |
| 140 | Barrier board. This provides additional protection for packages inside from tampering from outside. Can be made of metal or plastic and can be solid or can have various designs if it does not allow tampering the packages inside. |
| 141 | A rod or a tube to hold the top frame holder (125) so that structural support is provided for the parcel receptacle to remain vertically. |
| 142 | Gas struts to facilitate opening and closing of the lid. |
| 143 | Autonomous delivery drone or an unmanned aerial vehicle (UAV). |
| 144 | A solar panel for providing power and is used as an energy source to recharge batteries and to facilitate operation of electronic devices. |
| 145 | An electronic board that contains all necessary additional hardware and parts inside to offer several advanced features and functionalities. These may include, but not limited to, wi-fi module, IOT-module, SD Card for storage, devices for software storage and operation, and various accessories for the PCB Board. |
| 146 | Essentially, this is same as part number 118 although this enclosure 146 is shown in shapes that appear less curvy and more rectangular in its appearance in some figures. For all practical purposes, part 118 and part 146 are interchangeable. This enclosure houses many technological parts and hardware parts inside and can be made up of one or more pieces that can be configured to be installed either separately or together. This can be present anywhere inside or outside or in both places of parcel receptacle. Also, this can be mounted in the front (FIG. 16c), or top (FIG. 18a) or mounted from behind (not shown). |
| 147 | A vibration sensor. |
| 148 | A sound sensor. Detects unexpected tampering or unauthorized intrusion. |
| 149 | A passive infrared sensor or a motion detection sensor. |
| 150 | A buzzer or beeper is an audio signaling device, which may be mechanical, electromechanical, or piezoelectric. |
| 151 | A male locking rod that slides and locks the female ring on the lid thereby preventing unauthorized individuals from opening the parcel receptacle lid. This can be of many types including a solenoid valve or a sliding rod. This can be operated electronically and can be controlled by software programs as needed. |
| 152 | A printed circuit board (commonly known as a PCB). One or more may be present in the entire parcel receptacle to ease communication between different electrical and electronics hardware and software. A PCB board may also house several smaller electronic parts, each of which may not be mentioned here, to fulfill the intended functions. |
| 153 | Another PCB board on the inside to control and operate various electronic and electrical hardware inside. |
| 154 | A lock and key to secure the enclosure (146) from tampering. This enclosure contains many electrical and electronic hardware. |
| 155 | Door for the electronics enclosure (146). |
| 156 | Another electronic and electrical PCB. Can contain many different hardware on it to perform various operations. Can have one or more of ESP32, ESP32-CAM, Arduino, Arduino type and Arduino equivalent or raspberry pi or equivalent, and several hardware and peripherals. |
| 157 | Small Rack-type Parcel receptacles. Could open horizontally. May have springs inside that will automatically close these upon package retrieval. |

TABLE 1-continued

Part number and description
The following table (Table 1) provides a list of referenced parts in many figures and contains a brief description and illustration of the part where appropriate.

| Part Number | Description |
|---|---|
| 158 | Medium Size Rack-type Parcel receptacles. Fulfills certain applications and in certain use-case scenarios. |
| 159 | Communication cable and mechanism to operate the male locking rod (151). |
| 160 | This typically represents a door or any stationary plane that contains a stationary object to which a locking assembly (106) can be anchored. |
| 161 | Wall mount. Another example of stationary object. |
| 162 | Rod holder on the bottom side. This may have a female thread for the male thread in the rod to screw into for strength and stability. |
| 163 | Screws for the bottom rod holder. |
| 164 | Top Bolt on the vertical rod. |
| 165 | Top Rod Nut to secure the top frame (134) between the top bolt (164) and the top frame holder (125). |
| 166 | Screw for wall mounting. |
| 167 | Electronic lock. |
| 168 | An example mechanism to slide the top lid to open and close. The movement can be horizontal or vertical and can be in any convenient direction to facilitate ease of use. |
| 169 | Battery or any other energy source to power the electrical and electronic devices. |
| 170 | Audible alarm. When an audible alarm is triggered, loud sound is produced if there is any attempted tampering of the parcel receptacle or the security apparatus or any inter-connecting cables. In some embodiments, this may be integrated with the PCB with a buzzer also. This may be present inside, outside or anywhere near the parcel receptacle. |
| 171 | Sim card and sim card holder that provides internet access when other source of internet is not available in remote areas or away from a property with weak or no wi-fi signal or wi-fi network. |
| 172 | An ultrasonic sensor that measures the distance. This can be used to detect when packages are placed inside and when the distance to the bottom changes because of the presence of packages. |
| 173 | A connection source of electrical power. A plug is shown for clarity, but it can just be a female pin into which the power source can be connected to. This is like a hard-wire connection to power the electronic and electrical devices. This is an example termination point, and in reality, it can be anywhere on the parcel receptacle. |
| 174 | Enclosure for Additional stand-alone outward-facing camera in case customers want to use it to place their own, preferred camera of choice. DoorBox top frame is just a place holder in which they can use and place them for viewing. |
| 175 | A motor to move the locking lever (151) to either lock or unlock the parcel receptacle lid in its place. |

Implementation of Artificial Intelligence (AI), Internet of Things (IOT), Machine Learning (ML) and Software for Advanced Features and Beneficial Functionalities:

Technologies have advanced significantly in the recent few years, and there are many components that can perform amazing human tasks at very affordable pricing and increased accuracy. There have been many powerful developments recently in facial and image recognition software, artificial intelligence, and machine learning technologies, and IOT based hardware and software. FIGS. 9*a* through 10*b* refers to a new way of working wherein several technologies work in unison to identify and authenticate appropriate individuals and provide powerful authentication features without needing to put any code in parcel receptacle (117) all the time.

A mini speaker and microphone (128), camera (112 or 136) and a PCB with options that allows integration of Camera, passive infrared (PIR) sensor, display, SD Cards, Software, audio power amplifier, relays, locking rods or locking mechanisms, voice, Speaker, etc. can all be configured and integrated with our parcel receptacle (117) so when the delivery person (130) comes in front of a parcel receptacle with a package (132) it can guide them to use the parcel receptacle (117) properly, or open them automatically, or lock them automatically, and secure the package with least amount of effort.

Scenario 1: Automation Based on Electronic Devices Mounted on the Outside Enclosure (146) of Parcel Receptacle for Deliveries (AI, IOT and ML)

a. A Package delivery person approaches the front door or the parcel receptacle.
b. Using our advanced software, programs and sensors and by reading and interpreting the images, our system quickly determines the event that is about to happen is a parcel delivery. The following events happen subsequently.
c. From Speaker: "Hello, have you come to drop my packages".
d. Package Delivery Person: Yes.
e. From Speaker: Ok, I will open the Doorbox, please place my packages inside.
f. The parcel receptacle opens from inside.
g. Package Delivery Person: He puts the package inside and turns around to leave.
h. Speaker: Thank you. The camera and the AI engine recognize that the person has left, and it locks automatically.

Scenario 2: Recognizing Images and Situations and Acting Accordingly (AI, IOT and ML)

a. The resident returns home in the evening
b. The camera detects and greets the resident using facial recognition and AI software.
c. The Speaker says you have a package.
d. The lock automatically opens.

e. The resident retrieves the box from inside the parcel receptacle and carries on with their activity.

Scenario 3: Security (AI, IOT and ML Applications)

a. A stranger approach in the night.
b. Camera detects motion
c. Light from parcel receptacle comes on.
d. Speaker speaks and says, may I help you. I might sound the alarm and calling the police now.
e. The stranger runs away.

Scenario 4: Automated Locking after Package Delivery

This is an application wherein the entire locking and unlocking happens based on the contents inside of the parcel receptacle. This does not involve any actions by the delivery personnel for the first delivery when the parcel receptacle is empty. One or more of the following are needed for this implementation, i.e. A PIR motion sensor (149), a camera (112 or 136), an ultrasonic distance sensor (172), and a micro-controller (145 or 152) and PCB related peripherals.

a. The delivery personnel arrive and opens the unlocked parcel receptacle and drops a package inside
b. The electronic devices confirmed that a package has been delivered. This can be confirmed by one or more of the following electronic devices such as a motion sensor, camera, an ultrasonic sensor, vibration sensor, etc. working together.
c. Once the delivery of a package is confirmed, our controller automatically locks the parcel receptacle and secures it.
d. The resident retrieves the package upon returning home.
e. If there was a prior delivery of a package already inside the parcel receptacle, the delivery personnel will have to use a code or use one of many security solutions to authenticate himself after which the parcel receptacle will provide access for him to drop his packages inside.

Scenario 5: Automated Unlocking when Nothing is Inside the Package Receptacle

At regular intervals, our system will evaluate whether there is anything noteworthy is present inside the package receptacle by using one or more of the sensors in them. Upon determining that nothing is inside, the micro-controller will unlock the package receptacle so that the delivery personnel will not have to do anything to place the packages inside.

Other Scenarios and Features: The above 5 scenarios are just examples and provides a glimpse of the capabilities and potential of our technology enabled Smart DoorBox. The use of AI, IOT and ML along with many sensors and electronic devices such as PIR sensor, ultrasonic sensor, accelerometer, gyro meter, camera, and micro-controllers with IOT capabilities, etc. can all be used to accomplish a rich variety of features and functionalities when integrated with our solution. Some of the features can be as follows:

1. If an image of a person is captured and stored earlier, and if the person is authenticated from a prior authentication and approved event, the Doorbox can unlock and grant access to package receptacle.
2. There would be many images stored of all people who live in the property or household of parcel recipient from prior walking adjacent to Doorbox. Such familiar authenticated people when they approach the Doorbox, the Doorbox can be configured to give access to Doorbox, and/or can be programmed to perform certain functions (say greeting them) when such authenticated people approach the Doorbox.
3. If unrecognized people approach Doorbox, the Doorbox can be programed to speak or perform certain functions to alert the individuals or the owners of Doorbox thereby acting like a security agent.
4. During midnight or wee hours of the day, if some intruder comes, the Doorbox can turn on lights and speak and scare potential burglars and thief from doing their actions.
5. The DoorBox can be like a digital doorman and perform many actions like a human being with the help of camera, speaker, PIR sensors, and light and its locking and unlocking functions with its microcontrollers.
6. The Bluetooth and Wi-Fi can be configured and integrated with the AI, IOT and ML and can be controlled using a mobile app, desktop-based solutions or via any other means of applications.
7. Google, Alexa and other smart home devices can be configured and integrated with the AI, IOT and ML engines of DoorBox to perform appropriate actions as well.
8. Face recognition, image processing software can be used and configured to capture, authenticate, and act on locking and unlocking of Doorbox and can be configured to activate the 2-way speaker and other devices and peripherals on Doorbox.
9. The electronics and PCBs inside a wireless parcel receptacle can be configured to connect to a wi-fi or wireless network of a parcel recipient in such a way when that the parcel receptacle gets disconnected from the wi-fi or wireless network or when the signal strength varies significantly to suggest a suspicious event of someone stealing the parcel receptacle, or tampering, that event can be configured as a theft event of the parcel receptacle, and an alarm event and notifications can be triggered.
10. A GPS module in the parcel receptacle can be configured such that if the parcel receptacle is moved away from its expected boundary or territory, such incident or movement can be configured to indicate theft of parcel receptacle and configured to trigger an alarm and notification event.
11. In addition, along with the PCB and electronics module, an accelerometer and/or gyroscope and/or magnetometer can be integrated with a wireless parcel receptacle such that if the parcel receptacle detects any suspicious movement or acceleration from its original position or location, or if the parcel receptacle is rotated (i.e. angular momentum) in a suspicious way to suggest that it is moved away from its original location by unauthorized personnel, these sensors can be configured to record such suspicious events, and can be configured to trigger an alarm or notification event to alert parcel recipients immediately.
12. Alarm, PCB and Electronics circuit Integration: In addition, there are a myriad ways that one can secure the parcel receptacle using a wired circuit, and/or a wireless circuit inside or on the parcel receptacle, in such a way any suspicious behavior or suspicious attempts to tamper with the parcel receptacles or its contents, or dislocate or move the parcel receptacle from its original location by unauthorized personnel can be sensed (e.g. via a GPS module), detected (e.g. accelerometer and gyroscope) and configured to trigger an alarm or notification event to communicate with the parcel recipient.

I claim the following:

1. A system for securely receiving, returning, or exchanging a parcel, comprising:

a parcel receptacle having:

a containment portion to store the parcel; and an access member for accessing the containment portion;

a security system comprising:

a locking system with one or more locking mechanisms configured to releasably lock the access member in a closed position;

a security notification unit, electronically connected to an external electronic device associated with the parcel receptacle, the security notification unit comprising:

an input means for receiving authentication credentials to unlock the access member;

one or more sensors to monitor activity within and around the parcel receptacle; and a notification module configured to send alerts to the external electronic device when a change in monitored activities is detected by the one or more sensors;

a tethering means for securing the parcel receptacle and activating the security system in response to a security breach, the tethering means comprising:

a wired or wireless network connection configured to communicate security status and alerts;

a physical tether system comprising one or more alarm-enabled, tamper-proof cables and a locking assembly, wherein the locking assembly is configured to secure the one or more cables and the parcel receptacle to a stationary object to inhibit unauthorized removal; or a configurable location-tracking system capable of detecting displacement of the parcel receptacle;

one or more exterior-facing cameras secured to the parcel receptacle; and an Internet of Things (IoT) enclosure, modularly designed to be removable and swappable, the IoT enclosure comprising:

a battery;

one or more interior-facing cameras for capturing images of an interior portion of the parcel receptacle;

one or more illumination sources configured to activate in synchronization with image capture to optimize battery consumption; and a printed circuit board (PCB) housing one or more controllers executing programs to manage the one or more cameras, the one or more illumination sources, and the locking system, wherein the IoT enclosure operates in communication with the security system to manage security functions.

2. The system of claim 1, further comprising a mobile application for remote cooperation with the system, wherein the mobile application is configured to provide at least one of accessibility, viewability, and control features.

3. The system of claim 1, further comprising a security and protective structure, wherein the security and protective structure comprises at least one of a weather-resistant parcel receptacle, a flexible, water-resistant fabric with an embedded wire mesh for security, and a cushion positioned at a bottom portion of the parcel receptacle, the cushion being configured to elevate a lightweight package to facilitate convenient retrieval.

4. The system of claim 1, further comprising an authentication module, wherein the authentication module is configured to store authentication credentials, the authentication credentials comprising at least one of a UPC, a QR code, and a barcode, and wherein the authentication module is further configured to communicate with the locking system, the locking system being configured to lock and unlock using at least one of RFID, short-range wireless communication, NFC, a fingerprint reader, and a mobile application technology.

5. The system of claim 1, wherein the stationary object comprises at least one of a doorknob, a door handle, a wall mount, a guard rail, and a wrap-around structure on a surface.

6. The system of claim 1, further comprising an IoT enclosure housing, wherein the IoT enclosure housing comprises at least one of a microphone, an alarm, a speaker, and an additional locking mechanism, and wherein the IoT enclosure housing further comprises a display indicator configured to show at least one of a lock or unlock status of the parcel receptacle, a battery percentage remaining, and a Wi-Fi signal strength.

7. The system of claim 1, wherein the one or more sensors comprise at least one of a vibration sensor, an infrared sensor, a GPS sensor, a gyroscope, an accelerometer, a magnetometer, and an ultrasonic sensor.

8. The system of claim 1, further comprising at least one of a battery monitoring module configured to display a battery level and control a temperature indicator, a solar panel integrated to charge the battery, and a WiFi module configured to provide connectivity using at least one of a SIM card and a Wi-Fi signal.

9. A system for securely receiving, returning, or exchanging a parcel, comprising:

a parcel receptacle having:

a containment portion configured to store the parcel; and an access member providing entry to the containment portion;

a security system comprising:

a locking system configured to releasably secure the access member in a closed position;

a security notification unit comprising:

one or more sensors to monitor activity within and around the parcel receptacle;

a tethering means configured to secure the parcel receptacle and activate the security system upon detecting unauthorized activity, the tethering means comprising:

a wired or wireless network connection; and at least one of:

a physical tether system comprising one or more alarm-enabled, tamper-proof cables and a locking assembly, wherein the locking assembly is configured to secure the one or more cables and the parcel receptacle to a stationary object to inhibit unauthorized removal; or a configurable GPS sensor capable of detecting displacement;

one or more exterior-facing cameras secured to the parcel receptacle;

an Internet of Things (IoT) enclosure, wherein the IoT enclosure is a modular, removable, and swappable housing, the IoT enclosure comprising:

a battery;

one or more interior-facing cameras configured to capture images of an interior portion of the parcel receptacle;

one or more illumination sources configured to activate in synchronization with image capture to optimize battery consumption;

a user interface comprising:

an input device configured to receive user authentication or operational commands; and a display panel configured to provide visual feedback or system status information;

a printed circuit board (PCB) comprising one or more controllers configured to:

execute programs to manage the one or more cameras, the one or more illumination sources, the user interface functions, and the locking system; and communicate with the security system to manage security; and a system configuration comprising one or more of:

a notification module configured to notify an external electronic device based on data gathered from the one or more sensors indicating an activity change; and an access control module in electronic communication with the locking system and configured to unlock the access member upon successful verification.

* * * * *